(12) United States Patent
Wittenbreder

(10) Patent No.: US 6,195,270 B1
(45) Date of Patent: Feb. 27, 2001

(54) SELF CLAMPING ZERO VOLTAGE SWITCHING DC TRANSFORMERS

(75) Inventor: Ernest H. Wittenbreder, Flagstaff, AZ (US)

(73) Assignee: Technical Witts, Inc., Flagstaff, AZ (US)

(*) Notice: Subject to any disclaimer, the term of this patent is extended or adjusted under 35 U.S.C. 154(b) by 0 days.

(21) Appl. No.: 09/596,800

(22) Filed: Jun. 19, 2000

(51) Int. Cl.[7] ................................................. H02M 31/335
(52) U.S. Cl. .............................. 363/17; 363/127; 363/132
(58) Field of Search .............................. 363/16, 17, 125, 363/127, 131, 132, 133, 134

(56) References Cited

U.S. PATENT DOCUMENTS

| | | | |
|---|---|---|---|
| 4,672,517 | * | 6/1987 | Mandelcorn .............................. 363/20 |
| 4,825,348 | * | 4/1989 | Steigerwald et al. .................... 363/17 |
| 4,873,616 | * | 10/1989 | Fredrick et al. ......................... 363/17 |
| 5,654,880 | * | 8/1997 | Brkovic et al. .......................... 363/17 |
| 5,875,103 | * | 2/1999 | Bhagwat et al. ......................... 363/17 |
| 5,999,417 | | 12/1999 | Schlecht ................................... 363/16 |

OTHER PUBLICATIONS

Severns & Bloom, "Modern DC to DC Switchmode Power Converter Circuits", 1984, Chapter 4 pp. 78–111.

* cited by examiner

Primary Examiner—Adolf Deneke Berhane

(57) ABSTRACT

A DC transformer circuit which accomplishes zero voltage switching for all switches for all transitions is revealed. The DC transformer is also self clamping so that clamping can be accomplished without compromising tight magnetic coupling and without using valuable window area for a clamp winding. The wave forms generated at the secondary windings are suitable for synchronous rectifier self drive. The combination of lossless switching, tight coupling, synchronous rectifier self drive, and maximum window utilization results in a DC transformer circuit which is suitable for high frequency, high efficiency operation. The DC transformer circuit uses two independent transformers with primary windings activated in anti-synchronization. The primary windings of the transformers are driven by a half bridge, a full bridge, or a push pull switching network.

10 Claims, 63 Drawing Sheets

US 6,195,270 B1

SELF CLAMPING ZERO VOLTAGE SWITCHING DC TRANSFORMERS

BACKGROUND OF THE INVENTION

1. Field of the Invention

The subject invention generally pertains to electronic power conversion circuits, and more specifically to high frequency, switched mode power electronic converter circuits.

2. Description of Related Art

There are some power conversion circuits which accomplish higher efficiencies by implementing a mechanism that accomplishes switching at zero voltage. Power loss in a switch is the product of the voltage applied across the switch and the current flowing through the switch. In a switching power converter, when the switch is in the on state, the voltage across the switch is zero, so the power loss is zero. When the switch is in the off state, the power loss is zero, because the current through the switch is zero. During the transition from on to off, and vice versa, power losses can occur, if there is no mechanism to switch at zero voltage or zero current. During the switching transitions, energy losses will occur if there is simultaneously (1) non-zero voltage applied across the switch and (2) non-zero current flowing through the switch. The energy lost in each switching transition is equal to the time integral of the product of switch voltage and switch current. The power losses associated with the switching transitions will be the product of the energy lost per transition and the switching frequency. The power losses that occur because of these transitions are referred to as switching losses by those people who are skilled in the art of switching power converter design. In zero voltage switching converters the zero voltage turn off transition is accomplished by turning off a switch in parallel with a capacitor and a diode when the capacitor's voltage is zero. The capacitor maintains the applied voltage at zero across the switch as the current through the switch falls to zero. In the zero voltage transition the current in the switch is transferred to the parallel capacitor as the switch turns off.

The zero voltage turn on transition is accomplished by discharging the parallel capacitor using the energy stored in a magnetic circuit element, such as an inductor or transformer, and turning on the switch after the parallel diode has begun to conduct. During the turn on transition the voltage across the switch is held at zero, clamped by the parallel diode. The various zero voltage switching (ZVS) techniques differ in the control and modulation schemes used to accomplish regulation, in the energy storage mechanisms used to accomplish the zero voltage turn on transition, and in a few cases on some unique switch timing mechanisms.

A DC transformer is a circuit that transforms voltages from an input DC voltage to an output DC voltage. Typically the DC transformer also provides galvanic isolation between the input circuits and the output circuits. The circuit typically contains a switch or a set of switches that transform the input DC voltage to an AC voltage which is applied to a transformer primary winding or a set of primary transformer windings. The secondary windings of the transformer will have AC signals that are analogous to the AC signals that appear on the primary windings, but the secondary signals will be scaled by the transformer turns ratio. The signals that appear at the secondary windings are rectified to form a DC voltage. Common DC transformers are well known to those skilled in the art of power conversion. A discussion of DC transformers appears in the book by Severns and Bloom entitled "Modern DC-To-DC Switchmode Power Converter Circuits". DC transformers are commonly used in combination with the common buck, boost, and buck boost converters to form complete power converters. Typically a buck or a boost converter is used as a pre-regulator to the DC transformer to form the converter system, but the buck, boost, or buck boost converter may also be used as a post regulator. The DC transformer operates at approximately 100% duty cycle but provides no duty cycle variability so the pre or post regulator is needed to provide the necessary regulation.

One example of a DC transformer is shown in FIG. 1. The two switches on the input side form an AC signal which is applied to the primary winding of an ideal transformer. The two switches are operated alternately, each at approximately 50% duty cycle. The two secondary windings provide scaled versions of the signals that appear on the primary winding. The two secondary switches are operated alternately, each at 50% duty cycle. The action of the two secondary switches is to rectify the secondary signals forming a DC voltage at the output capacitor. One problem with the FIG. 1 circuit is that the two secondary windings must both be tightly coupled to the primary winding, but only one secondary winding is active at any time. The inactive secondary winding will contribute eddy currents and AC winding losses and the two secondary winding construction will contain a high amount of leakage inductance because leakage flux will exist in the space occupied by the inactive winding. The combination of high leakage inductance and high AC winding losses result in a DC transformer which is less than optimal for high frequency operation.

Another example of a DC transformer is shown in FIG. 2. The FIG. 2 circuit contains two distinct and separate transformers. The two transformers are operated alternately at approximately 50% duty cycle. In each of the two transformers there is a single primary winding and a single secondary winding which can be tightly coupled to obtain both low leakage inductance and low AC winding losses. There is one shortcoming of the FIG. 2 circuit, the inactive transformer will ring with the circuit capacitive parasitics during the inactive period of operation since there is no clamping mechanism for any transformer winding. During the active period of the transformer, energy will build in the transformer core due to the magnetizing current. When the transformer becomes inactive by turning off the primary switch connected to that transformer the energy stored in the core will ring with the switches parasitic capacitances and the intra-winding capacitances of the transformer. This ringing creates EMI and the need for a snubber to damp the ringing and/or a clamp circuit to protect the switches from over voltage.

The FIG. 3 circuit is a modification of the FIG. 2 circuit that contains a tertiary winding in each transformer and a rectifier. The tertiary winding and the rectifier form a clamp which can reduce the ringing and provide relatively square wave forms which may be suitable for secondary synchronous rectifier self drive. The problem with the tertiary winding is that it adds AC winding losses when the tertiary winding is inactive and it adds to the leakage inductance. It also adds DC winding losses because the window area occupied by the tertiary winding reduces the window area available to the primary and secondary windings thus increasing the winding resistance of either or both of the other windings. The effectiveness of the clamp depends on how tightly the tertiary winding is coupled to the winding that it clamps. In the FIG. 3 circuit the primary winding must be tightly coupled to both the secondary winding for low leakage inductance and high efficiency and it must also be tightly coupled to the tertiary winding in order to accomplish an effective clamp. To some extent these two requirements are mutually exclusive. In general both the coupling coefficient and efficiency are compromised by the addition of a special clamp winding.

OBJECTS AND ADVANTAGES

One object of the subject invention is to provide a simple DC transformer with low leakage inductance.

Another object of the subject invention is to provide a simple DC transformer which is self clamping and thereby does not require a tertiary or clamp winding to avoid overshoot and ringing.

Another object of the invention is to provide a DC transformer circuit that will allow optimal utilization of the available window area.

Another object of the subject invention is to provide a simple DC transformer which can readily accomplish lossless switching for all switches and all transitions.

Another object of the subject invention is to provide a DC transformer which can be used effectively and efficiently with planar magnetics structures.

Another object of the subject invention is to provide a DC transformer which can be operated effectively and efficiently at very high switching frequencies.

Figure 1:
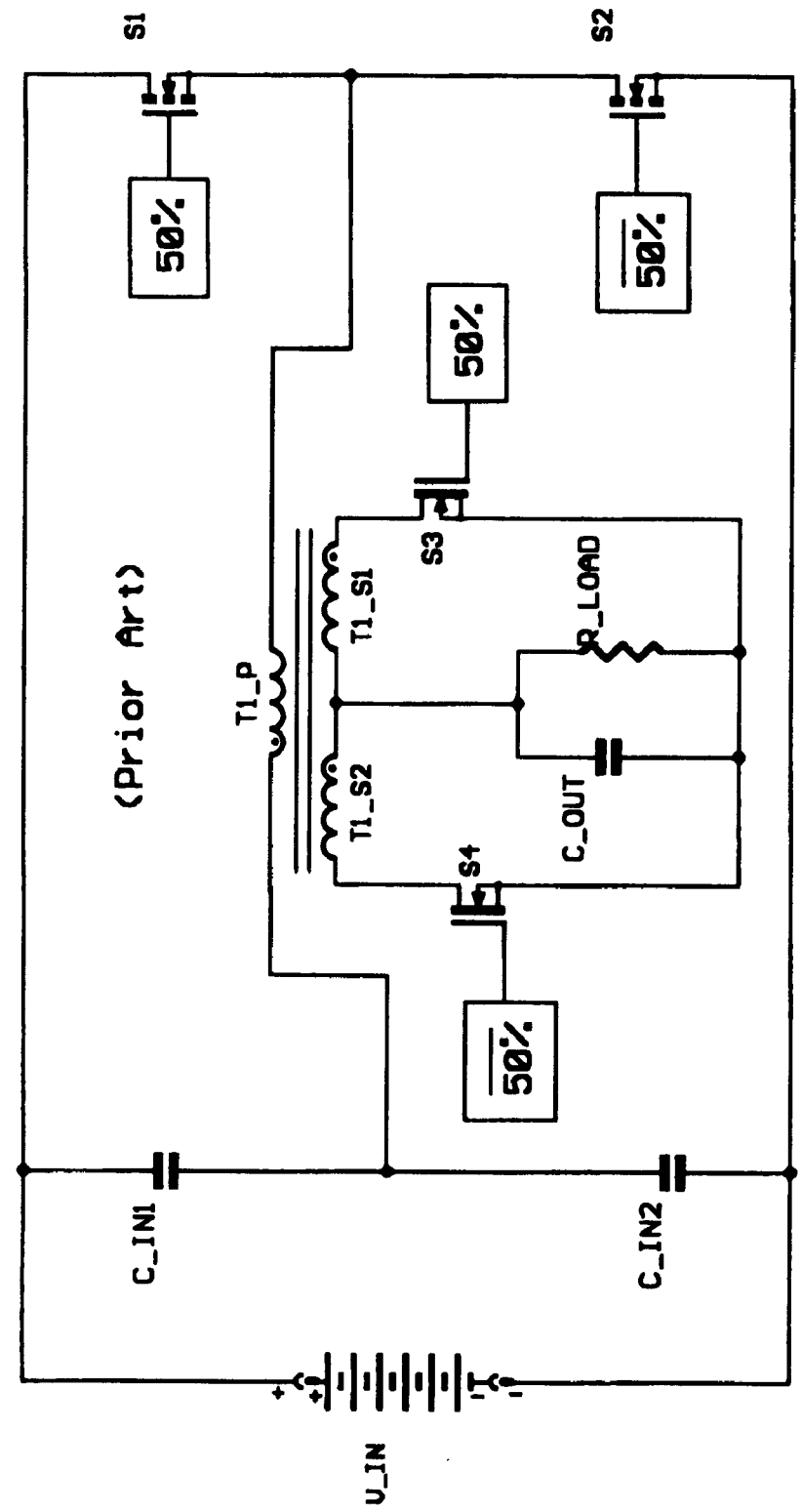
FIG. 1 illustrates a DC transformer using a half bridge arrangement and a single transformer.
Figure 2:
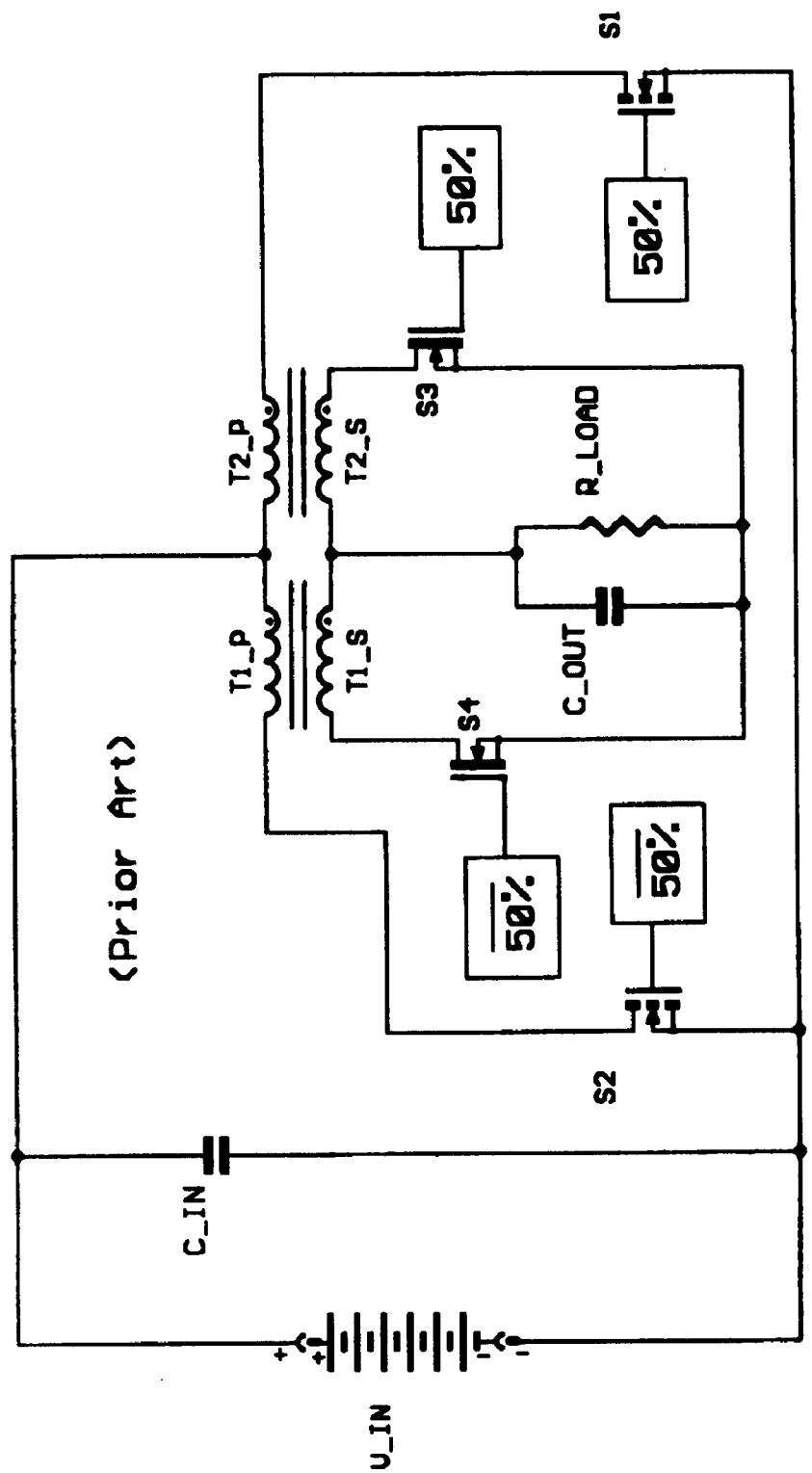
FIG. 2 illustrates a DC transformer using a pair of identical transformers in a push pull arrangement.
Figure 3:
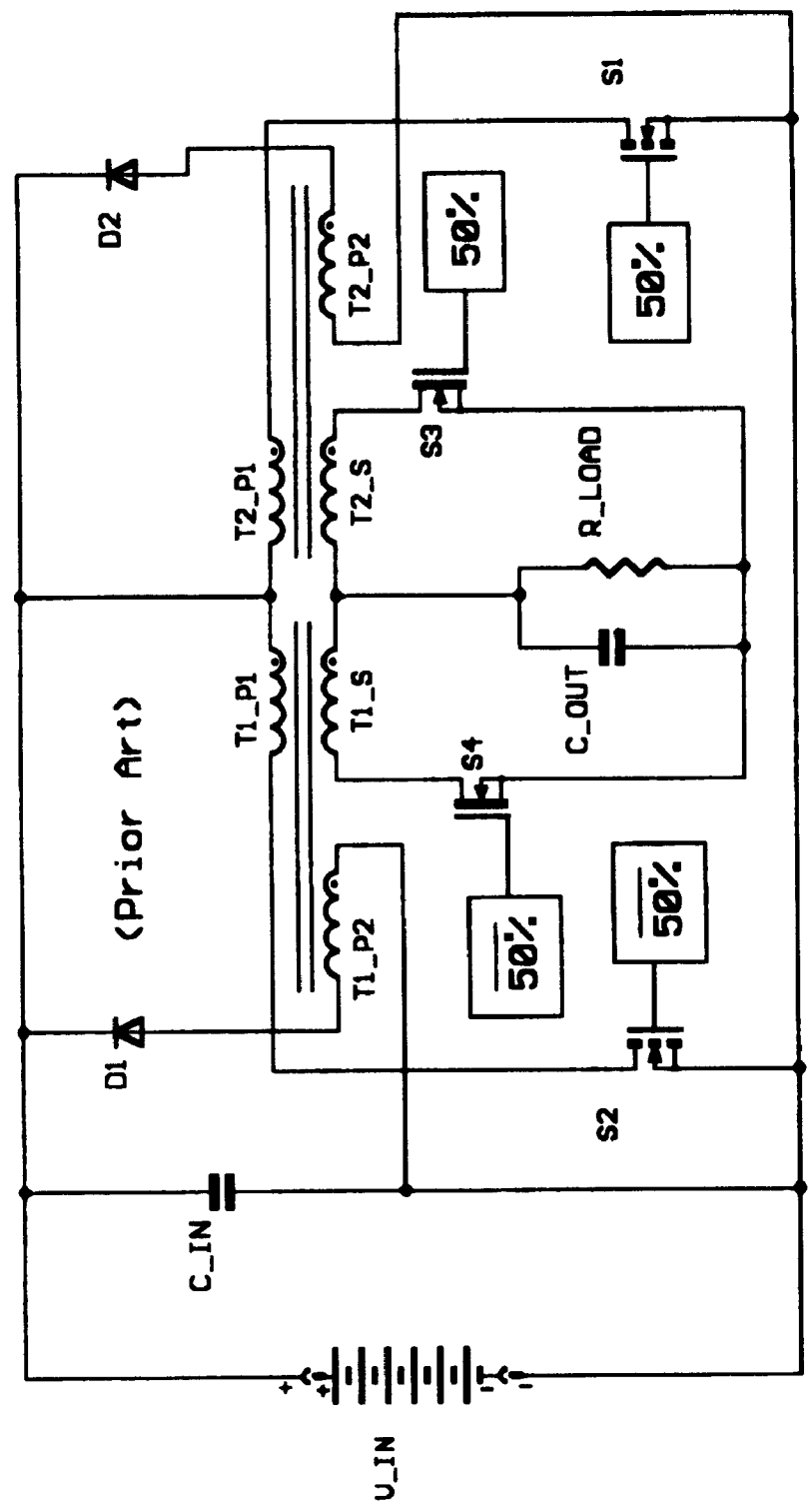
FIG. 3 illustrates a DC transformer similar to the FIG. 2 circuit that adds a tertiary winding to each transformer for clamping purposes.

| Reference Numerals | |
|---|---|
| 100 DC input voltage source | 101 node |
| 102 node | 103 capacitor |
| 104 capacitor | 105 node |
| 106 lead | 107 lead |

| -continued | |
|---|---|
| Reference Numerals | |
| 108 node | 109 node |
| 110 capacitor | 111 switch |
| 112 diode | 113 node |
| 114 capacitor | 115 switch |
| 116 diode | 117 node |
| 118 lead | 119 lead |
| 120 node | 121 transformer |
| 122 transformer | 123 node |
| 124 capacitor | 125 switch |
| 126 diode | 127 node |
| 128 capacitor | 129 switch |
| 130 diode | 131 node |
| 132 capacitor | 133 load |
| 134 node | 200 DC input voltage source |
| 201 node | 202 node |
| 205 node | 206 lead |
| 207 lead | 208 node |
| 209 node | 210 capacitor |
| 211 switch | 212 diode |
| 213 node | 214 capacitor |
| 215 switch | 216 diode |
| 217 node | 218 lead |
| 219 lead | 220 node |
| 221 transformer | 222 transformer |
| 223 node | 224 capacitor |
| 225 switch | 226 diode |
| 227 node | 228 capacitor |
| 229 switch | 230 diode |
| 231 node | 232 capacitor |
| 233 load | 234 node |
| 236 capacitor | 237 switch |
| 238 diode | 239 node |
| 240 lead | 241 capacitor |
| 242 switch | 243 diode |
| 244 node | 245 lead |
| 300 DC input voltage source | 301 node |
| 302 node | 321 transformer |
| 322 transformer | 323 node |
| 324 capacitor | 325 switch |
| 326 diode | 327 node |
| 328 capacitor | 329 switch |
| 330 diode | 331 node |
| 332 capacitor | 333 load |
| 334 node | 336 capacitor |
| 337 switch | 338 diode |
| 339 node | 341 capacitor |
| 342 switch | 343 diode |
| 344 node | 345 capacitor |

SUMMARY

The subject invention uses a pair of transformers with their primary windings in anti-parallel in a bridge, half bridge, or push pull switching arrangement. Each transformer operates at 50% duty cycle in anti-synchronization with the other transformer so that the combination operates at 100% duty cycle. The stored energy in the core and the associated magnetizing currents of the transformers drive zero voltage switching transitions. The switch and capacitor connections provide self clamping of the primary windings so that the voltage wave forms on all windings are rectangular in shape. The self clamping arrangement of the switch circuit construction obviates any clamp windings which enables the transformers to achieve high interwinding magnetic coupling, optimal window utilization, and high efficiency at high switching frequencies.

DESCRIPTION OF THE PREFERRED EMBODIMENTS

Figure 4:
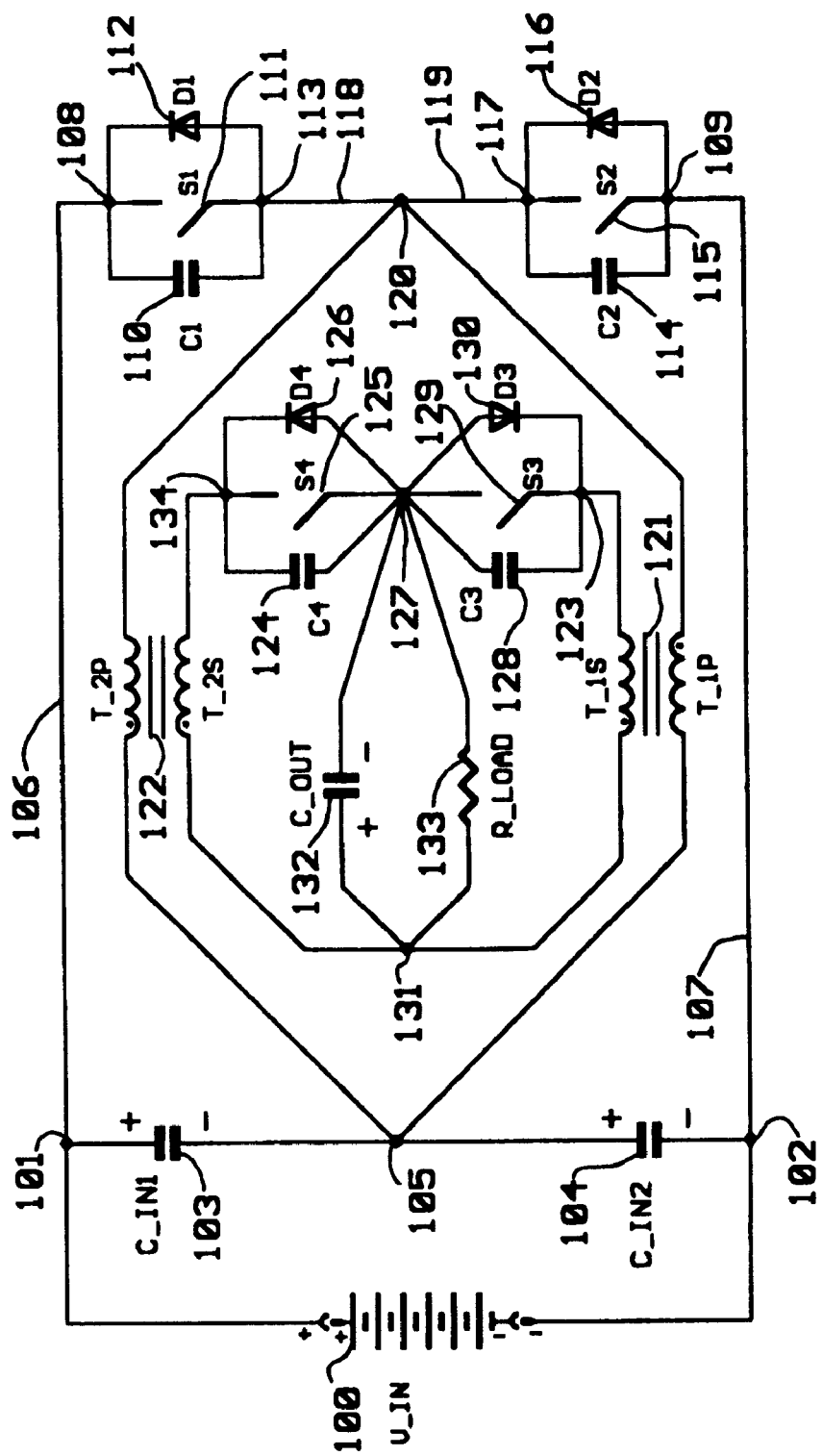
FIG. 4 illustrates a DC transformer according to the subject invention using two self clamping transformers in a half bridge arrangement.
Figure 5:
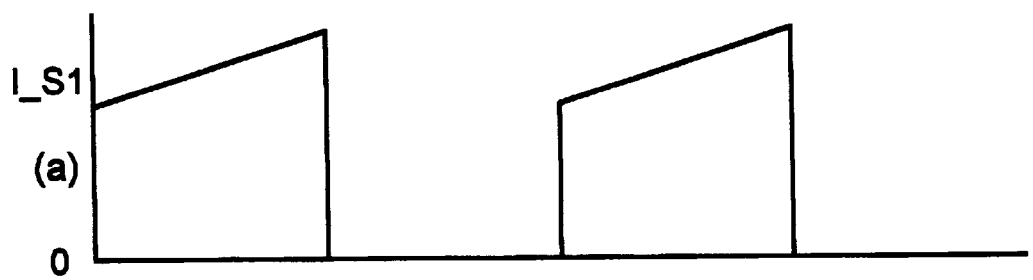
FIG. 5 illustrates the switch current wave forms of the FIG. 4 circuit.
Figure 5:
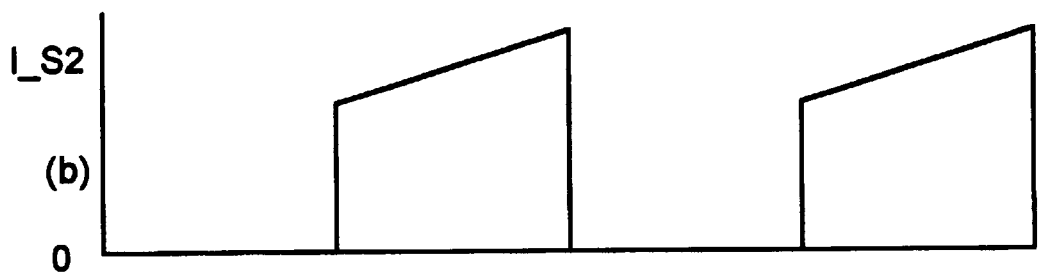
Figure 5:
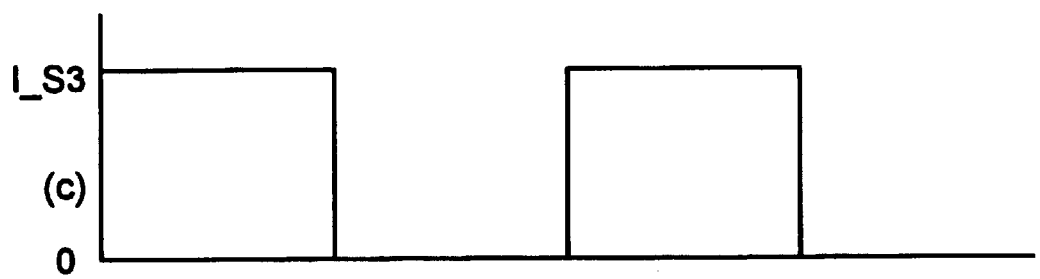
Figure 5:
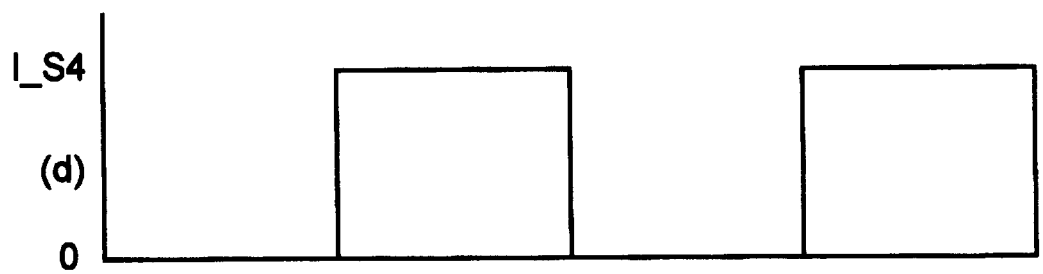

FIG. 4 illustrates a DC transformer which achieves zero voltage switching for all switches for all transitions. It includes a winding self clamping feature which obviates any clamp windings and enables efficient operation at high switching frequencies.

Referring to FIG. 4 there is shown a DC transformer circuit in which an input DC voltage is transformed into an output DC voltage using pair of primary switches in a half bridge circuit and a pair of secondary side switches. The circuit requires an input source of substantially DC voltage, a pair of input capacitors in a series arrangement, a pair of primary switches with intrinsic capacitor and diode elements, a pair of transformers each with a primary winding and at least one secondary winding, a pair of secondary switches each with intrinsic capacitor and diode elements, an output filter capacitor, and a load. For purposes of the operational state analysis, it is assumed that the input and output filter capacitors are sufficiently large that the voltages developed across the capacitors are approximately constant over a switching interval. Also, for purposes of the operational state analysis, it is assumed that the input DC voltage source has sufficiently low source impedance that the voltage developed across the input DC voltage source is approximately constant over a switching interval. It will be assumed that the parasitic capacitors that parallel the switches are small and their effects can be ignored, except during the brief switching transitions. It will be assumed that diodes are ideal and have no leakage and no forward voltage drop. It will also be assumed that the transformers are ideal, that the winding resistances are zero, and that the coupling between primary and secondary windings is perfect except during the brief switching transitions wherein the leakage inductance is small but finite and significant. In the figures the leakage inductance is not specifically indicated, but the reader should understand that no coupled magnetic has perfect coupling and the leakage inductance is a parasitic circuit element that plays a significant role in the operation of any coupled magnetic circuit element, particularly during the switching transitions. It will finally be assumed that the power switches are ideal; that is, lossless and able to carry current in either direction.

Structure

The structure of the circuit of the subject invention is shown in FIG. 4. A positive terminal of a DC input voltage source 100 is connected to a node 101. A negative terminal of source 100 is connected to a node 102. A first terminal of a capacitor 103 is connected to node 101. A second terminal of capacitor 103 is connected to a node 105. A first terminal of a capacitor 104 is connected to node 105. A second terminal of capacitor 104 is connected to node 102. A lead 106 is connected to node 101. The lead 106 is connected to a node 108. A lead 107 is connected to node 102. The lead 107 is connected to a node 109. A first terminal of a capacitor 110 is connected to node 108. A second terminal of capacitor 110 is connected to a node 113. A first terminal of a switch 111 is connected to node 108. A second terminal of switch 111 is connected to node 113. A cathode terminal of a diode 112 is connected to node 108. An anode terminal of diode 112 is connected to node 113. A first terminal of a capacitor 114 is connected to node 109. A second terminal of capacitor 114 is connected to a node 117. A first terminal of a switch 115 is connected to node 109. A second terminal of switch 115 is connected to node 117. An anode terminal of a diode 116 is connected to node 109. A cathode terminal of diode 116 is connected to node 117. A lead 118 is connected to node 113. Lead 118 is connected to a node 120. A lead 119 is connected to node 120 and to node 117. An undotted terminal of the primary winding of a transformer 121 is connected to node 105. A dotted terminal of the primary winding of the transformer 121 is connected to node 120. A dotted terminal of the primary winding of a transformer 122 is connected to node 105. An undotted terminal of the primary winding of the transformer 122 is connected to the node 120. A dotted terminal of the secondary winding of the transformer 121 is connected to a node 131. Node 131 is connected to the dotted terminal of the secondary winding of the transformer 122. The undotted terminal of the secondary winding of the transformer 121 is connected to a node 123. The undotted terminal of the secondary winding of the transformer 122 is connected to a node 134. A first terminal of a capacitor 128 is connected to the node 123. A second terminal of the capacitor 128 is connected to a node 127. A first terminal of a switch 129 is connected to node 123. A second terminal of the switch 129 is connected to the node 127. A cathode terminal of a diode 130 is connected to node 123. An anode terminal of diode 130 is connected to node 127. A first terminal of a capacitor 124 is connected to node 134. A second terminal of capacitor 124 is connected to node 127. A first terminal of a switch 125 is connected to node 134. A second terminal of switch 125 is connected to node 127. A cathode terminal of a diode 126 is connected to node 134. An anode terminal of diode 126 is connected to node 127. A first terminal of a capacitor 132 is connected to node 131. A second terminal of capacitor 132 is connected to node 127. A first terminal of a load 133 is connected to node 131. A second terminal of load 133 is connected to node 127.

Operation

Figure 6:
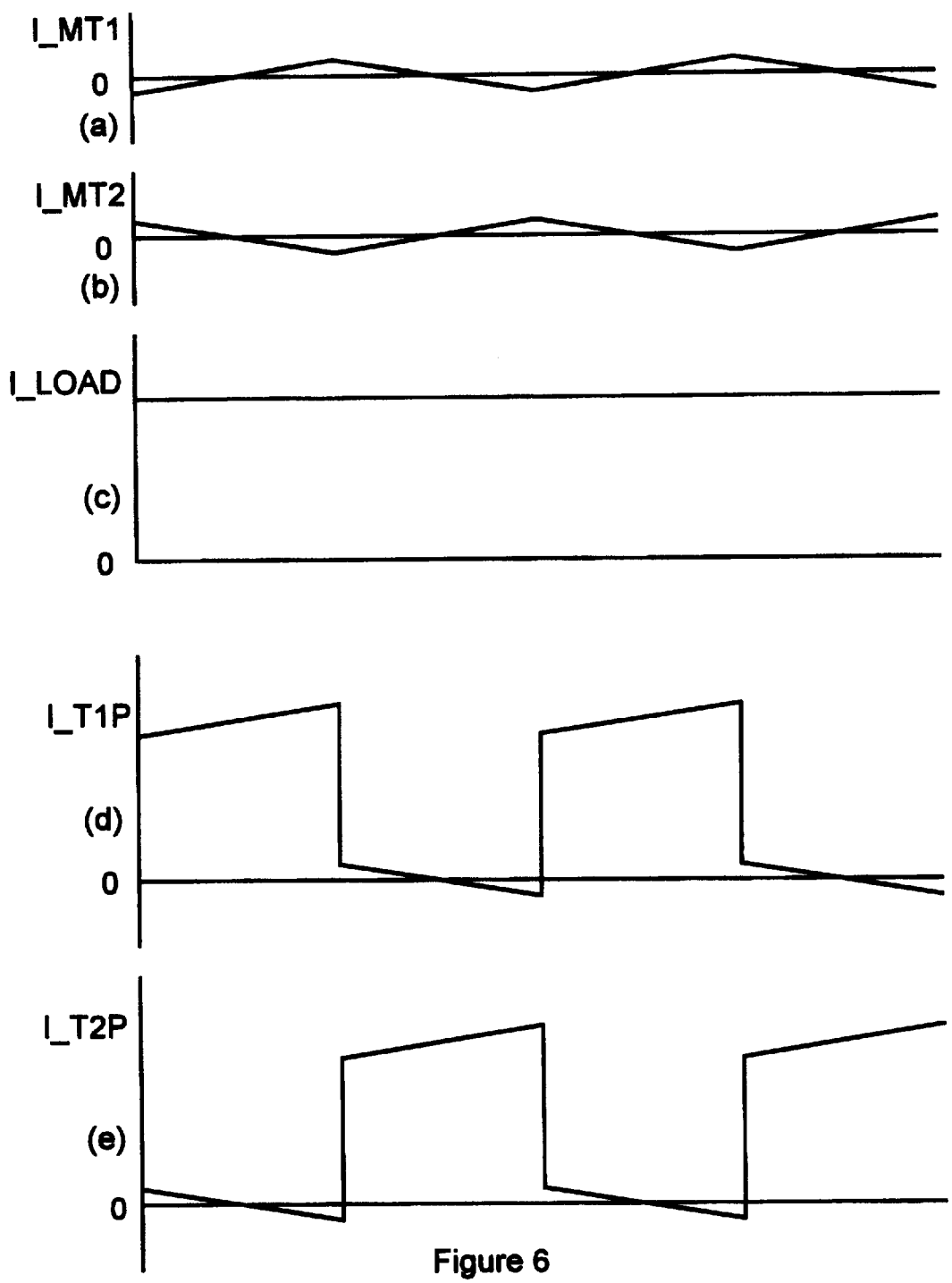
FIG. 6 illustrates the magnetizing and primary current wave forms of the two transformers of the FIG. 4 circuit and the load current wave form.
Figure 7:
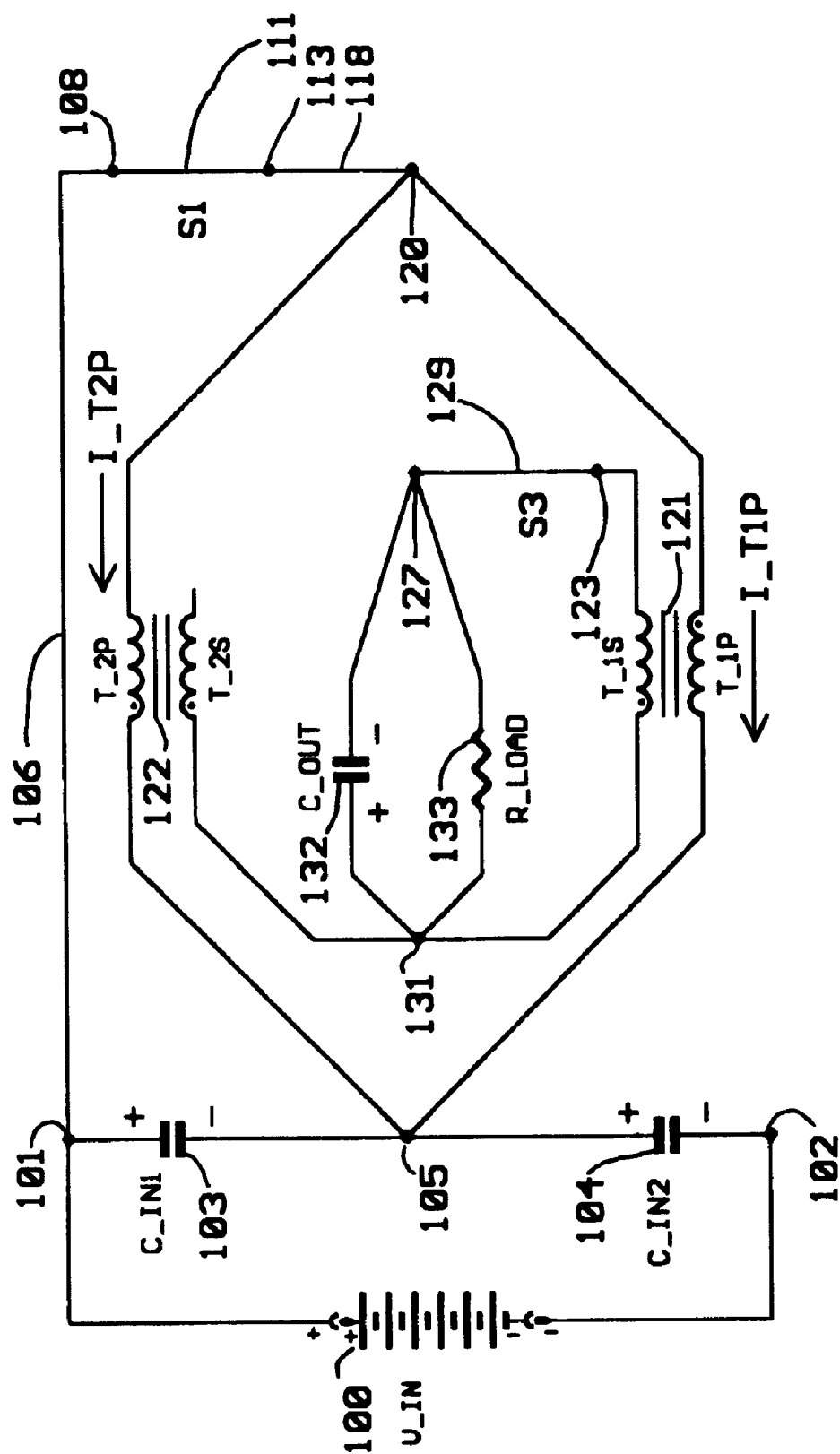
FIG. 7 illustrates an initial condition and a first active state just prior to a first transition of the FIG. 4 circuit.
Figure 8:
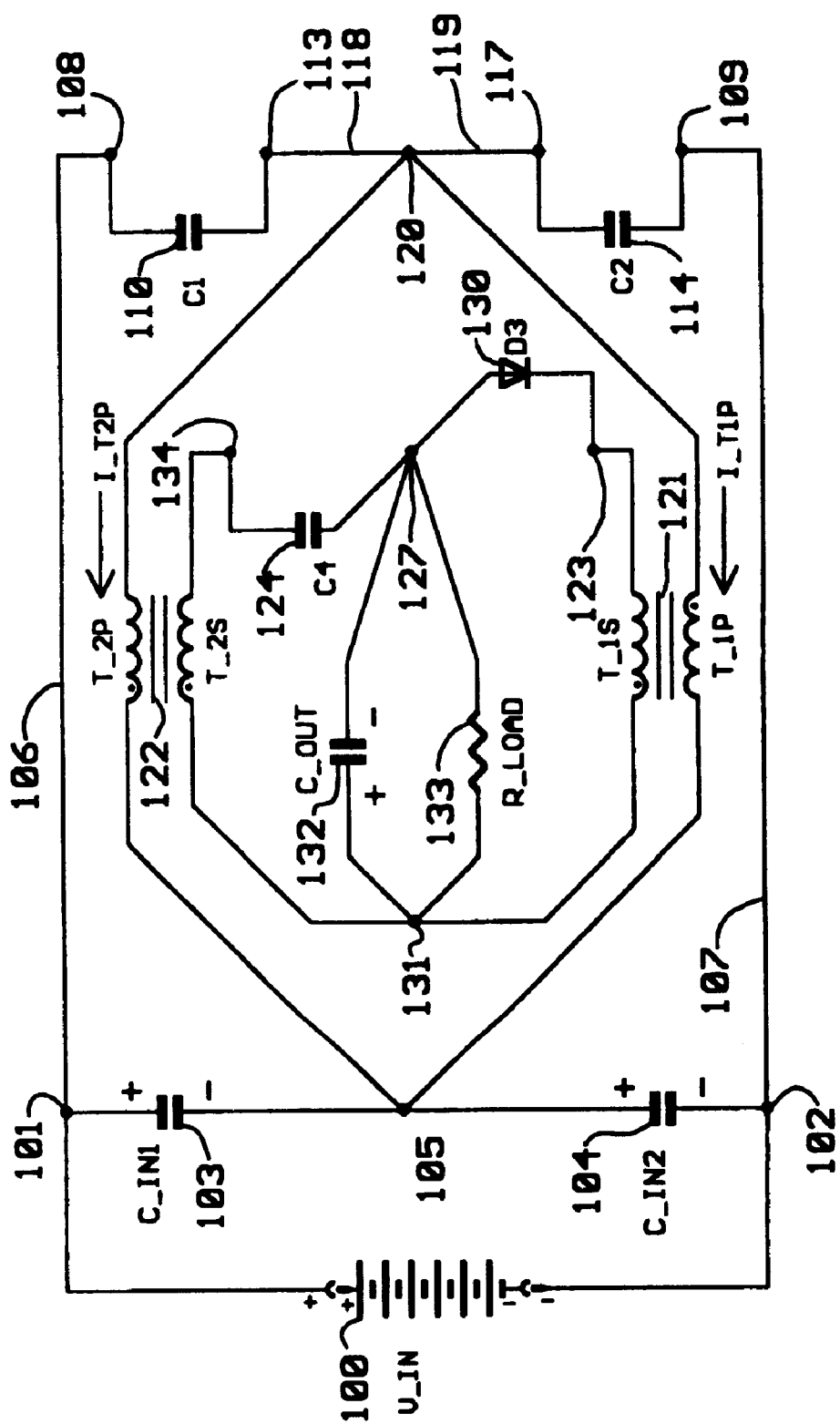
FIG. 8 illustrates a first phase of a first transition of the FIG. 4 circuit.
Figure 9:
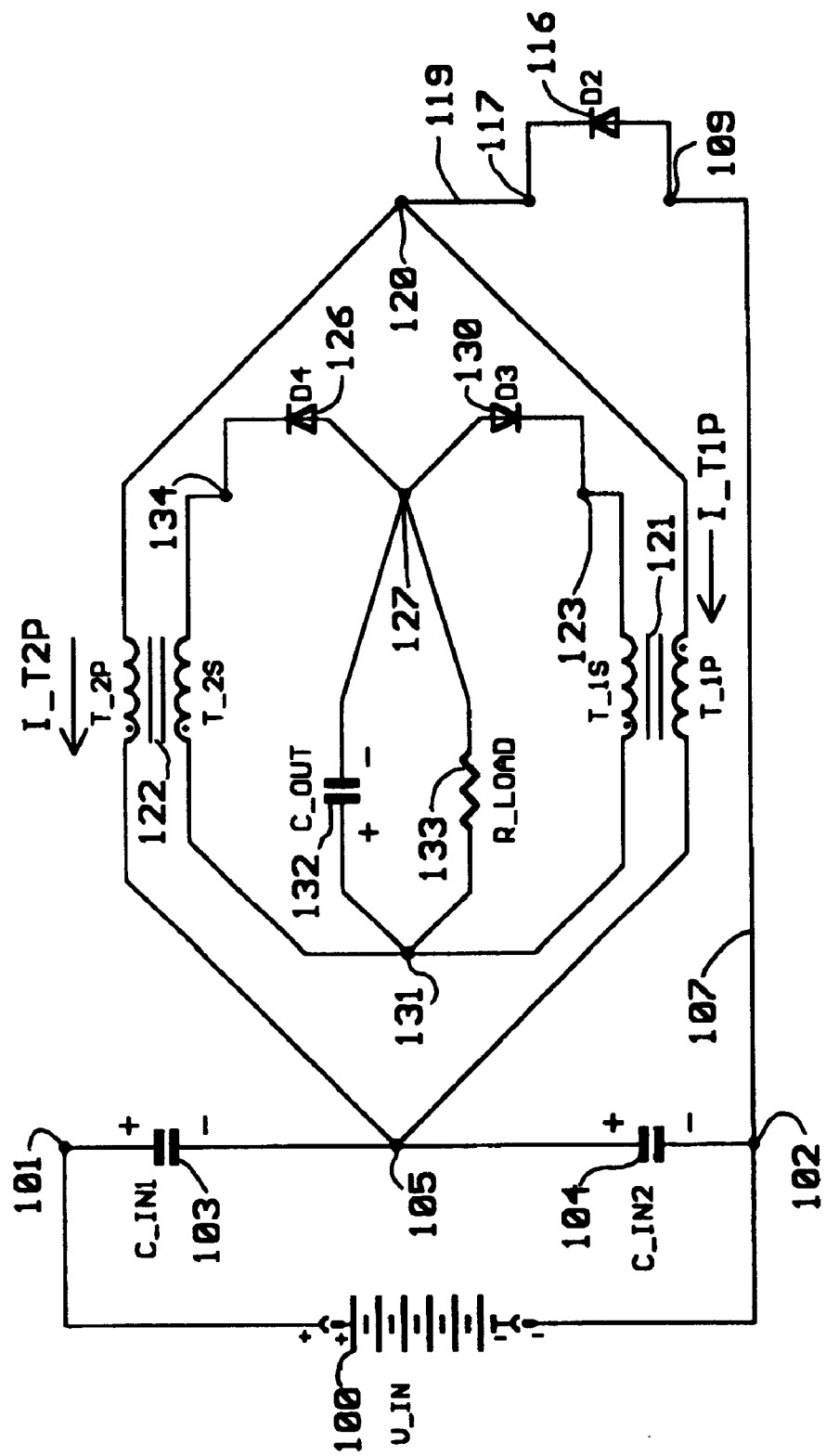
FIG. 9 illustrates a second phase of a first transition of the FIG. 4 circuit.
Figure 10:
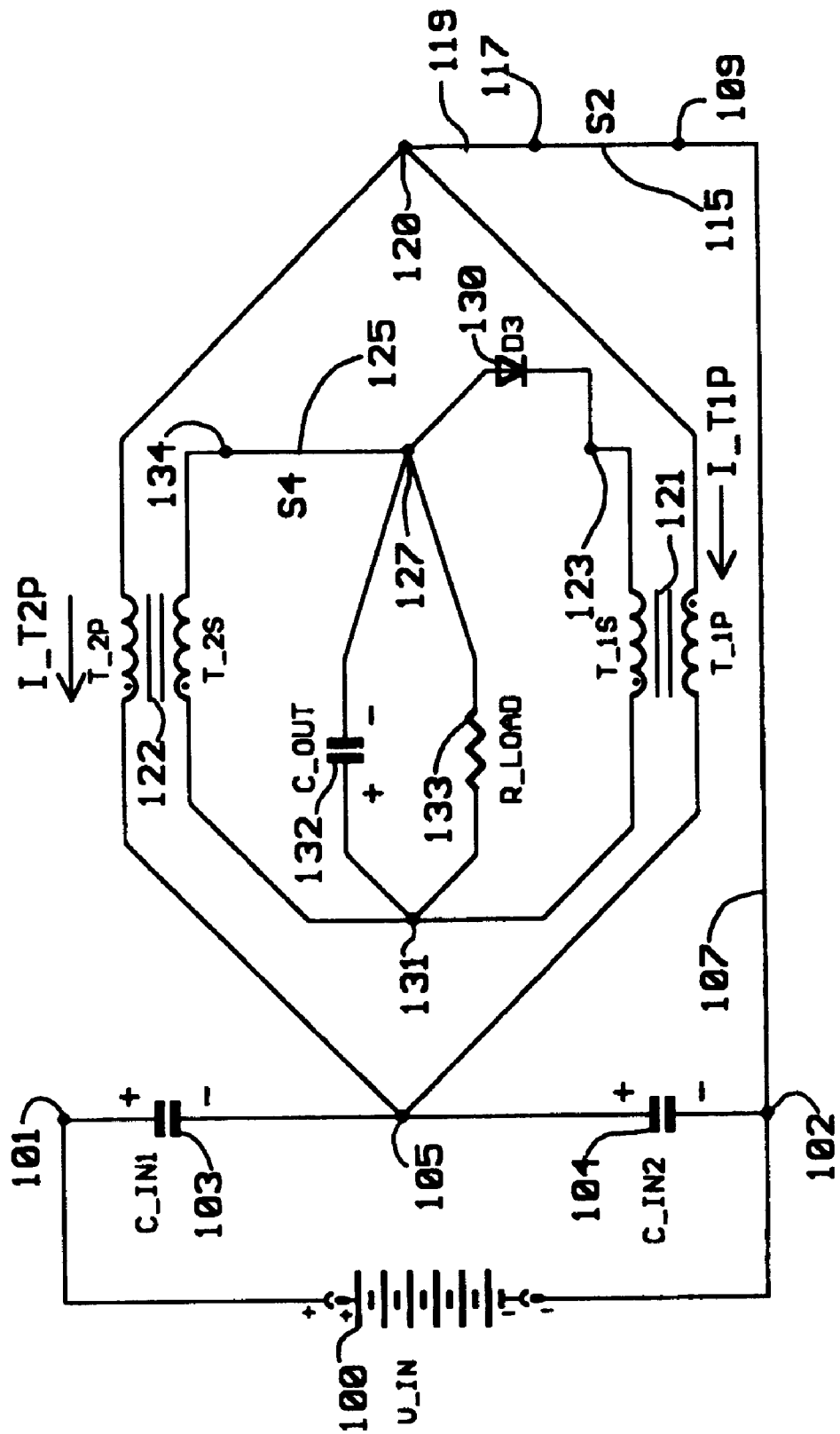
FIG. 10 illustrates a third phase of a first transition of the FIG. 4 circuit.
Figure 11:
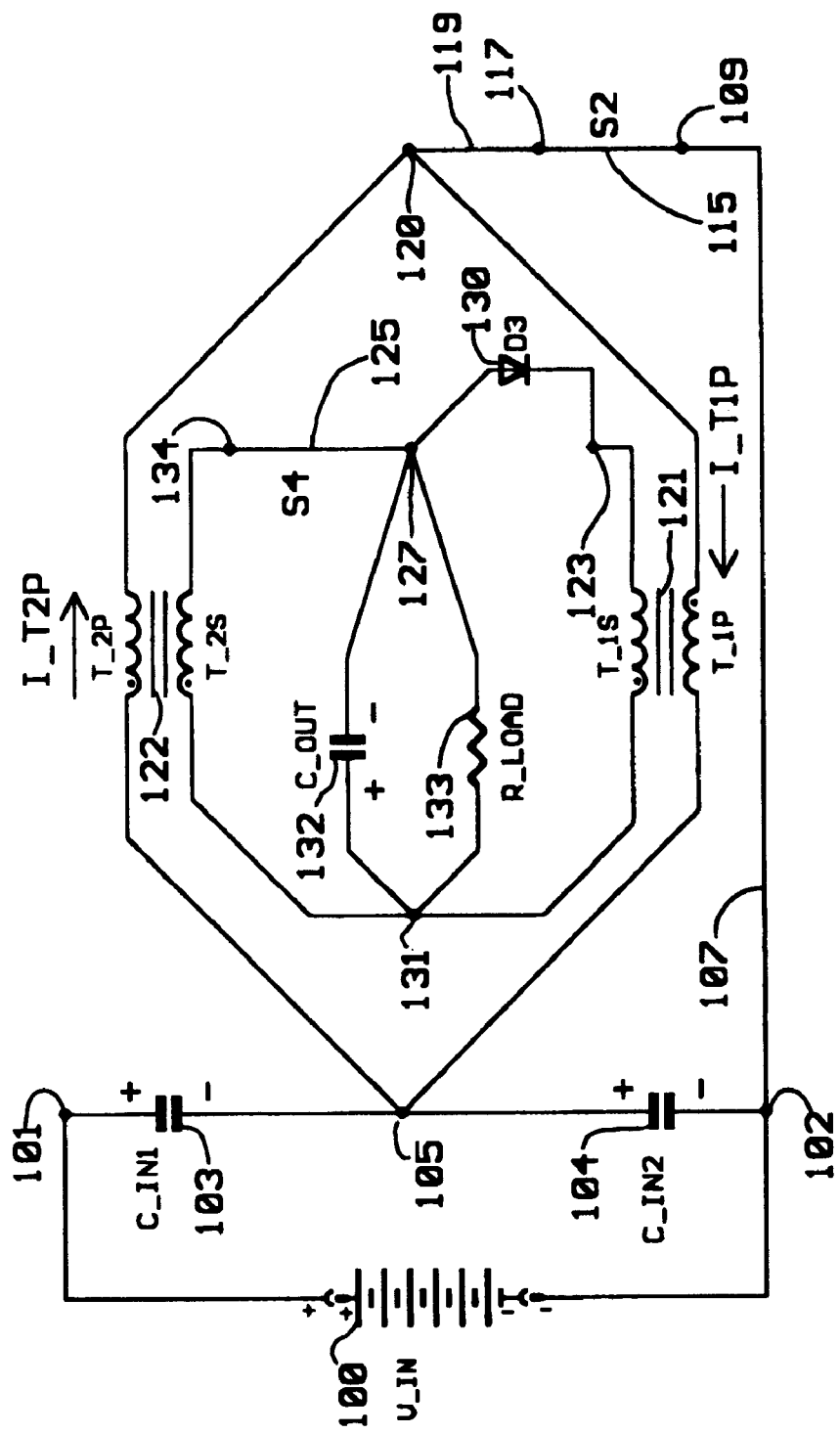
FIG. 11 illustrates a fourth phase of a first transition of the FIG. 4 circuit.
Figure 12:
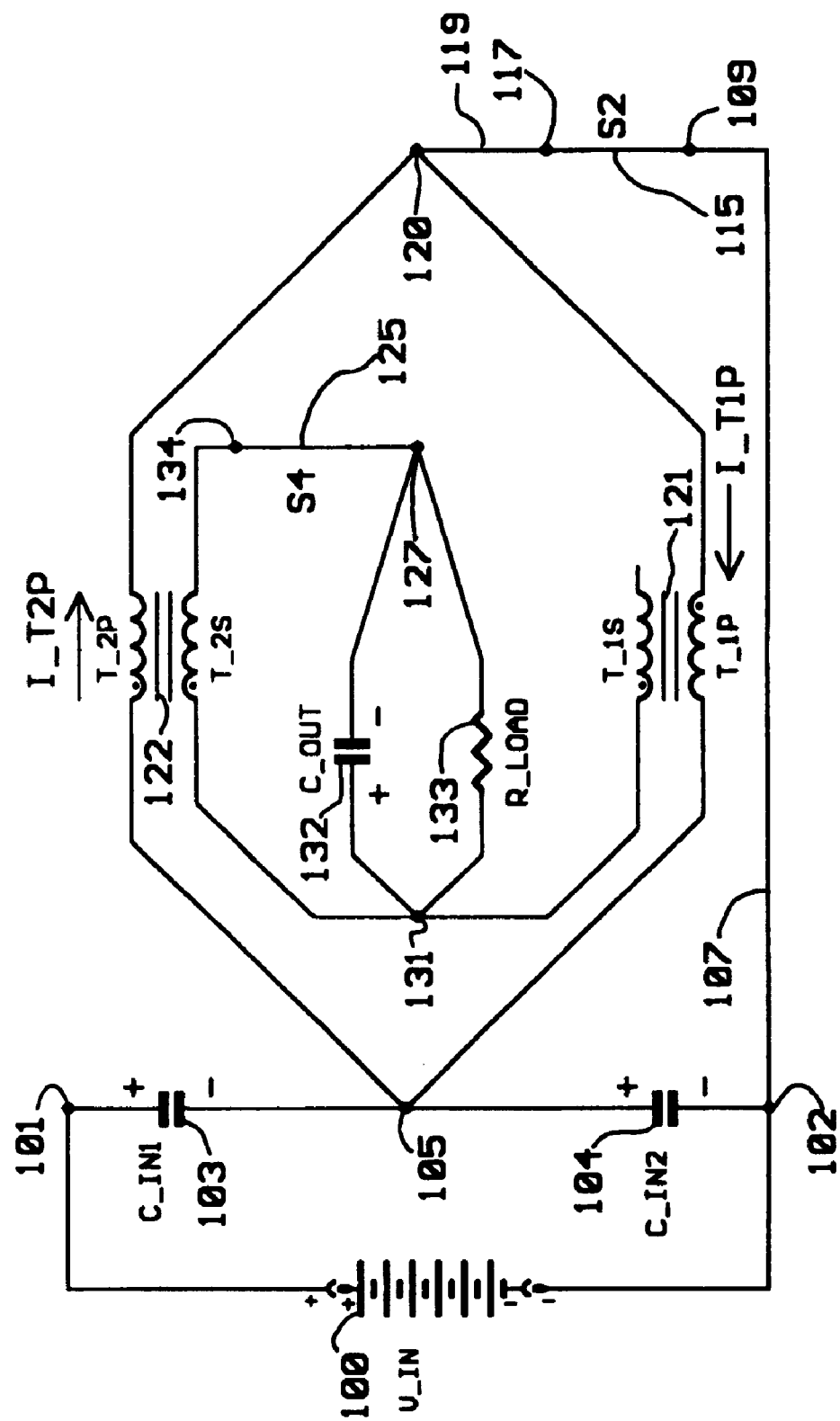
FIG. 12 illustrates a second active state of the FIG. 4 circuit.
Figure 13:
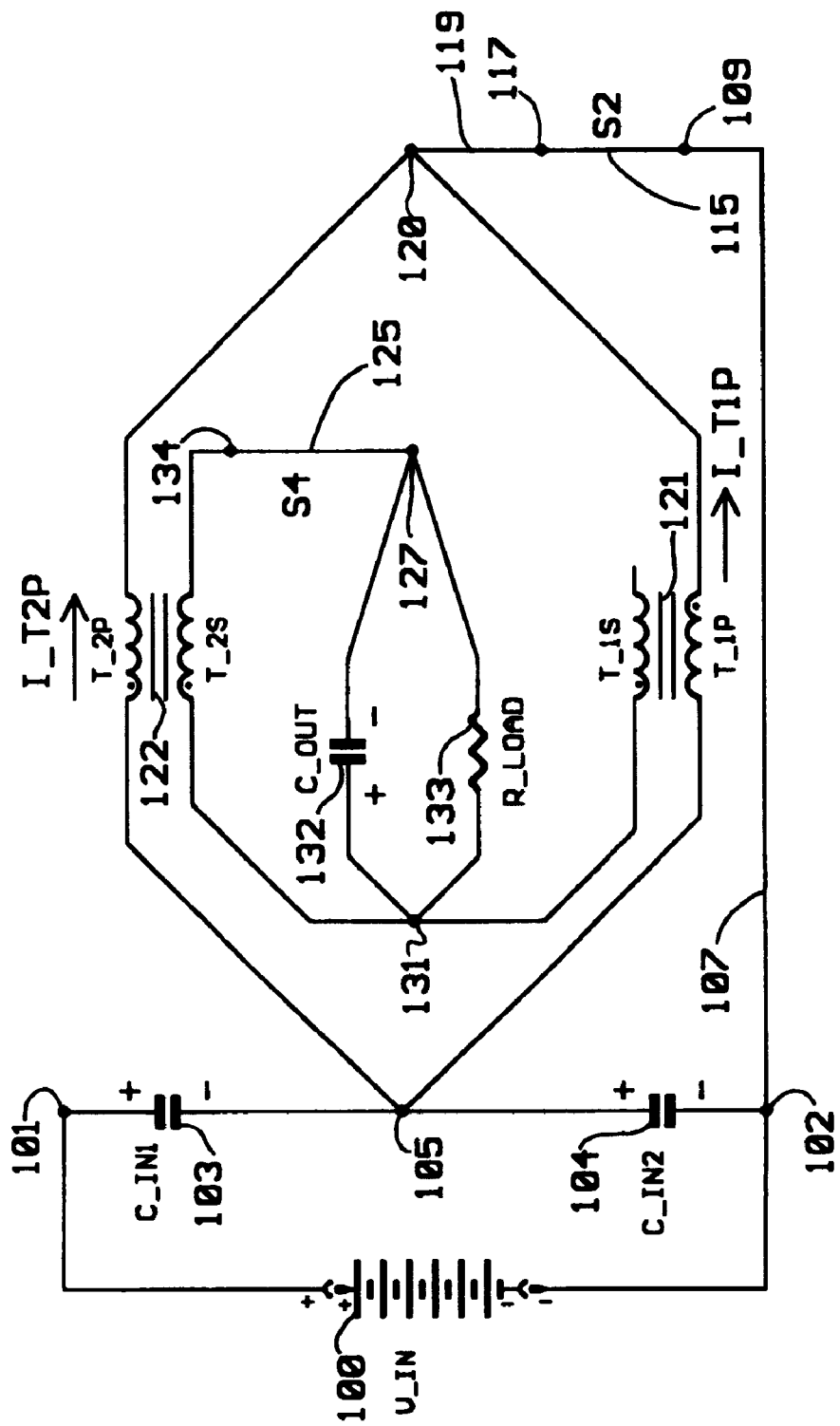
FIG. 13 also illustrates the second phase of the FIG. 4 circuit wherein the T1 transformer primary current has reversed direction.
Figure 14:
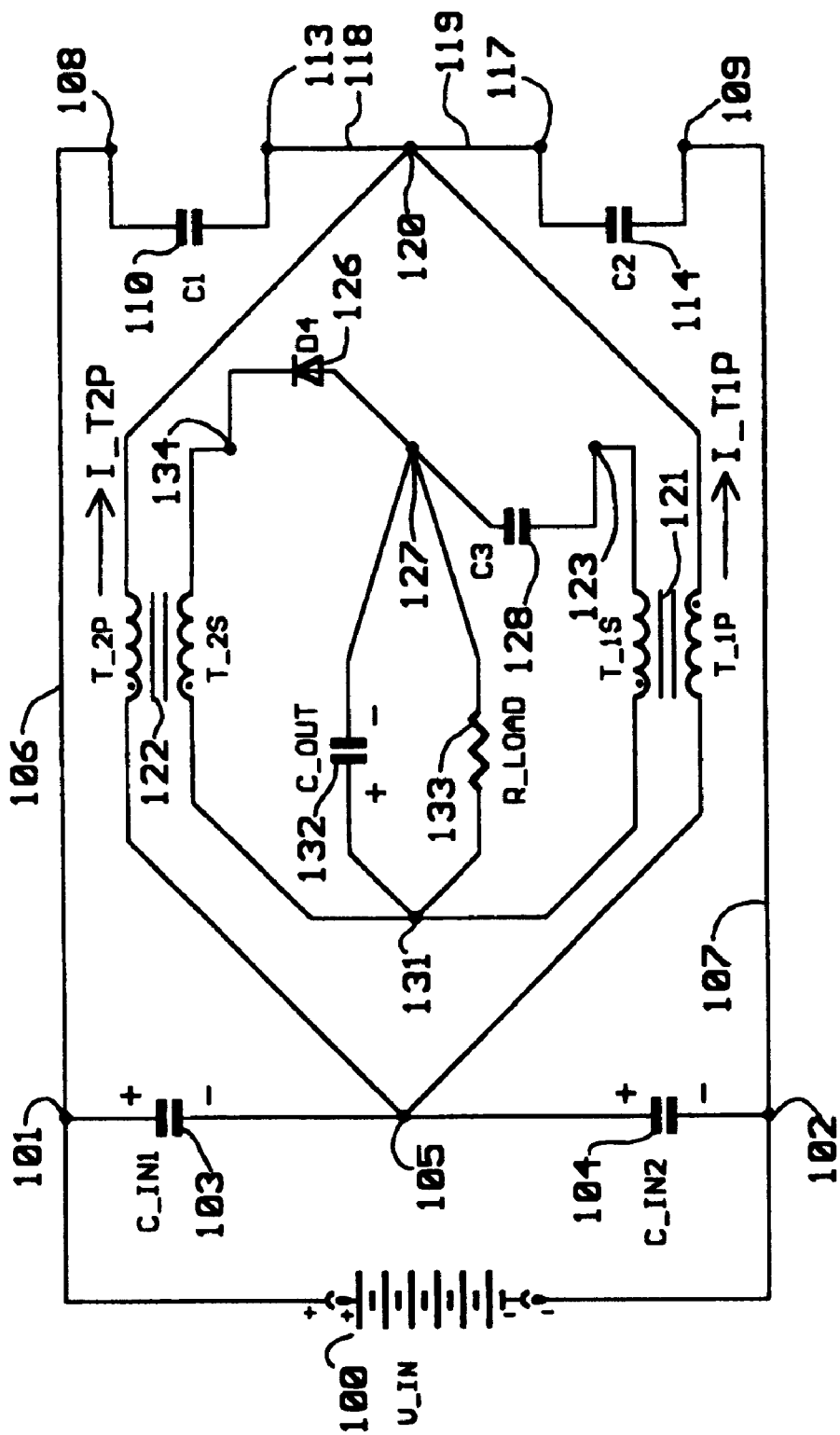
FIG. 14 illustrates a first phase of a second transition of the FIG. 4 circuit.
Figure 15:
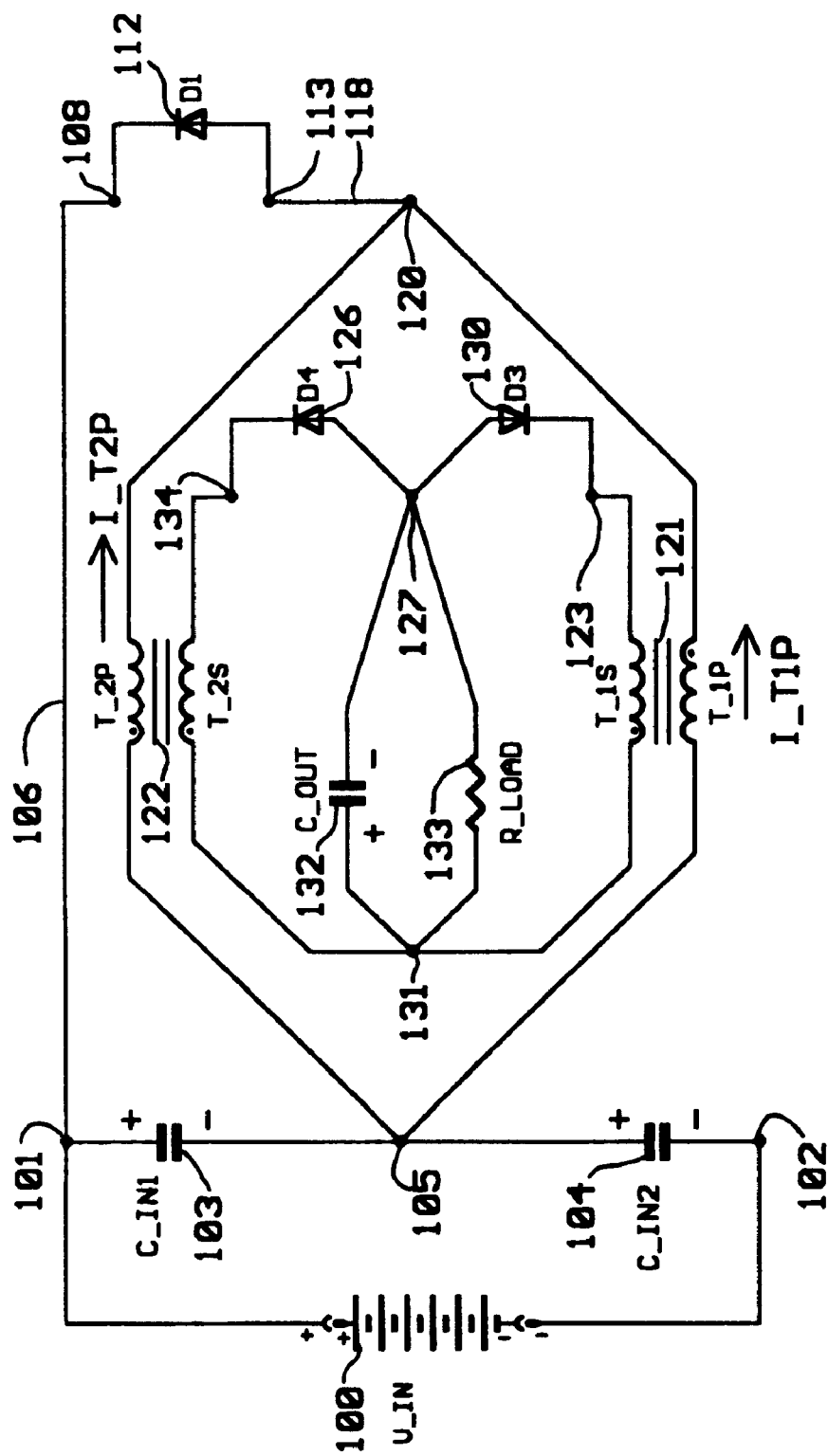
FIG. 15 illustrates a second phase of a second transition of the FIG. 4 circuit.
Figure 16:
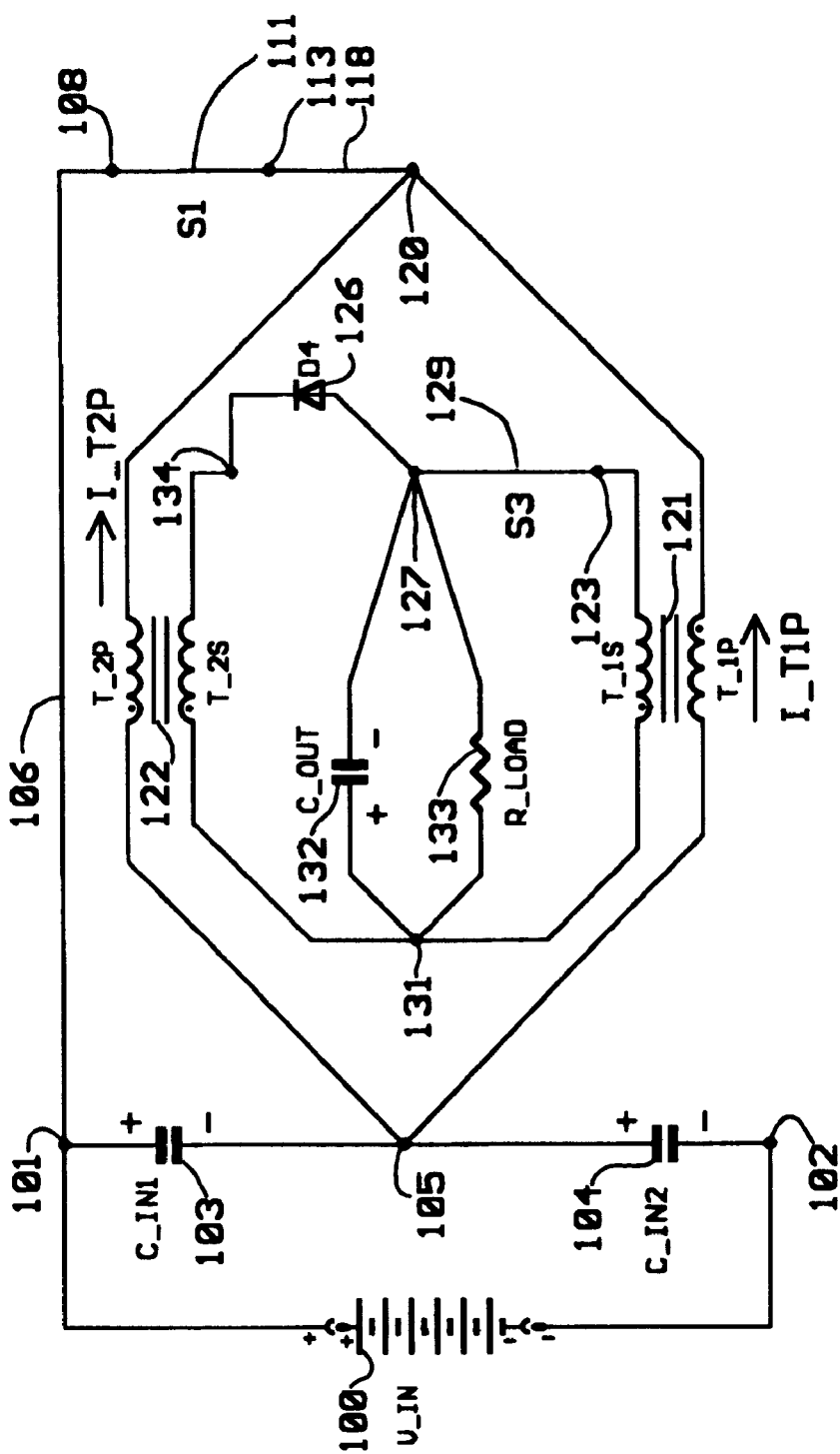
FIG. 16 illustrates a third phase of a second transition of the FIG. 4 circuit.
Figure 17:
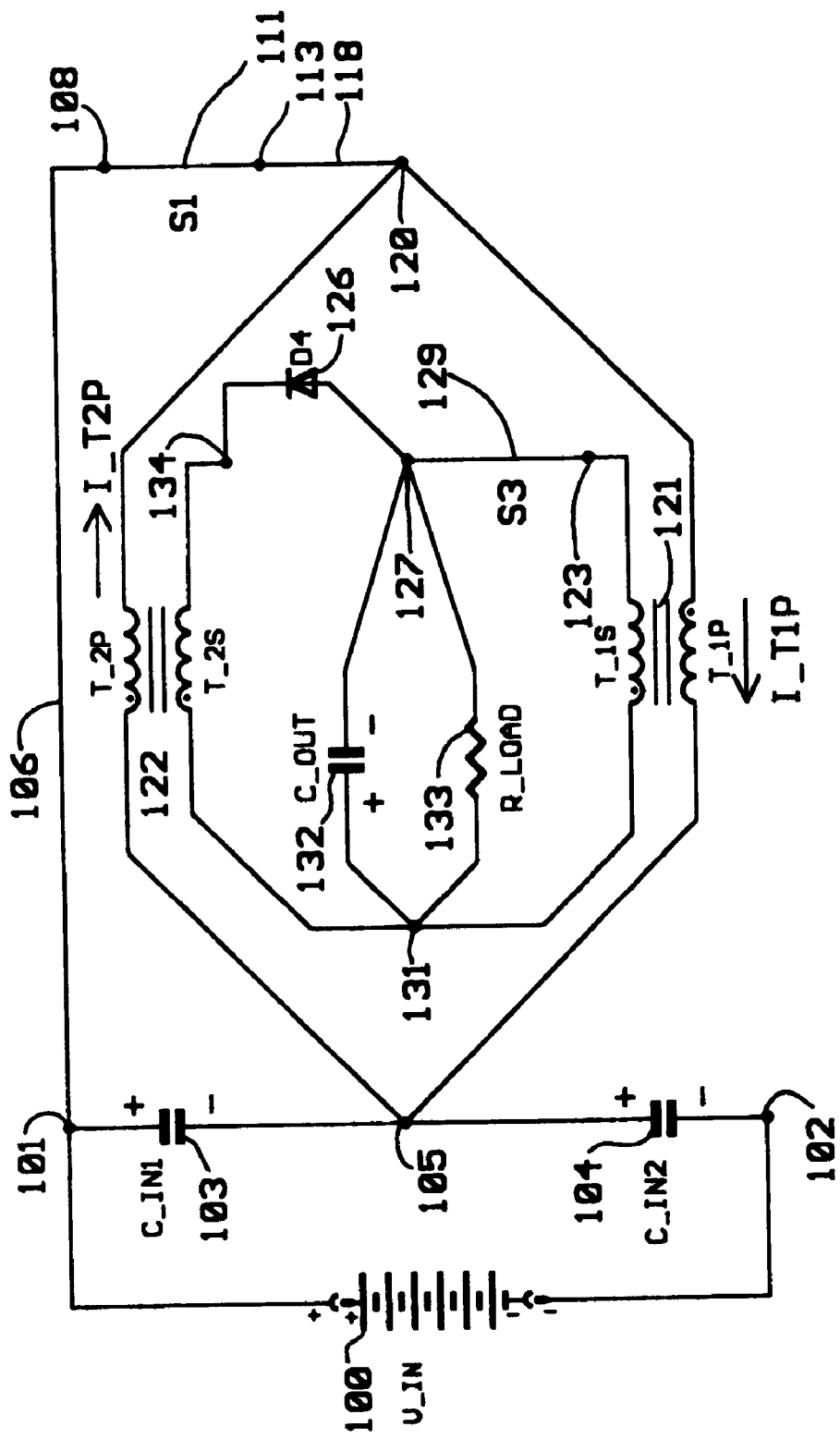
FIG. 17 illustrates a fourth phase of a second transition of the FIG. 4 circuit.
Figure 18:
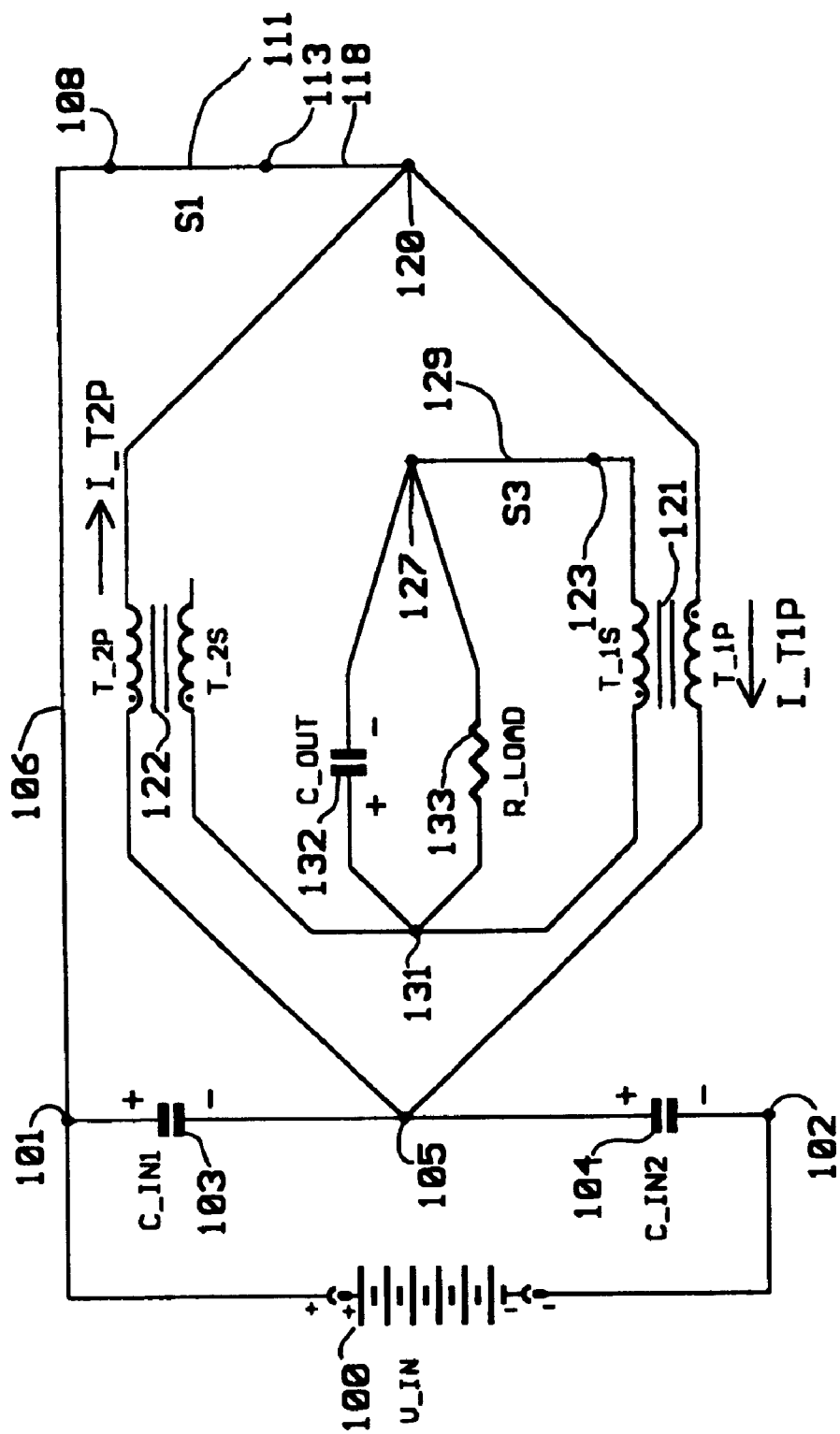
FIG. 18 illustrates the first active state just after the second transition of the FIG. 4 circuit.

It is assumed in this analysis that the system has reached a settled operating condition. Except for the short, but finite, switching intervals there are two active states of the circuit of FIG. 4. It is assumed that the two input capacitors 103 and 104 are equal in capacitance and that the applied voltage on each capacitor is exactly half of the DC source 100 voltage. Consider an initial condition as illustrated in FIG. 7. The initial condition represents a time near the end of a first active state just prior to a first switching transition. During the initial condition the switches 111 and 129 are on (closed) and the switches 115 and 125 are off (open). The currents in the primary windings of transformers 121 and 122 are both flowing from node 120 towards node 105. The voltage applied to the primary windings is exactly half of the source 100 voltage. The current in the primary winding of transformer 121 comprises the magnetizing current of the 121 transformer plus the induced load current from the secondary winding of the 121 transformer. The transformer 122 is uncoupled so that the current flowing in its primary winding is just its magnetizing current. The primary winding currents of transformers 121 and 122 are illustrated in FIGS. 6d and 6e, respectively. The magnetizing currents of transformers 121 and 122 are illustrated in FIGS. 6a and 6b, respectively. The switch currents are illustrated in FIGS. 5a through 5d. At a time determined by the control circuit switches 111 and 129 are turned off (opened), as illustrated in FIG. 8. When the switch 111 is turned off its current is diverted into its intrinsic parallel capacitor 110. When the 129 switch is turned off the leakage inductance associated with the 121 transformer forces the switch current into its parallel intrinsic diode 130. At the same time the voltage at the node 120 begins to fall charging capacitor 110 and discharging capacitor 114. At the same time the voltages on the windings of the 122 transformer are changing such that the undotted terminals of the 122 transformer windings are becoming more negative which causes the capacitor 124 to be discharged. The voltage at the node 120 continues to fall until the diode 116 becomes forward biased clamping the voltage on the primary windings of the transformers 121 and 122, as illustrated in FIG. 9. At the same time that the diode 116 becomes forward biased the diode 126 becomes forward biased. The current in the secondary winding of the 121 transformer is maintained by its leakage inductance but falls rapidly. Shortly after diodes 116 and 126 begin to conduct the switches 115 and 125 are turned on (closed) at zero voltage, as illustrated in FIG. 10. During this time the load current continues to fall in the secondary winding of transformer 121 and the load current shifts from the 121 transformer to the 122 transformer. As the load current shifts the current in the primary winding of the 122 transformer changes sign, as illustrated in FIG. 11. Soon after the switches 115 and 125 are turned on the secondary winding current in the 121 transformer drops to zero and the diode 130 becomes reverse biased and turns off, as illustrated in FIG. 12. FIG. 12 represents a second active state of the DC transformer circuit in which the 122 transformer is coupled and the 121 transformer is uncoupled. At the beginning of the second active state the capacitor 128 is quickly charged. During the second active state the magnetizing current in each transformer changes sign but the total primary current of the 122 transformer does not change sign because the primary current of the 122 transformer includes both the magnetizing current and the reflected load current since it is coupled to the load. The total primary current of the 121 transformer is just the magnetizing current of the transformer 121. The primary current of the transformer 121 changes sign during the second active state, as illustrated in FIG. 13. At a time determined by the control circuit the switches 115 and 125 are turned off (opened) as illustrated in FIG. 14. When the switches 115 and 125 are switched off the current in the 115 switch is diverted into the 114 capacitor and the current in the 125 switch is diverted into the 126 diode due to the action of the 122 transformer leakage inductance. The current diverted from the 115 switch charges the 114 capacitor and discharges the 110 capacitor. At the same time the 128 capacitor is being discharged as the voltage at the undotted terminals of the 121 transformer falls with respect to the voltage at the dotted terminals of the 121 transformer. The voltage at the node 120 continues to rise until the diode 112 becomes forward biased. At the same time the diode 130 becomes forward biased, as illustrated in FIG. 15. Shortly after the diodes 112 and 130 become forward biased the switches 111 and 129 are turned on at zero voltage, as illustrated in FIG. 16. During this transition the current in the secondary winding of the transformer 122 is falling rapidly but is maintained by the leakage inductance of the 122 transformer. The load current transfers from the 122 transformer to the 121 transformer. The load current in the 121 transformer causes its primary current to change directions as illustrated in FIG. 17. As the load current continues to shift from transformer 122 to transformer 121 the current in the diode 126 drops to zero and becomes reverse biased, as illustrated in FIG. 18. FIG. 18 represents the beginning of the first active state. During the first active state the 121 transformer is coupled and the 122 transformer is uncoupled. At the beginning of the first active state the capacitor 124 charges up quickly. During this state the magnetizing current in the 122 transformer drops towards zero and reverses sign, as illustrated in FIG. 7, which is the initial condition. A complete cycle of operation has now been described and the process described is repeated indefinitely. During the complete cycle of operation the length of time spent in each of the two active states is identical and the transition times from the first active state to the second active state is very small by comparison to the time interval of the active states and identical to the transition time from the second active state to the first active state.

The load voltage obtained in the FIG. 4 circuit is simply one half of the DC input voltage multiplied by the ratio of the secondary turns to the primary turns of the transformers, which are assumed to be identical in all respects.

$$V_{OUT} = \frac{1}{2} \frac{N_{SEC}}{N_{PRI}} V_{IN},$$

where $V_{OUT}$ is the load voltage, $V_{IN}$ is the input DC source voltage, $N_{SEC}$ is the number of secondary winding turns, and $N_{PRI}$ is the number of primary winding turns.

Related Embodiments

Figure 19:
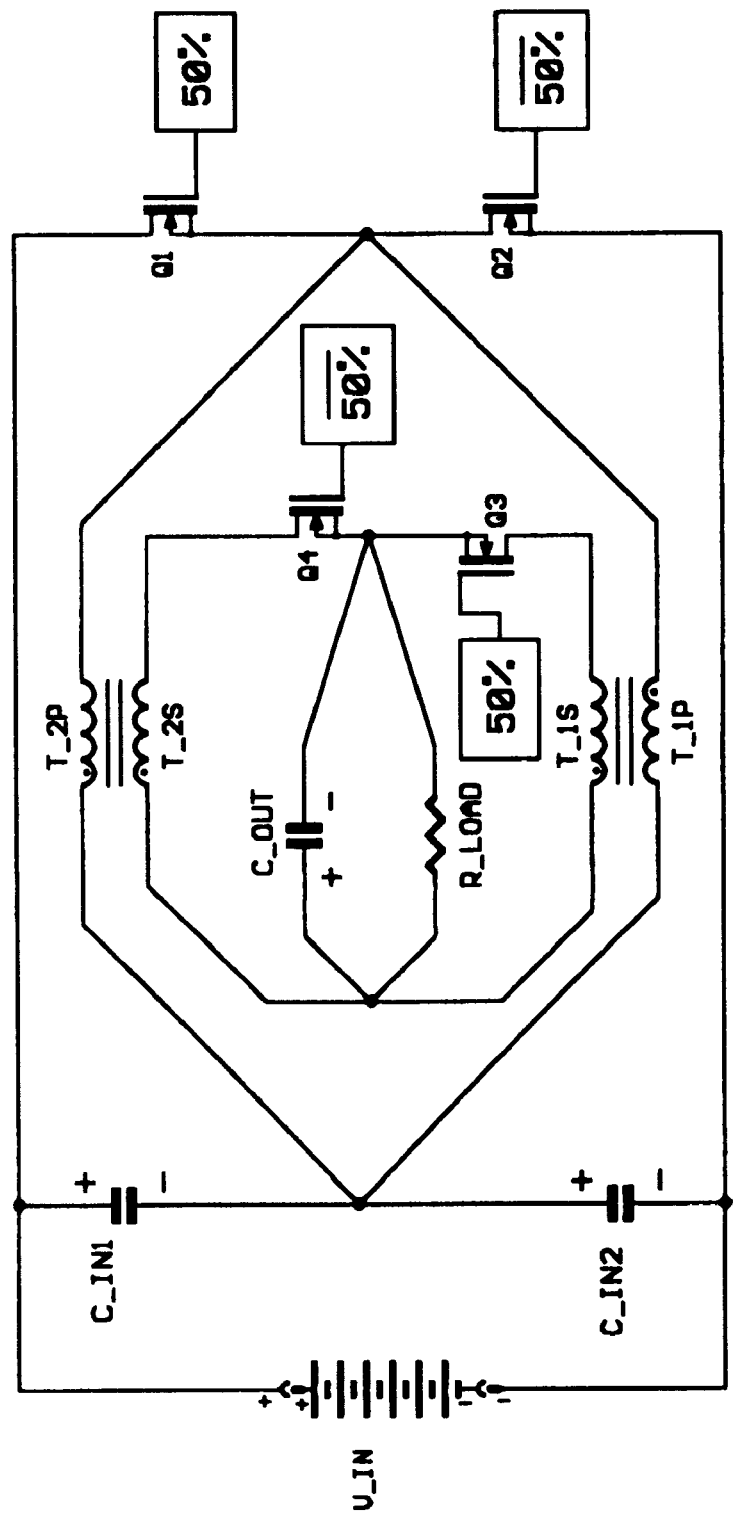
FIG. 19 illustrates an embodiment of the FIG. 4 circuit in which all the switches are implemented with power mosfets.

FIG. 19 illustrates another embodiment of the FIG. 4 circuit in which the switches are implemented with power mosfets.

Figure 20:
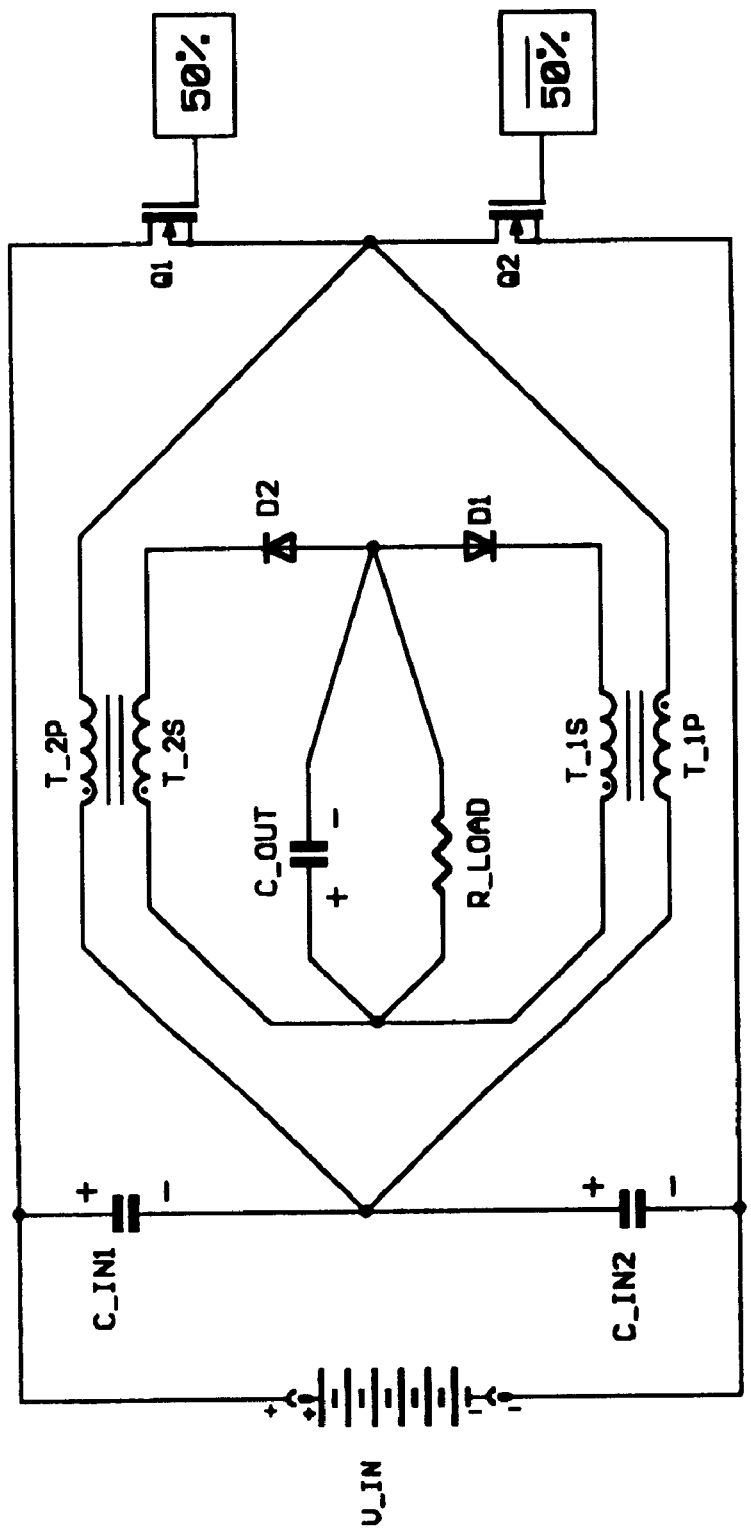
FIG. 20 illustrates an embodiment of the FIG. 4 circuit in which the two primary switches are implemented with power mosfets and the two secondary switches are implemented with diodes.

FIG. 20 illustrates another embodiment of the FIG. 4 circuit in which the secondary switches are implemented with rectifier diodes.

Figure 21:
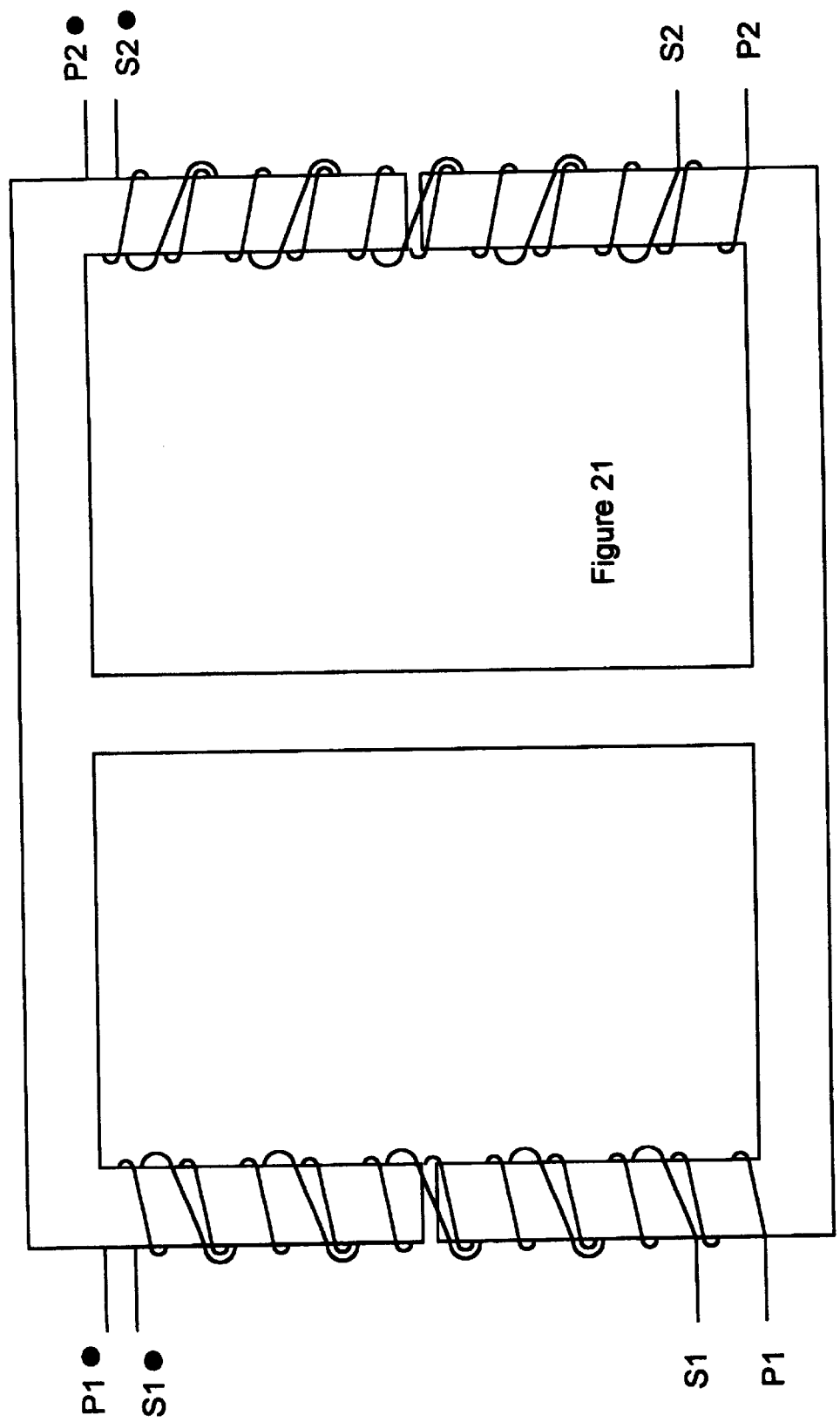
FIG. 21 illustrates a magnetic circuit element construction in which two transformers are implemented on a single E core.
Figure 22:
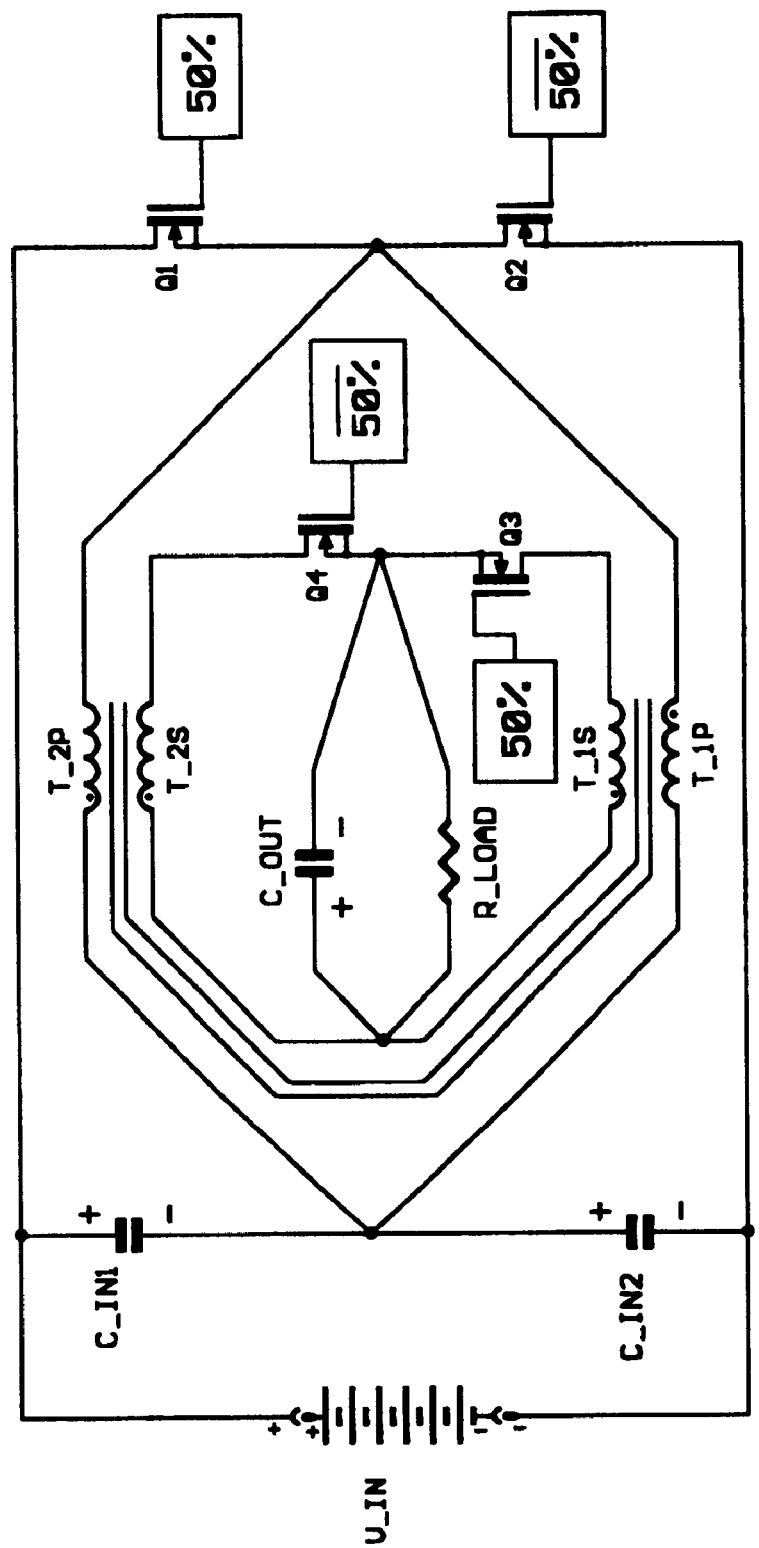
FIG. 22 illustrates an embodiment of the FIG. 4 circuit in which the two transformers are implemented using the magnetic circuit element construction illustrated in FIG. 21.

FIG. 21 illustrates a transformer construction in which the two transformers are integrated onto a single E core. The two outer legs of the E core contain the transformer windings and the center leg of the E core serves as common flux return path for each outer leg. Notice also that the outer legs contain small gaps that provides additional magnetic energy useful for driving the zero voltage switching transitions. The small air gaps also provide a degree of protection against core staircase saturation in case the circuit is slightly off balance by enabling the core to tolerate some DC flux. FIG. 22 illustrates an embodiment of the subject invention using the transformer construction illustrated in FIG. 21.

Structure

Figure 23:
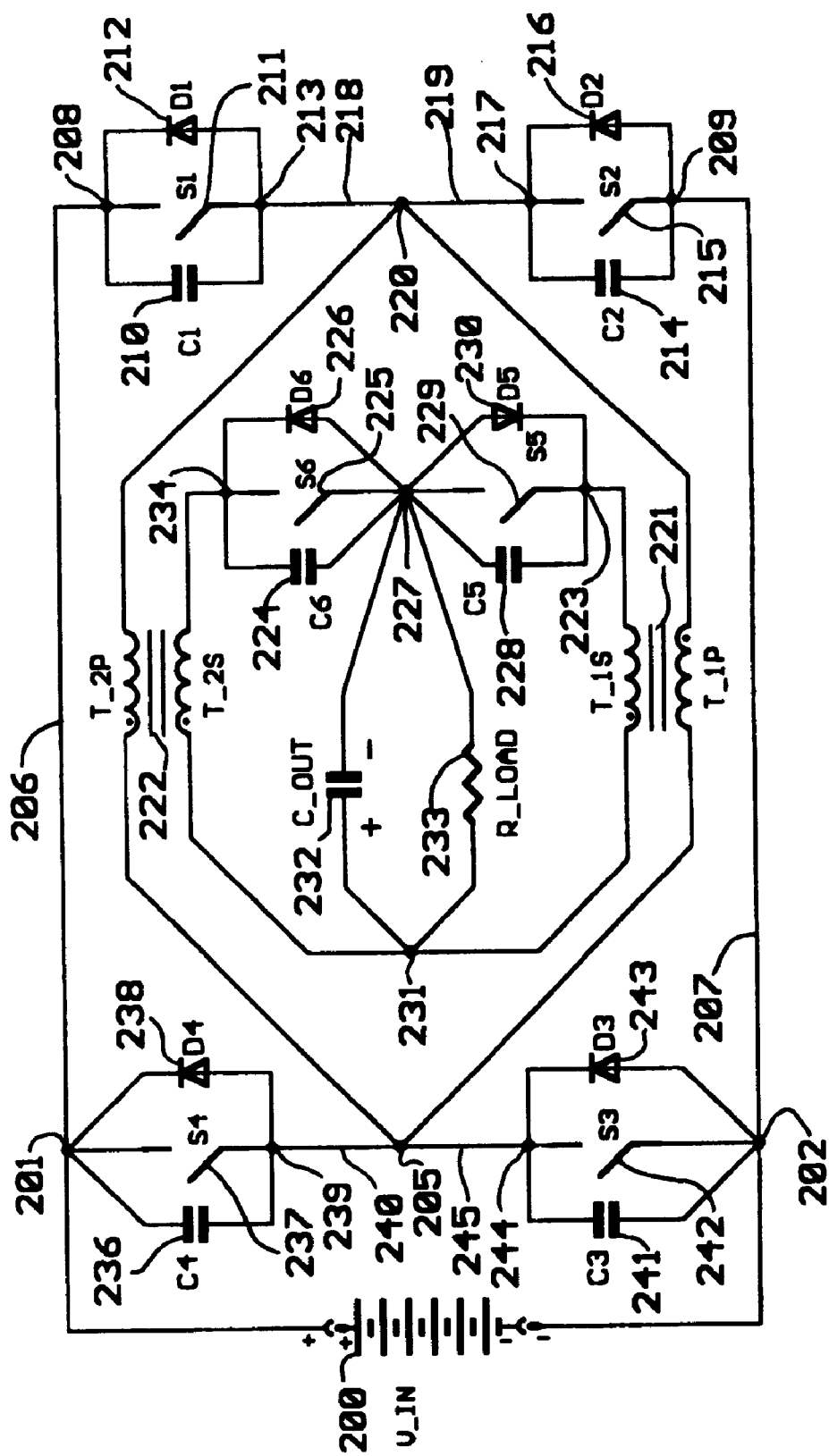
FIG. 23 illustrates a DC transformer according to the subject invention using two self clamping transformers in a full bridge arrangement.
Figure 24:
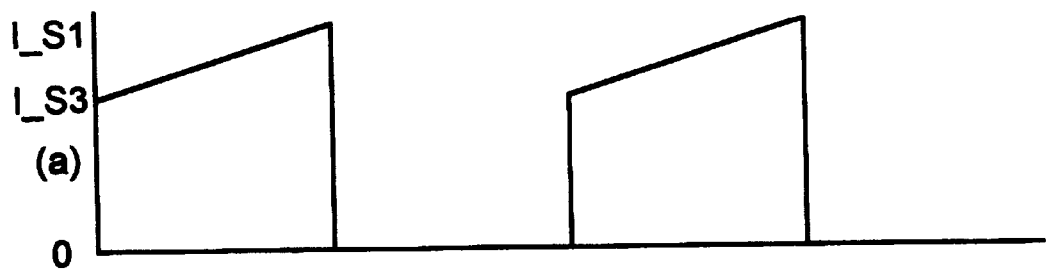
FIG. 24 illustrates the switch current wave forms of the FIG. 23 circuit.
Figure 24:
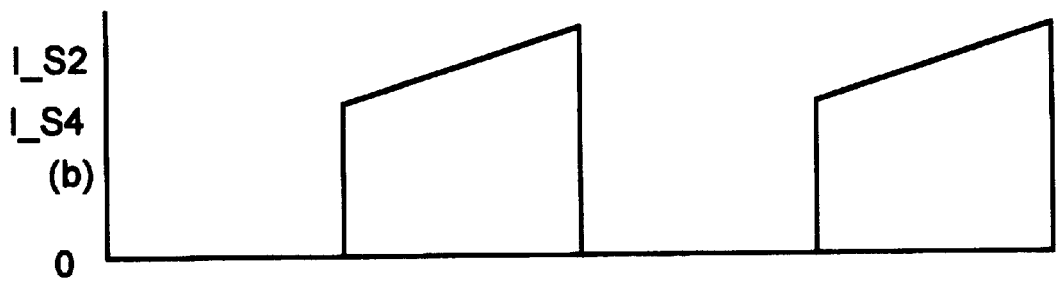
Figure 24:
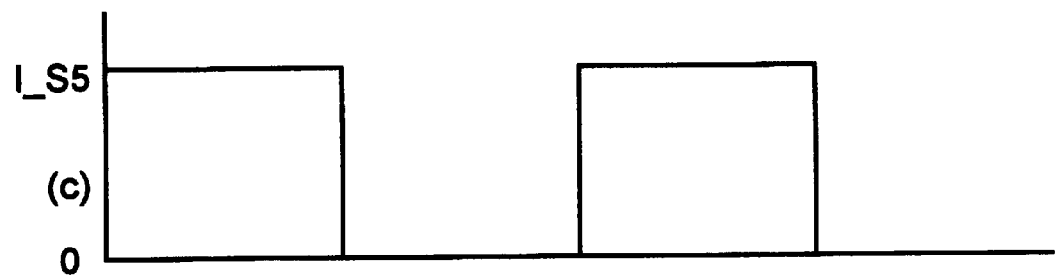
Figure 24:
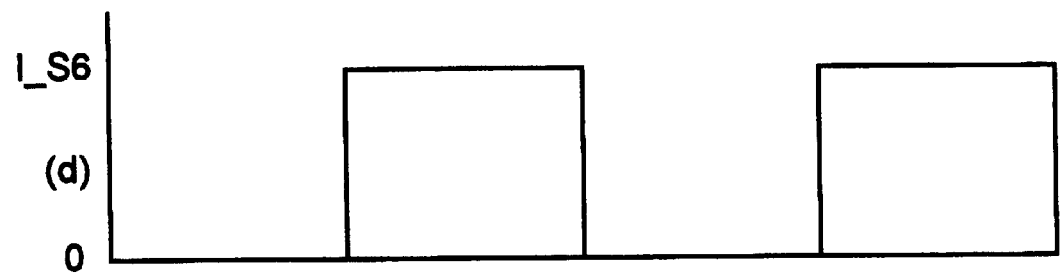

The structure of the circuit of the subject invention is shown in FIG. 23. A positive terminal of a DC input voltage source 200 is connected to a node 201. A negative terminal of source 200 is connected to a node 202. A first terminal of a capacitor 236 is connected to node 201. A second terminal of capacitor 236 is connected to a node 239. A first terminal of a switch 237 is connected to node 201. A second terminal of switch 237 is connected to node 239. A cathode terminal of a diode 238 is connected to node 201. An anode terminal of diode 238 is connected to node 239. A lead 240 is connected to node 239 and to a node 205. A first terminal of a capacitor 241 is connected to node 202. A second terminal of capacitor 241 is connected to a node 244. A first terminal of a switch 242 is connected to node 202. A second terminal of switch 242 is connected to node 244. An anode terminal of a diode 243 is connected to node 202. A cathode terminal of diode 243 is connected to node 244. A lead 245 is connected to node 244 and to node 205. A lead 206 is connected to node 201. The lead 206 is connected to a node 208. A lead 207 is connected to node 202. The lead 207 is connected to a node 209. A first terminal of a capacitor 210 is connected to node 208. A second terminal of capacitor 210 is connected to a node 213. A first terminal of a switch 211 is connected to node 208. A second terminal of switch 211 is connected to node 213. A cathode terminal of a diode 212 is connected to node 208. An anode terminal of diode 212 is connected to node 213. A first terminal of a capacitor 214 is connected to node 209. A second terminal of capacitor 214 is connected to a node 217. A first terminal of a switch 215 is connected to node 209. A second terminal of switch 215 is connected to node 217. An anode terminal of a diode 216 is connected to node 209. A cathode terminal of diode 216 is connected to node 217. A lead 218 is connected to node 213. Lead 218 is connected to a node 220. A lead 219 is connected to node 220 and to node 217. An undotted terminal of the primary winding of a transformer 221 is connected to node 205. A dotted terminal of the primary winding of the transformer 221 is connected to node 220. A dotted terminal of the primary winding of a transformer 222 is connected to node 205. An undotted terminal of the primary winding of the transformer 222 is connected to the node 220. A dotted terminal of the secondary winding of the transformer 221 is connected to a node 231. Node 231 is connected to the dotted terminal of the secondary winding of the transformer 222. The undotted terminal of the secondary winding of the transformer 221 is connected to a node 223. The undotted terminal of the secondary winding of the transformer 222 is connected to a node 234. A first terminal of a capacitor 228 is connected to the node 223. A second terminal of the capacitor 228 is connected to a node 227. A first terminal of a switch 229 is connected to node 223. A second terminal of the switch 229 is connected to the node 227. A cathode terminal of a diode 230 is connected to node 223. An anode terminal of diode 230 is connected to node 227. A first terminal of a capacitor 224 is connected to node 234. A second terminal of capacitor 224 is connected to node 227. A first terminal of a switch 225 is connected to node 234. A second terminal of switch 225 is connected to node 227. A cathode terminal of a diode 226 is connected to node 234. An anode terminal of diode 226 is connected to node 227. A first terminal of a capacitor 232 is connected to node 231. A second terminal of capacitor 232 is connected to node 227. A first terminal of a load 233 is connected to node 231. A second terminal of load 233 is connected to node 227.

Operation

Figure 25:
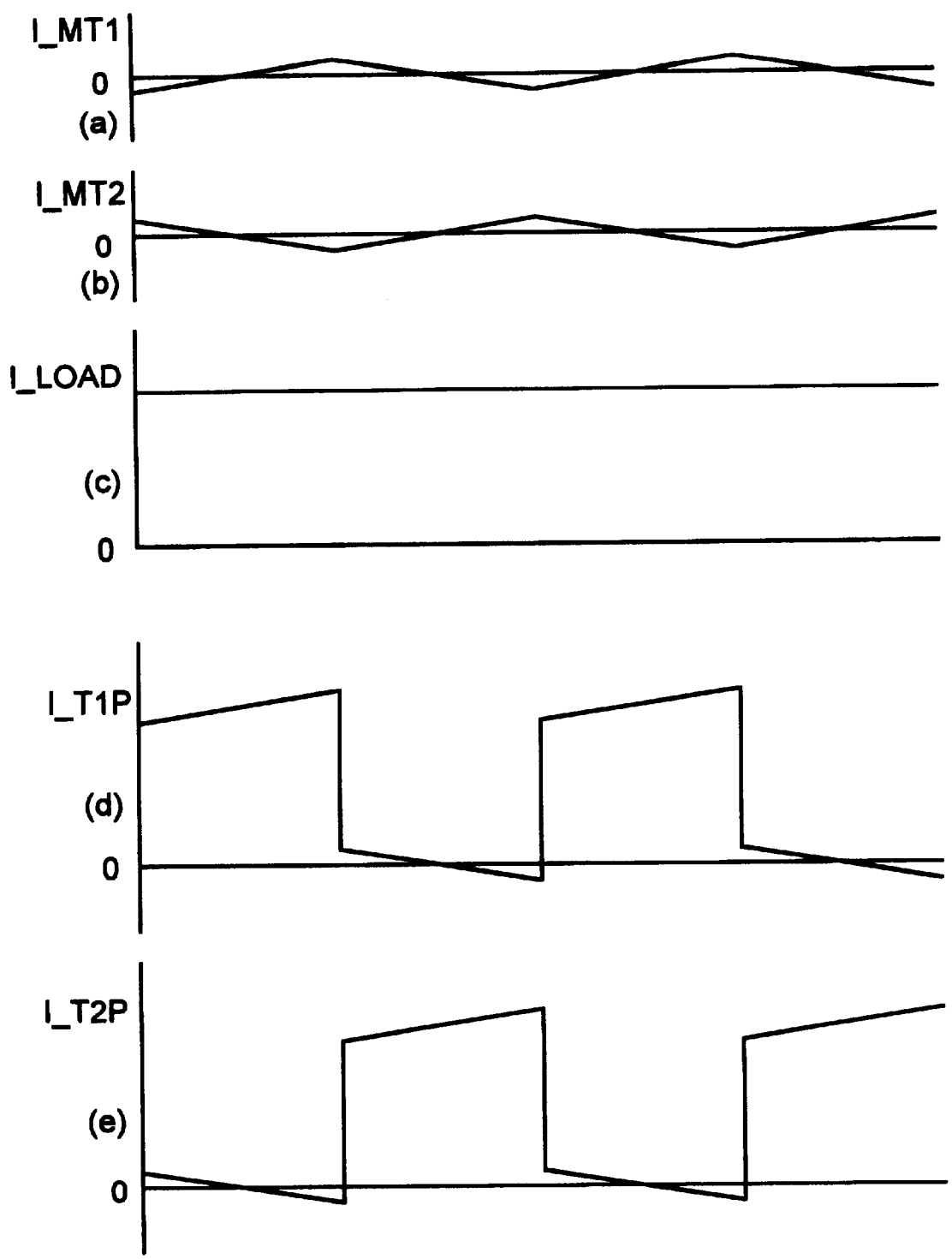
FIG. 25 illustrates the transformer magnetizing and primary current wave forms and the load current wave form of the FIG. 23 circuit.
Figure 26:
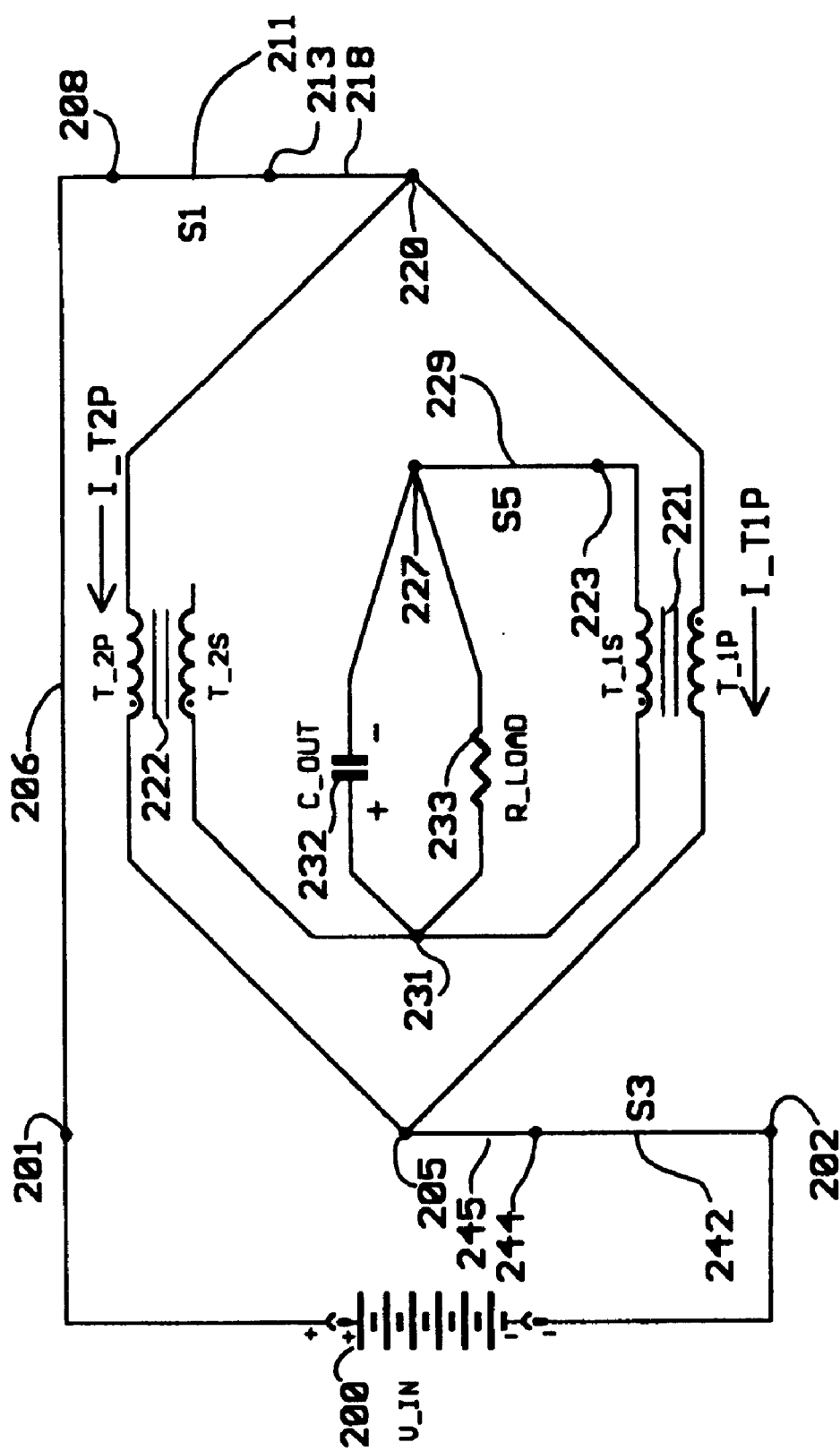
FIG. 26 illustrates an initial condition and a first active state of the FIG. 23 circuit just prior to a first transition.
Figure 27:
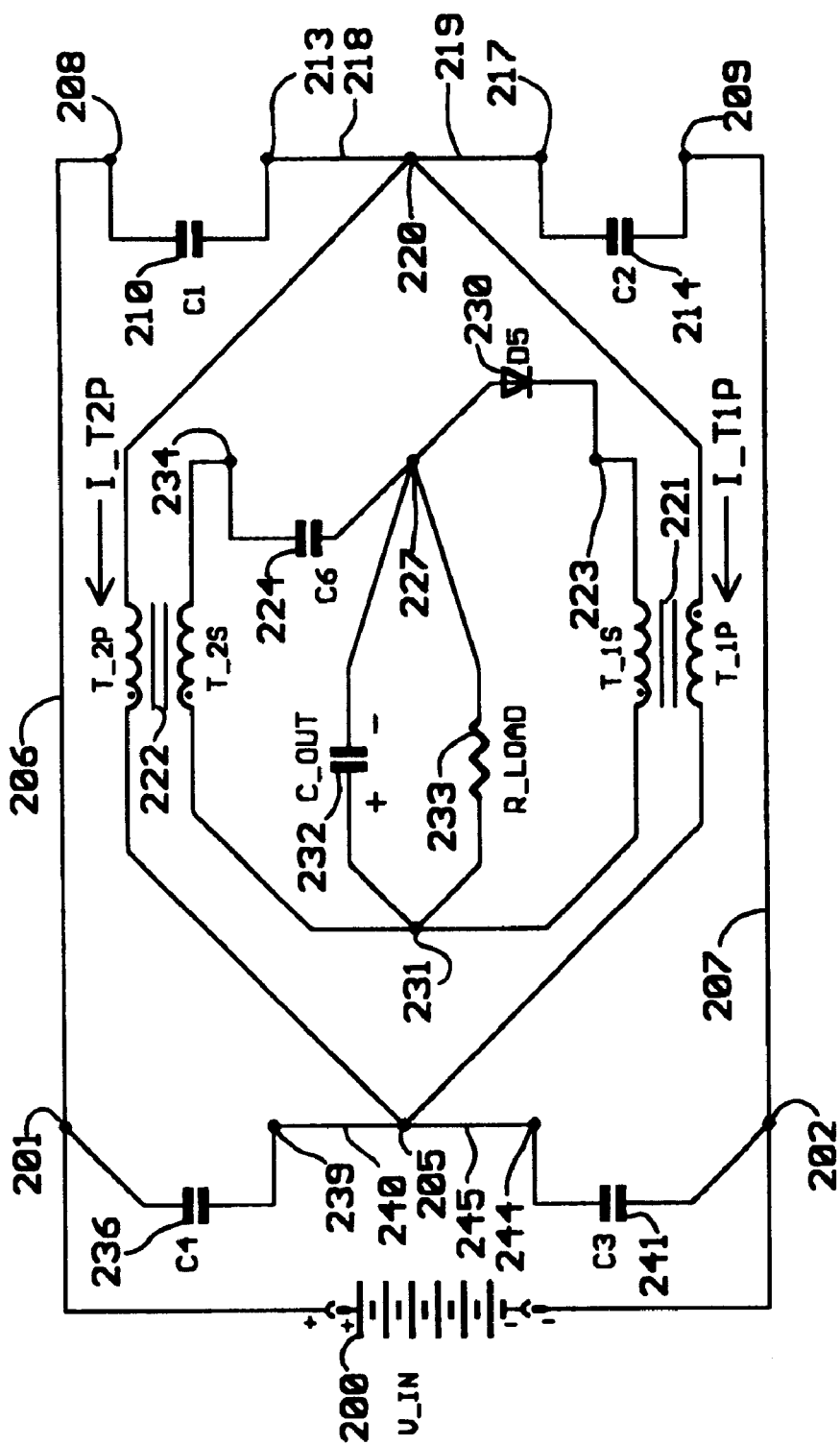
FIG. 27 illustrates a first phase of a first transition of the FIG. 23 circuit.
Figure 28:
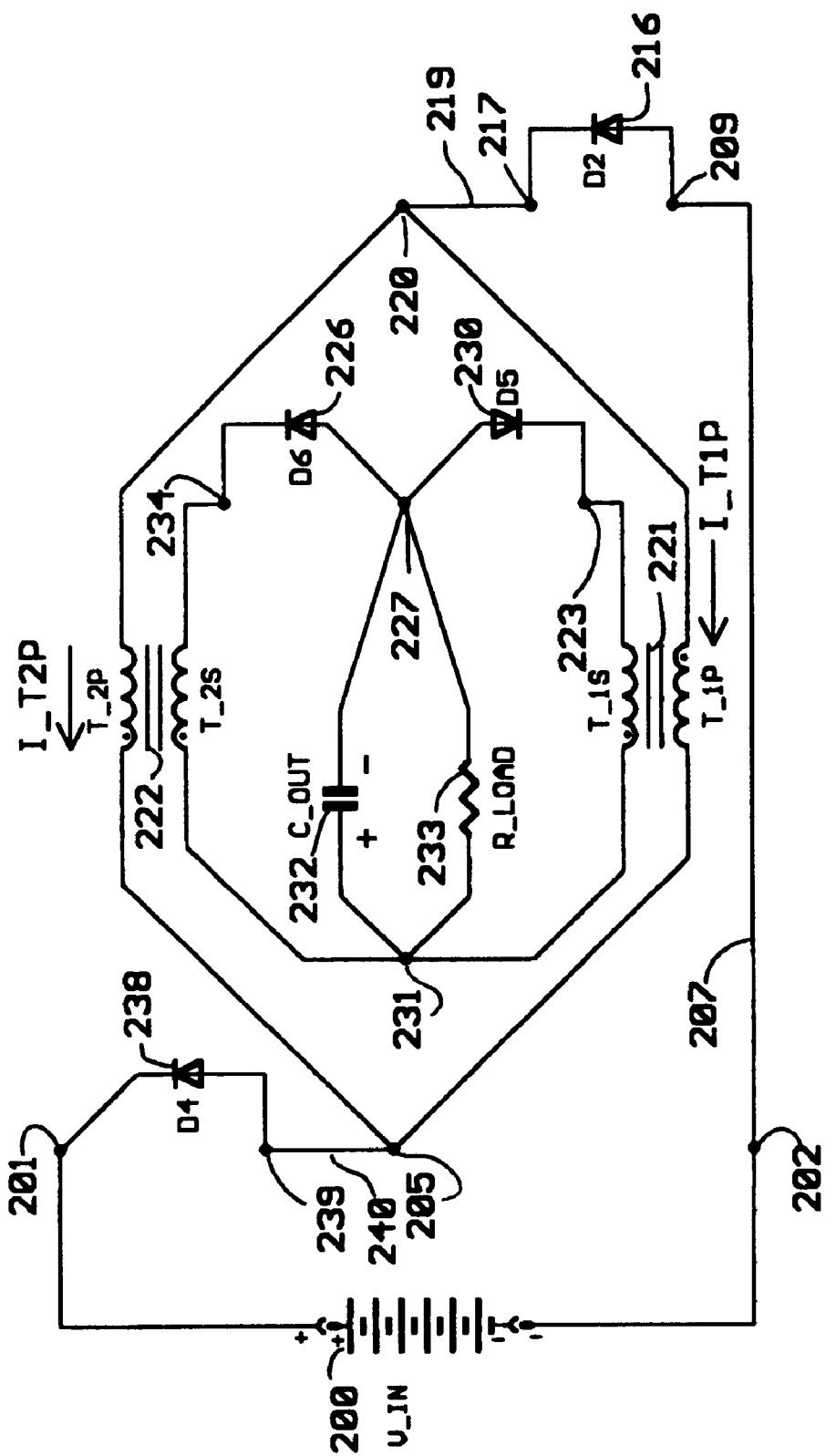
FIG. 28 illustrates a second phase of a first transition of the FIG. 23 circuit.
Figure 29:
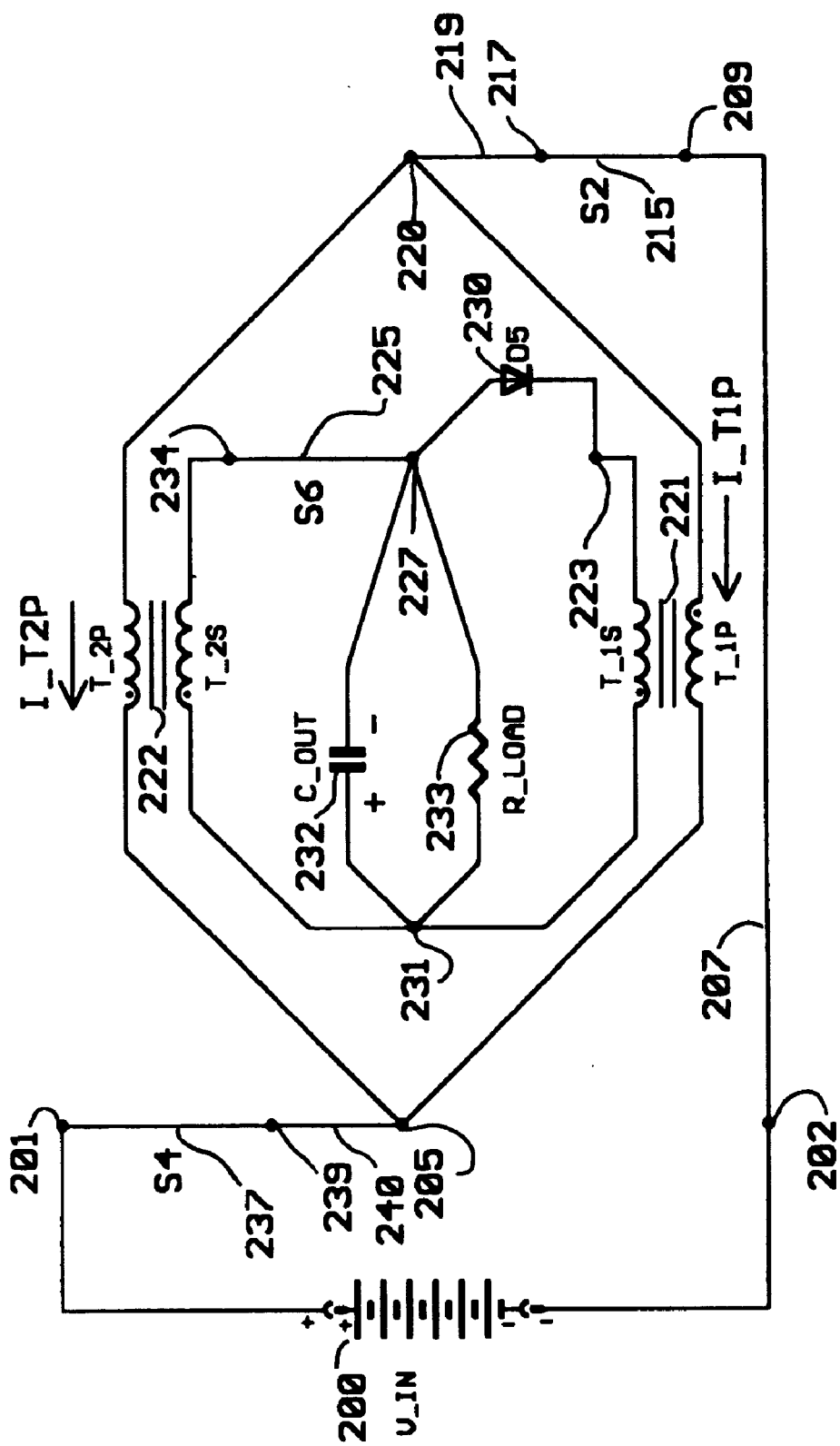
FIG. 29 illustrates a third phase of a first transition of the FIG. 23 circuit.
Figure 30:
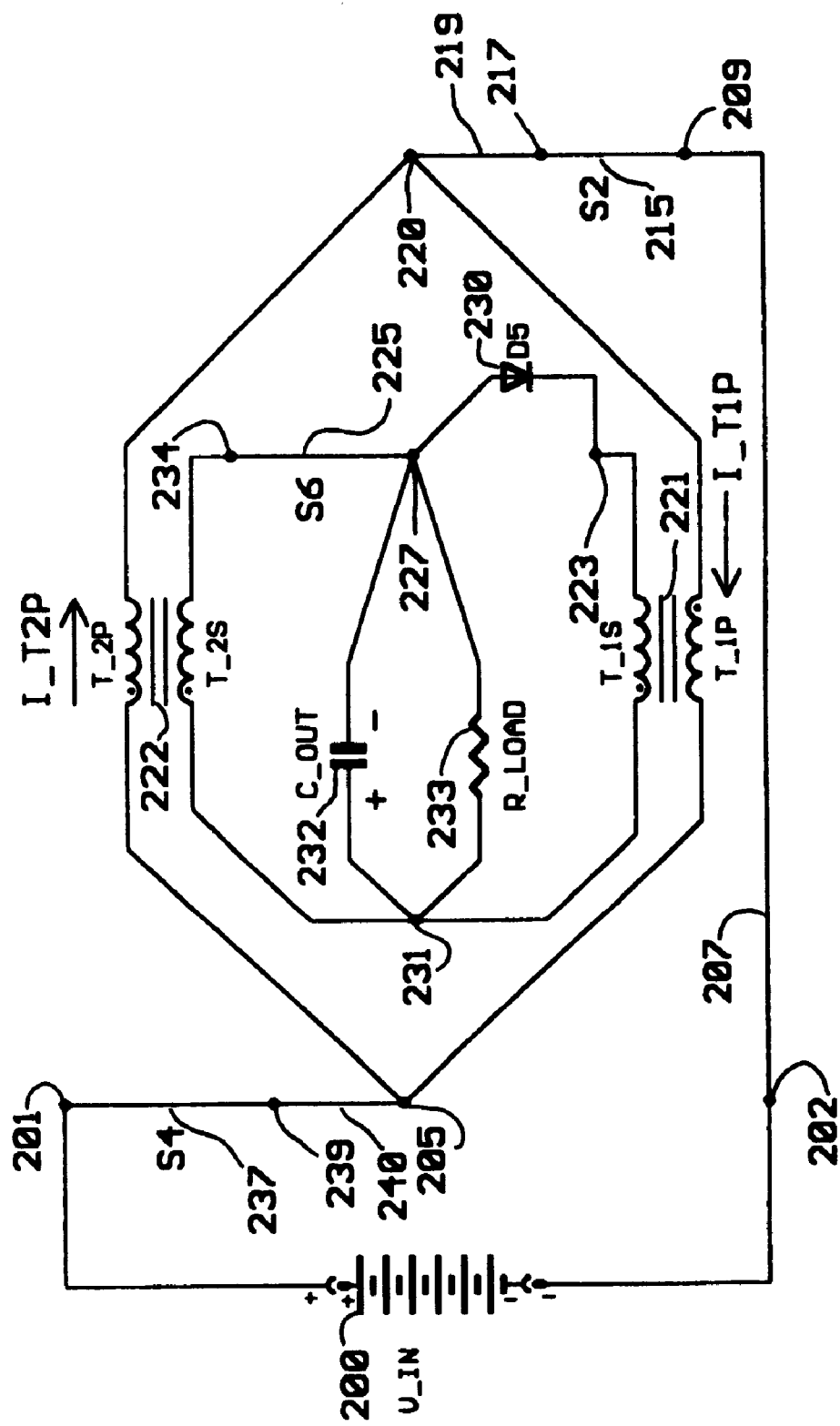
FIG. 30 illustrates a fourth phase of a first transition of the FIG. 23 circuit.
Figure 31:
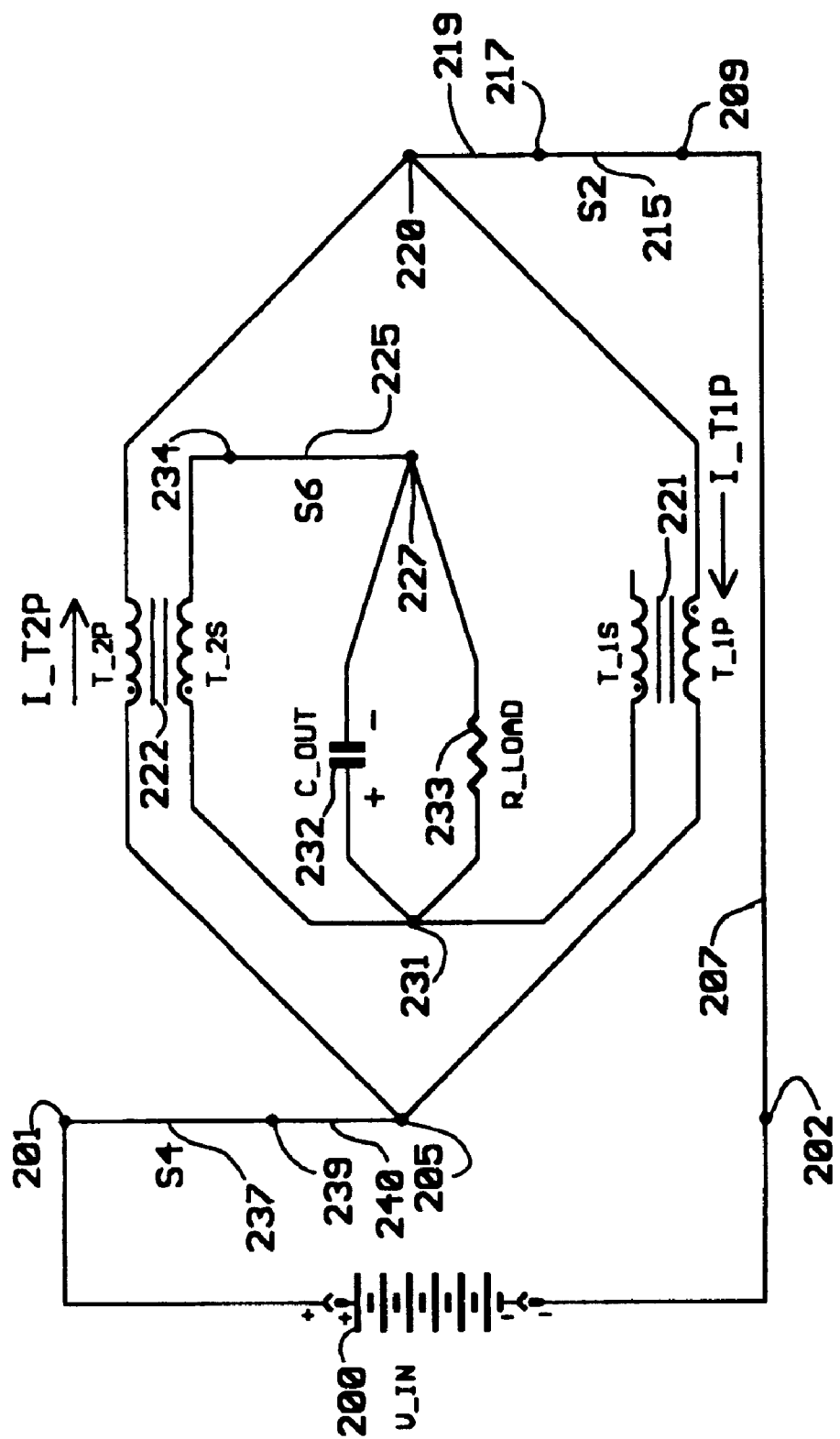
FIG. 31 illustrates a second active state of the FIG. 23 circuit just after the first transition.
Figure 32:
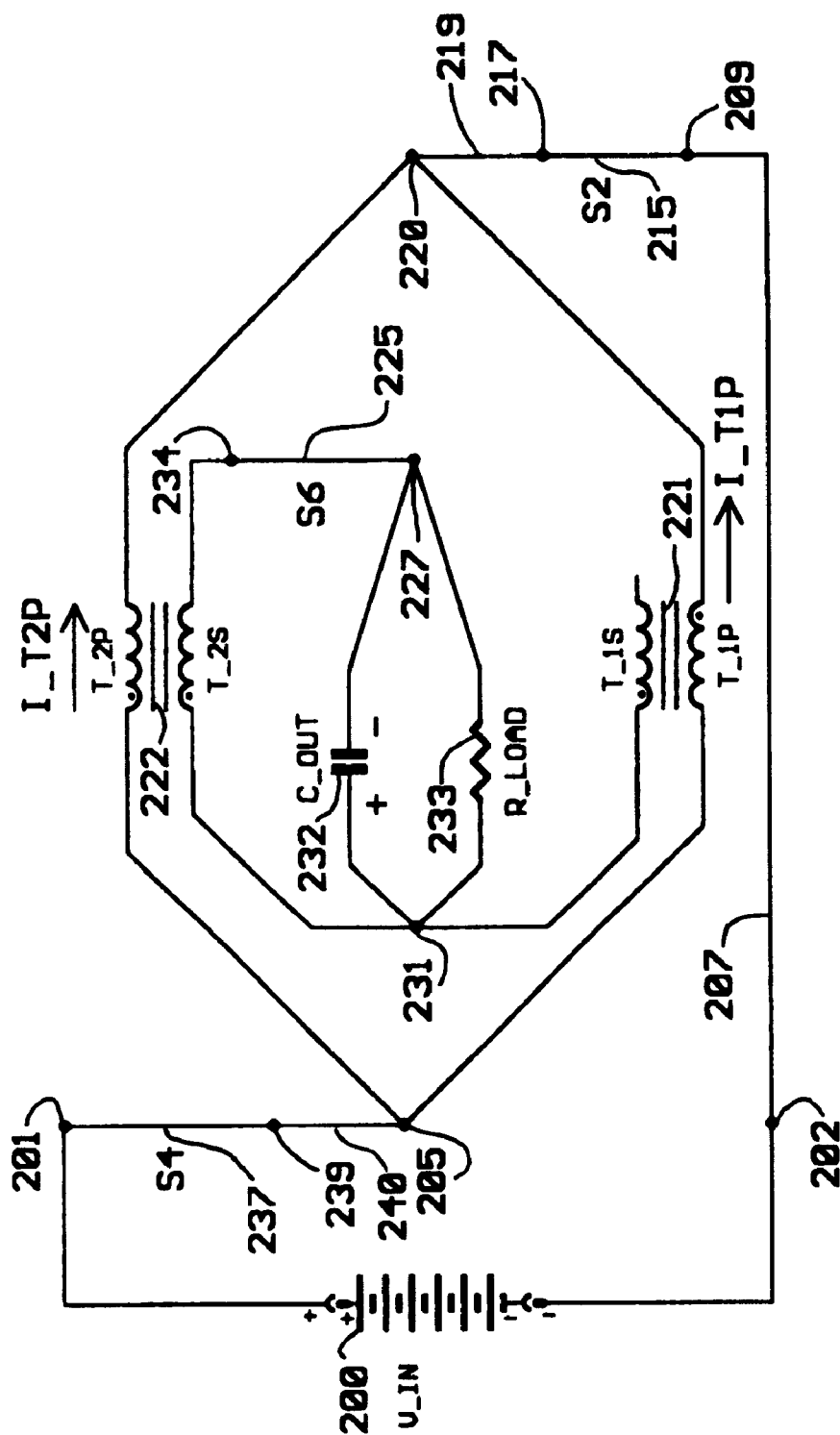
FIG. 32 illustrates the second active state of the FIG. 23 circuit just prior to a second transition.
Figure 33:
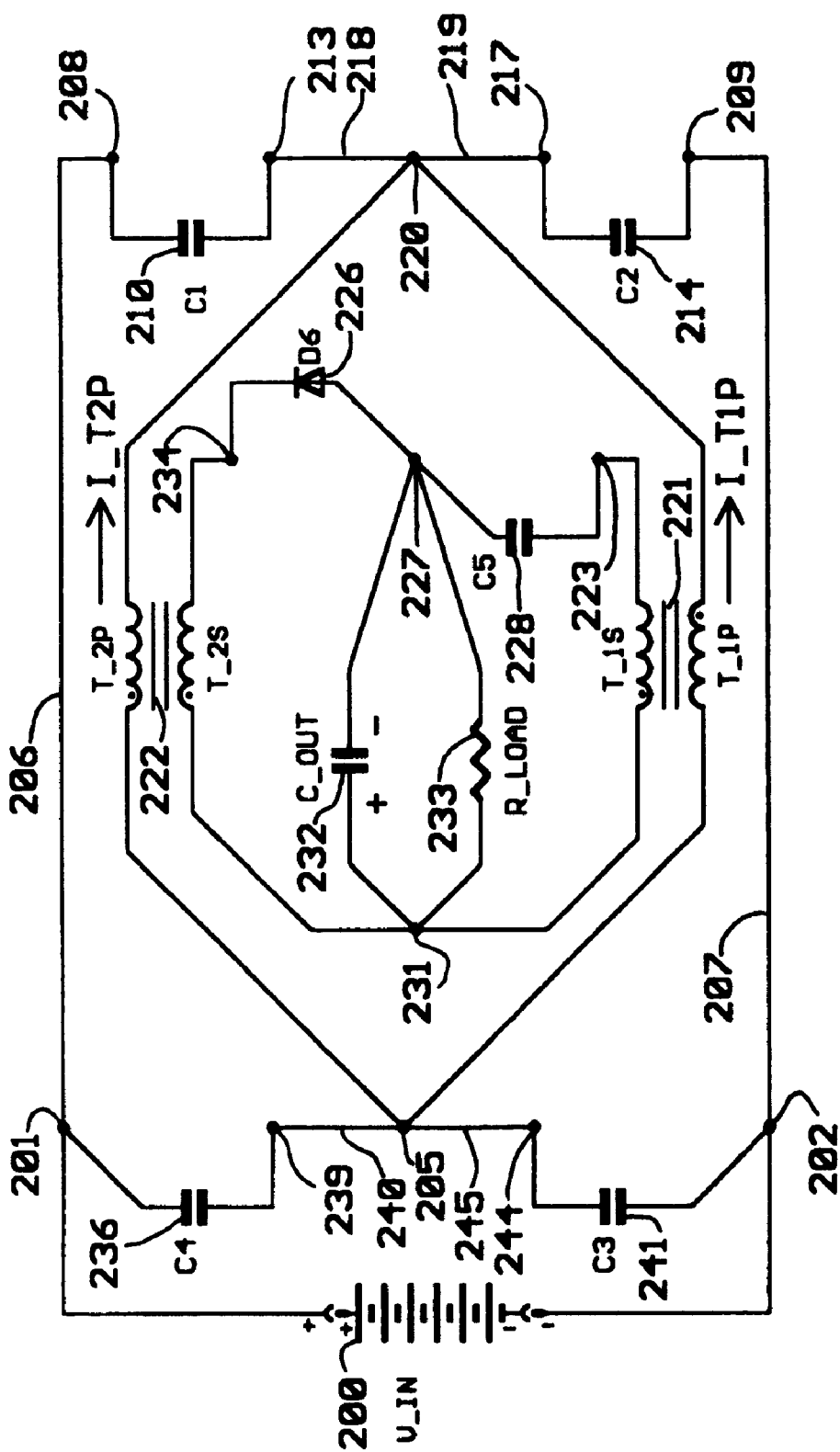
FIG. 33 illustrates a first phase of a second transition of the FIG. 23 circuit.
Figure 34:
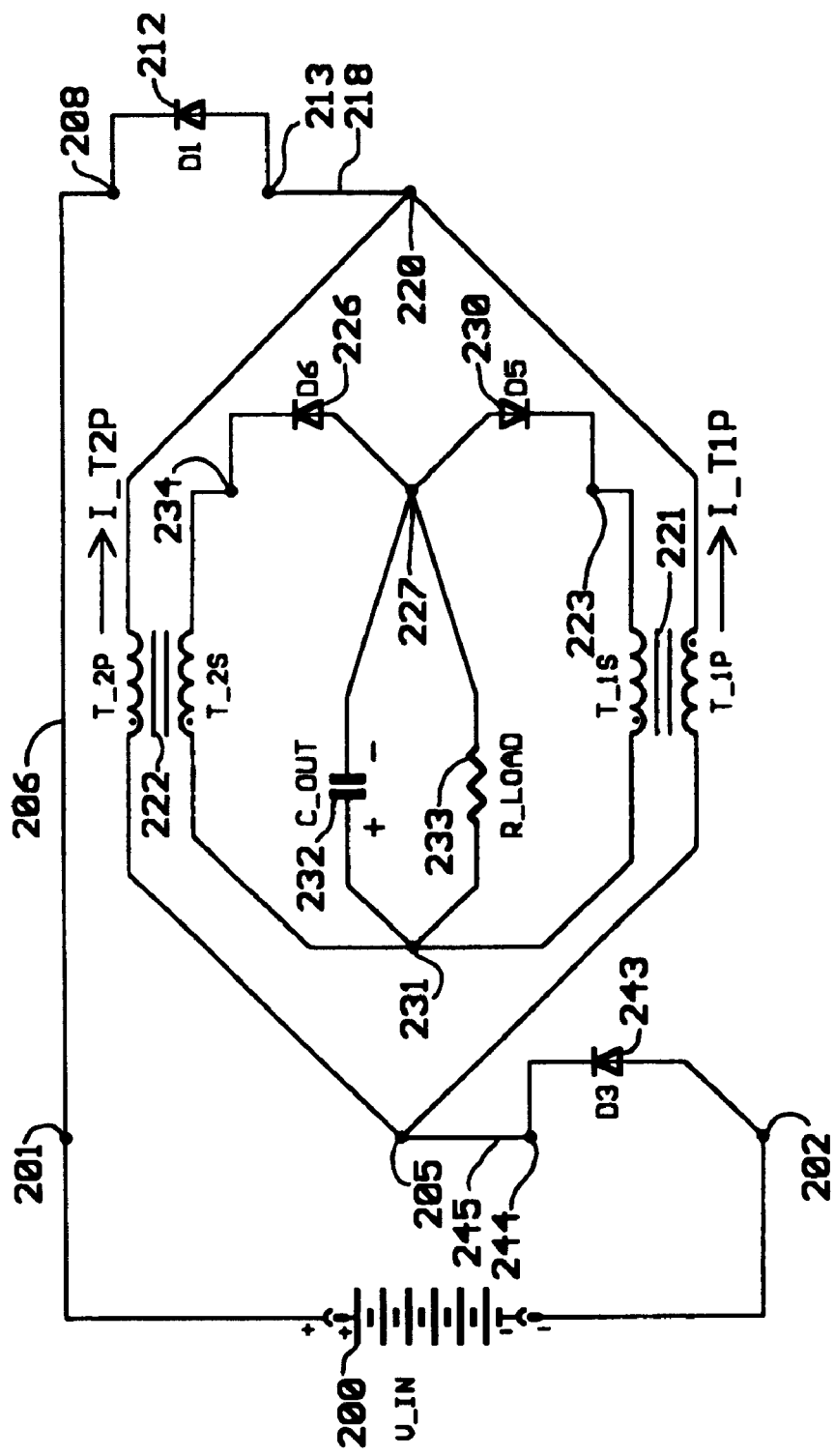
FIG. 34 illustrates a second phase of a second transition of the FIG. 23 circuit.
Figure 35:
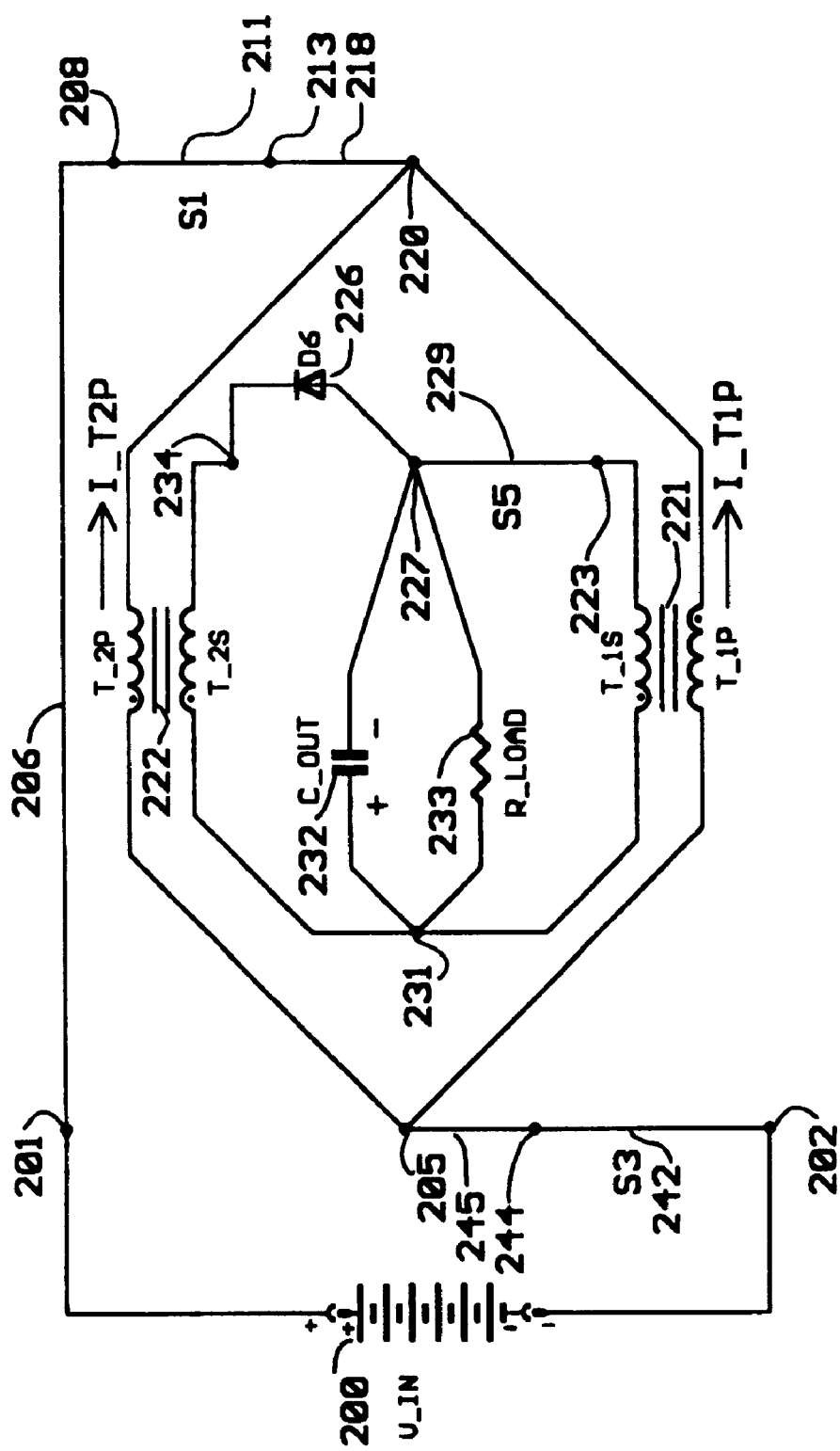
FIG. 35 illustrates a third phase of a second transition of the FIG. 23 circuit.
Figure 36:
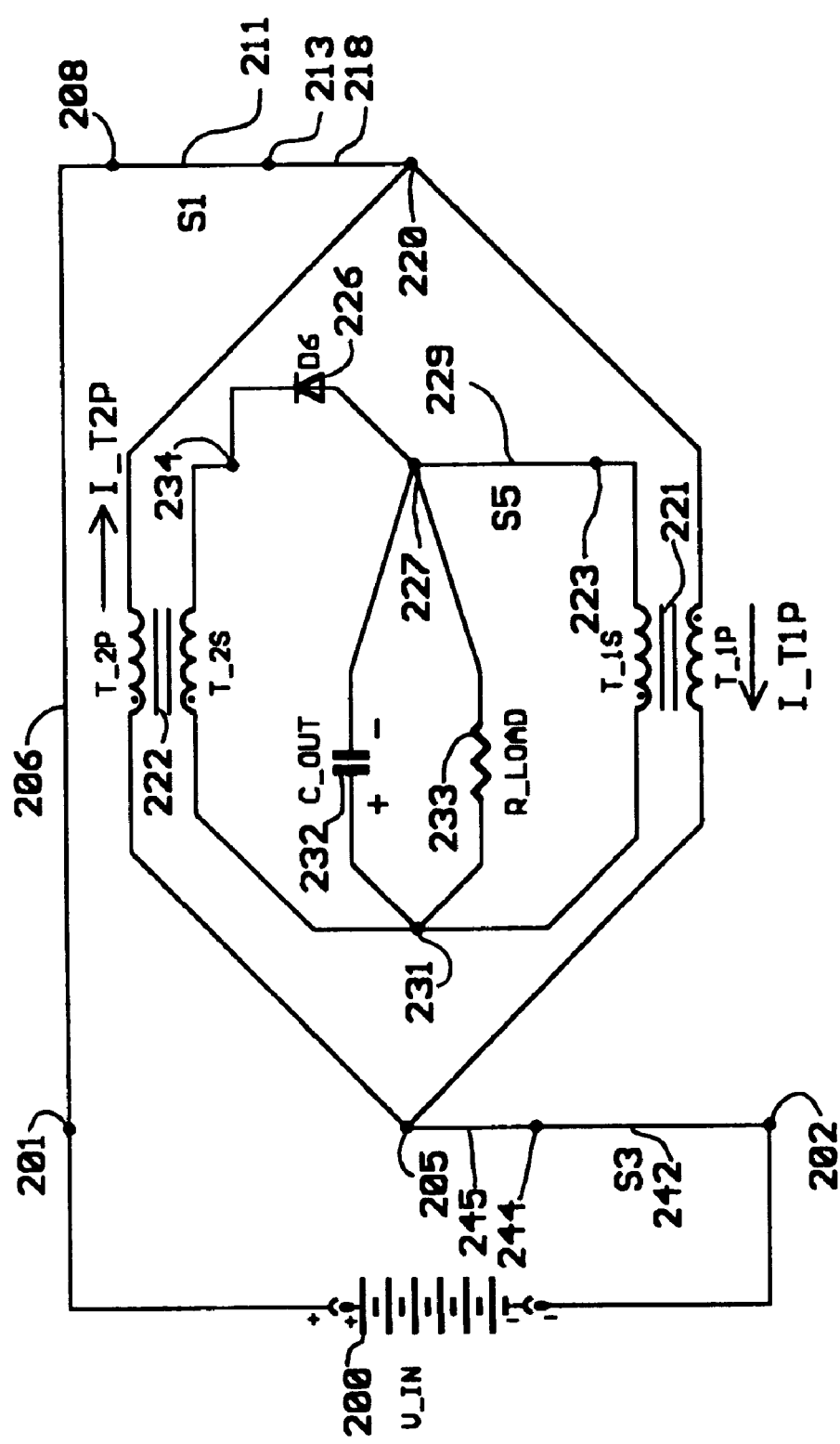
FIG. 36 illustrates a fourth phase of a second transition of the FIG. 23 circuit.
Figure 37:
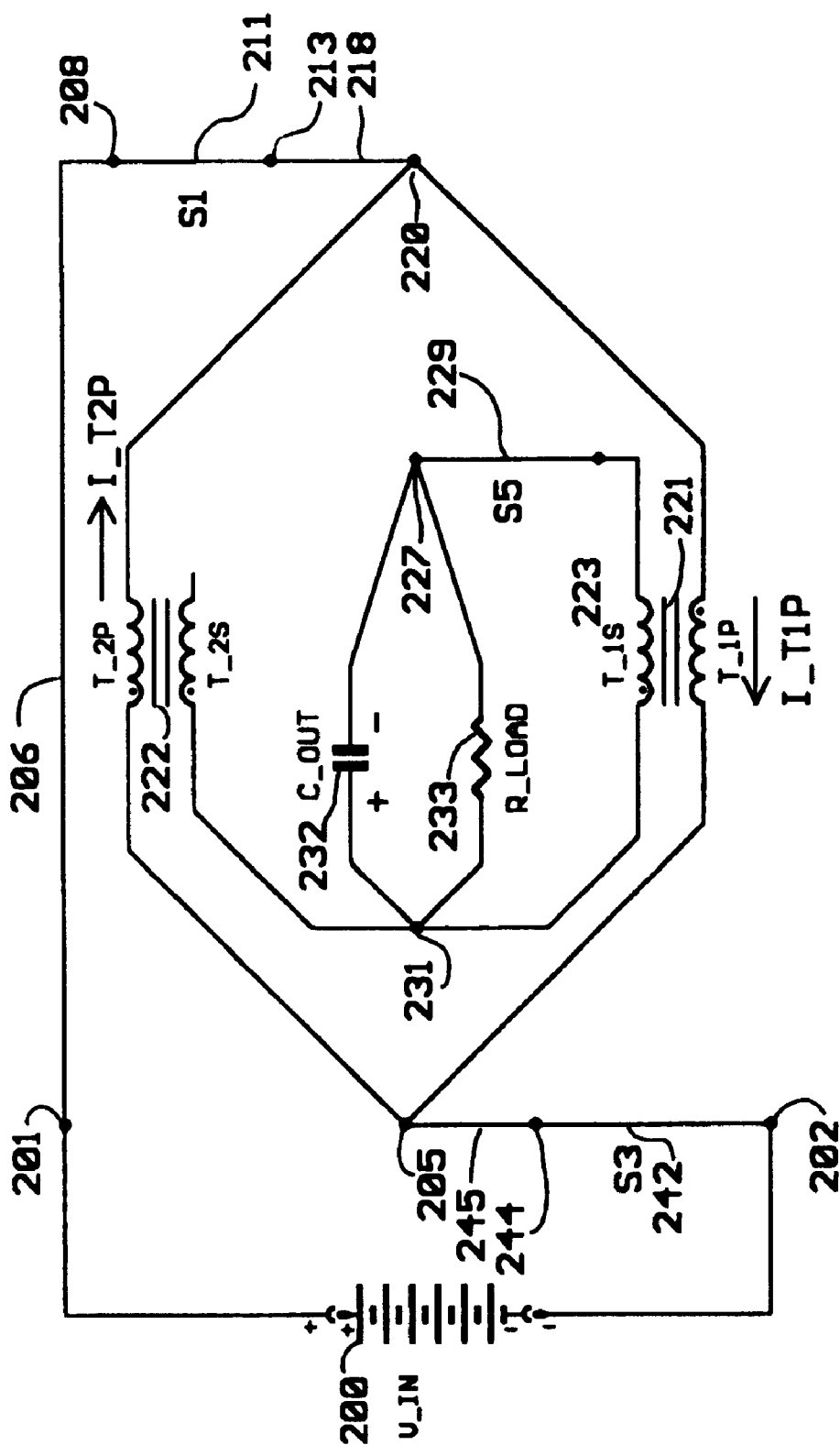
FIG. 37 illustrates the first active state of the FIG. 23 circuit just after the completion of the second transition.

It is assumed in this analysis that the system has reached a settled operating condition. Except for the short, but finite, switching intervals there are two active states of the circuit of FIG. 23. Consider an initial condition as illustrated in FIG. 26. The initial condition represents a time near the end of a first active state just prior to a first switching transition. During the initial condition the switches 242, 211, and 229 are on (closed) and the switches 237, 215, and 225 are off (open). The currents in the primary windings of transformers 221 and 222 are both flowing from node 220 towards node 205. The voltage applied to the primary windings is exactly equal to the source 200 voltage. The current in the primary winding of transformer 221 comprises the magnetizing current of the 221 transformer plus the induced load current from the secondary winding of the 221 transformer. The transformer 222 is uncoupled so that the current flowing in its primary winding is just its magnetizing current. The primary winding currents of transformers 221 and 222 are illustrated in FIGS. 25d and 25e, respectively. The magnetizing currents of transformers 221 and 222 are illustrated in FIGS. 25a and 25b, respectively. The switch currents are illustrated in FIGS. 24a through 24d. Notice that the current in the switch 237 is identical to the current in the switch 215. Notice also that the current in the switch 242 is identical to the current in the switch 211. At a time determined by the control circuit switches 211, 242, and 229 are turned off (opened), as illustrated in FIG. 27. When the switches 211 and 242 are turned off their current is diverted into their intrinsic parallel capacitors 210 and 241, respectively. When the 229 switch is turned off the leakage inductance associated with the 221 transformer forces the switch current into its parallel intrinsic diode 230. At the same time the voltage at the node 220 begins to fall and the voltage at node 205 begins to rise charging capacitors 210 and 241 and discharging capacitors 214 and 236. At the same time the voltages on the windings of the 222 transformer are changing such that the undotted terminals of the 222 transformer windings are becoming more negative which causes the capacitor 224 to be discharged. The voltage at the node 220 continues to fall and the voltage at the node 205 continues to rise until the diodes 216 and 238 become forward biased clamping the voltage on the primary windings of the transformers 221 and 222, as illustrated in FIG. 28. At the same time that the diodes 216 and 238 become forward biased the diode 226 becomes forward biased. The current in the secondary winding of the 221 transformer is maintained by its leakage inductance but falls rapidly. Shortly after diodes 216, 238, and 226 begin to conduct the switches 215, 237, and 225 are turned on (closed) at zero voltage, as illustrated in FIG. 29. During this time the load current continues to fall in the secondary winding of transformer 221 and the load current shifts from the 221 transformer to the 222 transformer. As the load current shifts the current in the primary winding of the 222 transformer changes sign, as illustrated in FIG. 30. Soon after the switches 215, 237, and 225 are turned on the current in the 221 transformer drops to zero and the diode 230 becomes reverse biased and turns off, as illustrated in FIG. 31. FIG. 31 represents a second active state of the DC transformer circuit in which the 222 transformer is coupled and the 221 transformer is uncoupled. At the beginning of the second active state the capacitor 228 is quickly charged. During the second active state the magnetizing current in each transformer changes sign but the total primary current of the 222 transformer does not change sign because the primary current of the 222 transformer includes both the magnetizing current and the reflected load current since it is coupled to the load. The total primary current of the 221 transformer is just the magnetizing current of the transformer 221. The primary current of the transformer 221 changes sign during the second active state, as illustrated in FIG. 32. At a time determined by the control circuit the switches 215, 237, and 225 are turned off (opened) as illustrated in FIG. 33. When the switches 215, 237, and 225 are switched off the current in the switches 215 and 237 are diverted into the 214 and 236 capacitors, respectively, and the current in the 225 switch is diverted into the 226 diode due to the action of the 222 transformer leakage inductance. The current diverted from the switches 215 and 237 charge the capacitors 214 and 236, respectively, and discharge the capacitors 210 and 241, respectively. At the same time the 228 capacitor is being discharged as the voltage at the undotted terminals of the 221 transformer falls with respect to the voltage at the dotted terminals of the 221 transformer. The voltage at the node 220 continues to rise and the voltage at the node 205 continues to fall until the diodes 212 and 243 become forward biased. At the same time the diode 230 becomes forward biased, as illustrated in FIG. 34. Shortly after the diodes 212, 243, and 230 become forward biased the switches 211, 242, and 229 are turned on at zero voltage, as illustrated in FIG. 35. During this transition the current in the secondary winding of the transformer 222 is falling rapidly but is maintained by the leakage inductance of the 222 transformer. The load current transfers from the 222 transformer to the 221 transformer. The load current in the 221 transformer causes its primary current to change directions as illustrated in FIG. 36. As the load current continues to shift from transformer 222 to transformer 221 the current in the diode 226 drops to zero and becomes reverse biased, as illustrated in FIG. 37. FIG. 37 represents the beginning of the first active state. During the first active state the 221 transformer is coupled and the 222 transformer is uncoupled. At the beginning of the first active state the capacitor 224 charges up quickly. During this state the magnetizing current in the 222 transformer drops towards zero and reverses sign, as illustrated in FIG. 26, which is the initial condition. A complete cycle of operation has now been described and the process described is repeated indefinitely. During the complete cycle of operation the length of time spent in each of the two active states is identical, and the transition times from the first active state to the second active state is very small by comparison to the time interval of the active states, and identical to the transition time from the second active state to the first active state.

The load voltage obtained in the FIG. 23 circuit is simply the DC input voltage multiplied by the ratio of the secondary turns to the primary turns of the transformers, which are assumed to be identical in all respects.

$$V_{OUT} = \frac{N_{SEC}}{N_{PRI}} V_{IN},$$

where $V_{OUT}$ is the load voltage, $V_{IN}$ is the input DC source voltage, $N_{SEC}$ is the number of secondary winding turns, and $N_{PRI}$ is the number of primary winding turns.

Related Embodiments

Figure 38:
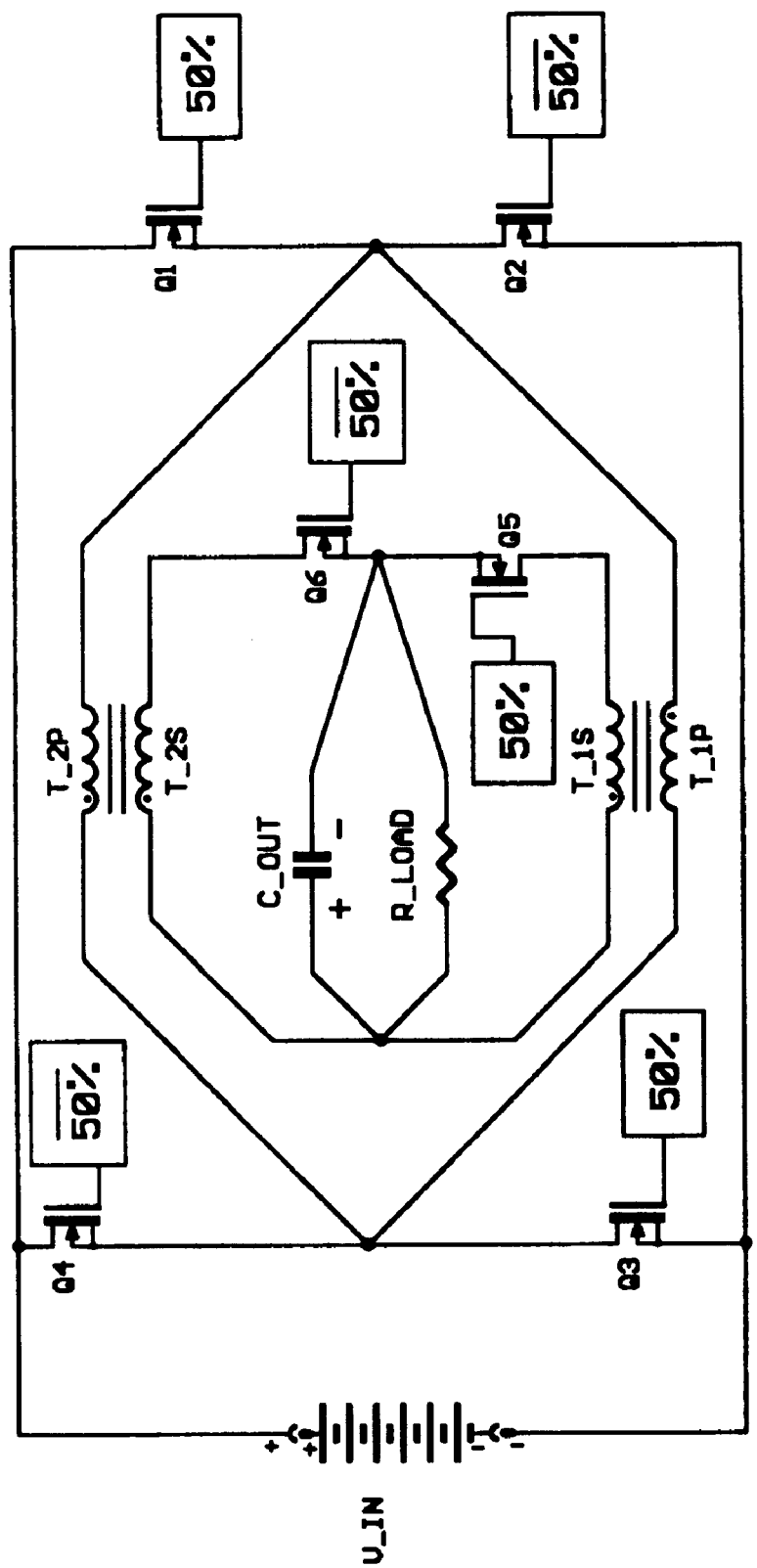
FIG. 38 illustrates an embodiment of the FIG. 23 circuit in which all of the switches are implemented using power mosfets.

FIG. 38 illustrates an embodiment of the subject invention in which all switches are implemented using power mosfets.

Figure 39:
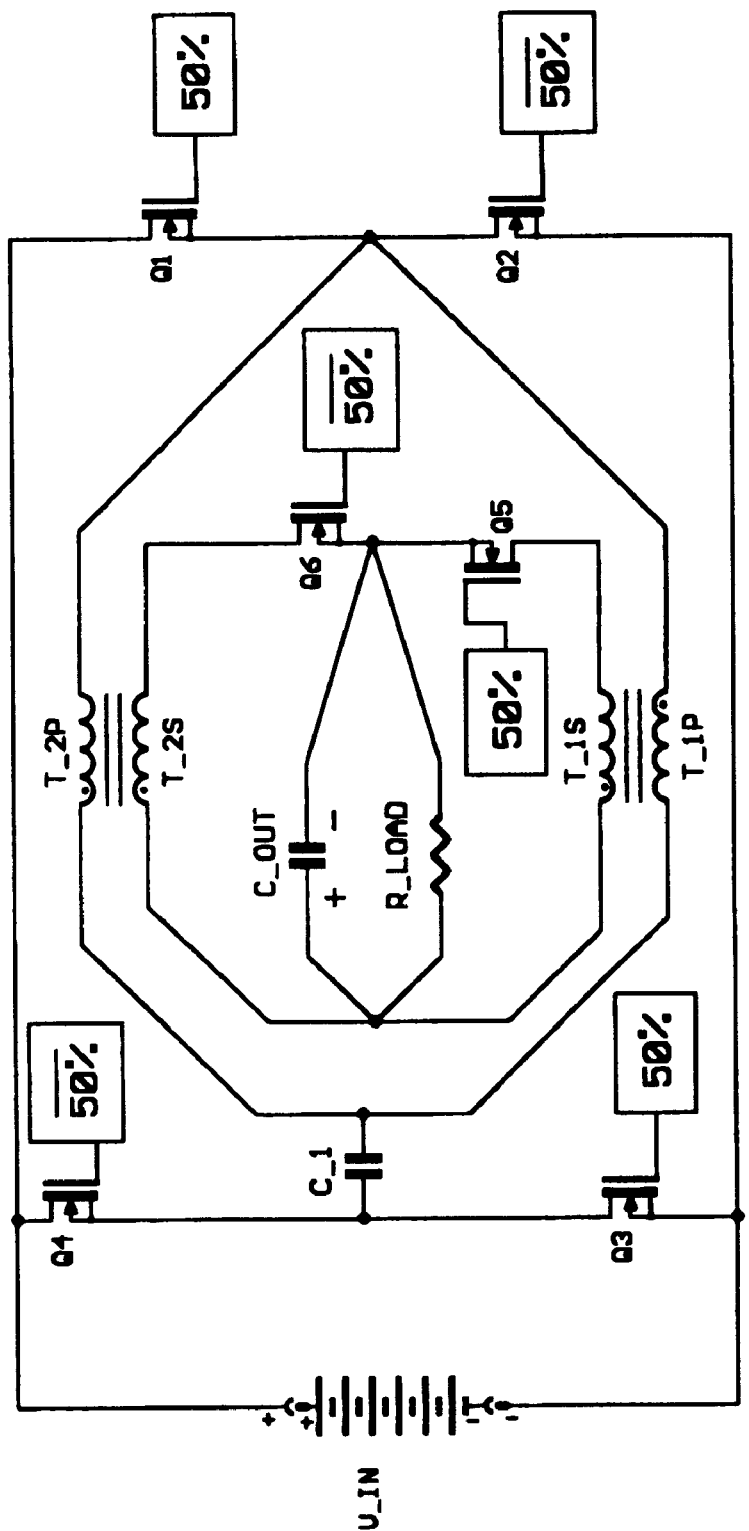
FIG. 39 illustrates an embodiment of the FIG. 23 circuit identical to the FIG. 38 embodiment except that a DC blocking capacitor is added to the full bridge switching network.

FIG. 39 illustrates an embodiment of the subject invention similar to the FIG. 38 embodiment that adds a DC blocking capacitor, C_1, in series with the primary windings of the two transformers. The addition of the DC blocking capacitor increases the tolerance of the circuit to duty cycle and other circuit imbalances that otherwise might lead to core saturation.

Figure 40:
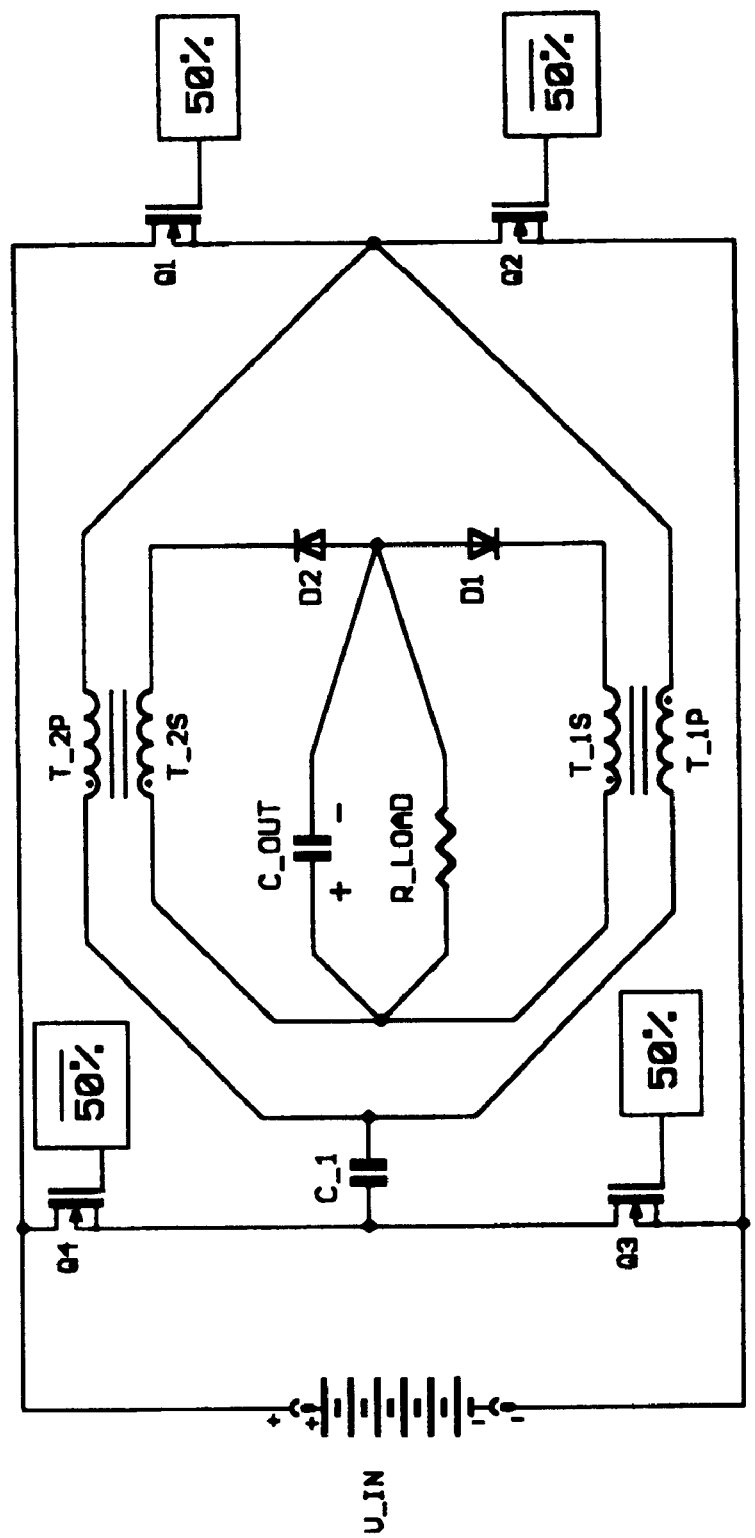
FIG. 40 illustrates an embodiment of the FIG. 23 circuit identical to the FIG. 39 embodiment except that the secondary switches are implemented with diodes.

FIG. 40 illustrates another embodiment similar to the FIG. 39 embodiment in which the secondary switches are implemented using diodes.

Figure 41:
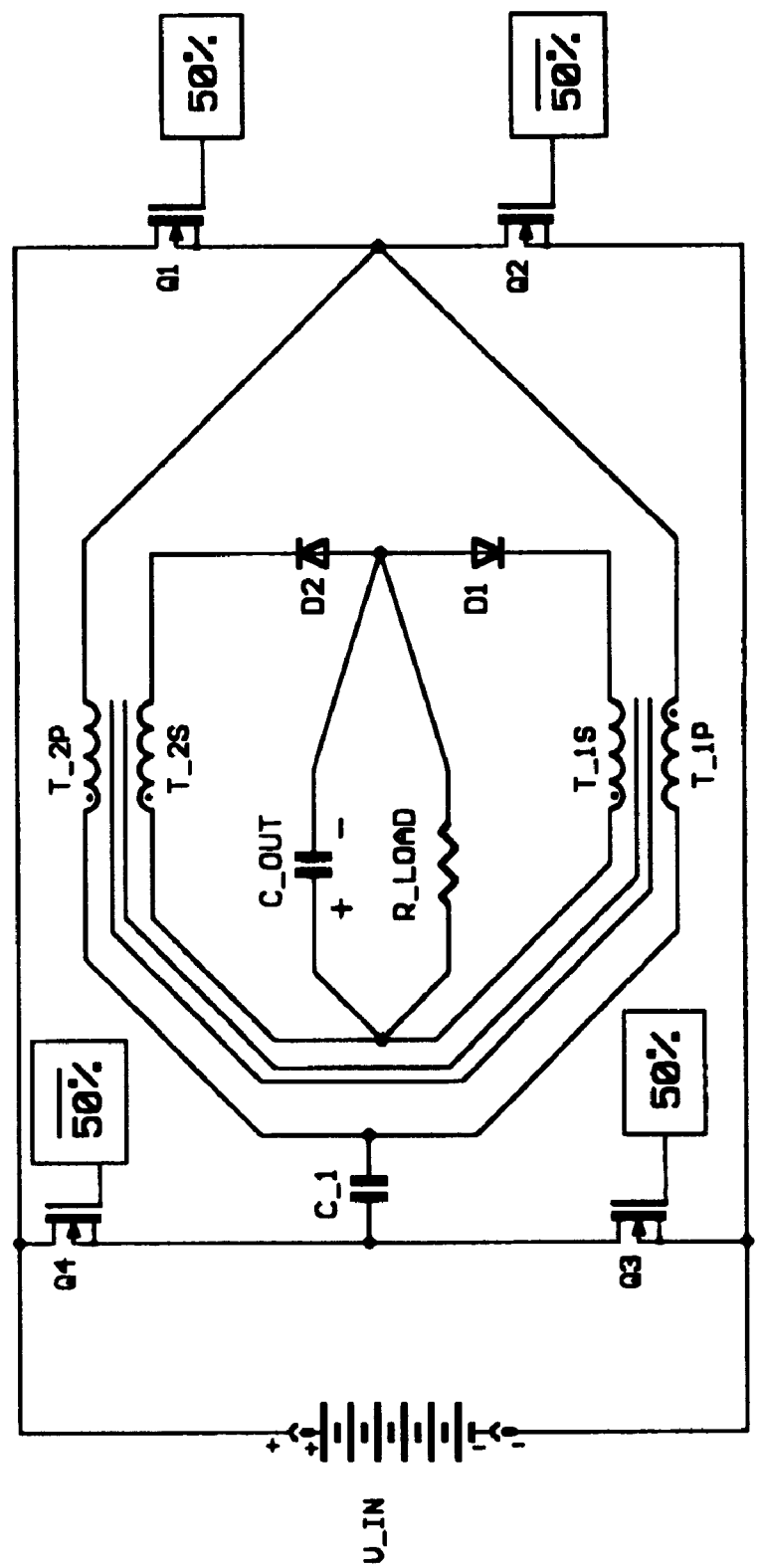
FIG. 41 illustrates an embodiment of the FIG. 23 circuit identical to the FIG. 40 embodiment except that the two transformers are integrated on a single E core as illustrated in FIG. 21.

FIG. 41 illustrates another embodiment similar to the FIG. 40 embodiment in which the two transformers are integrated on a single core as illustrated in FIG. 21.

Figure 42:
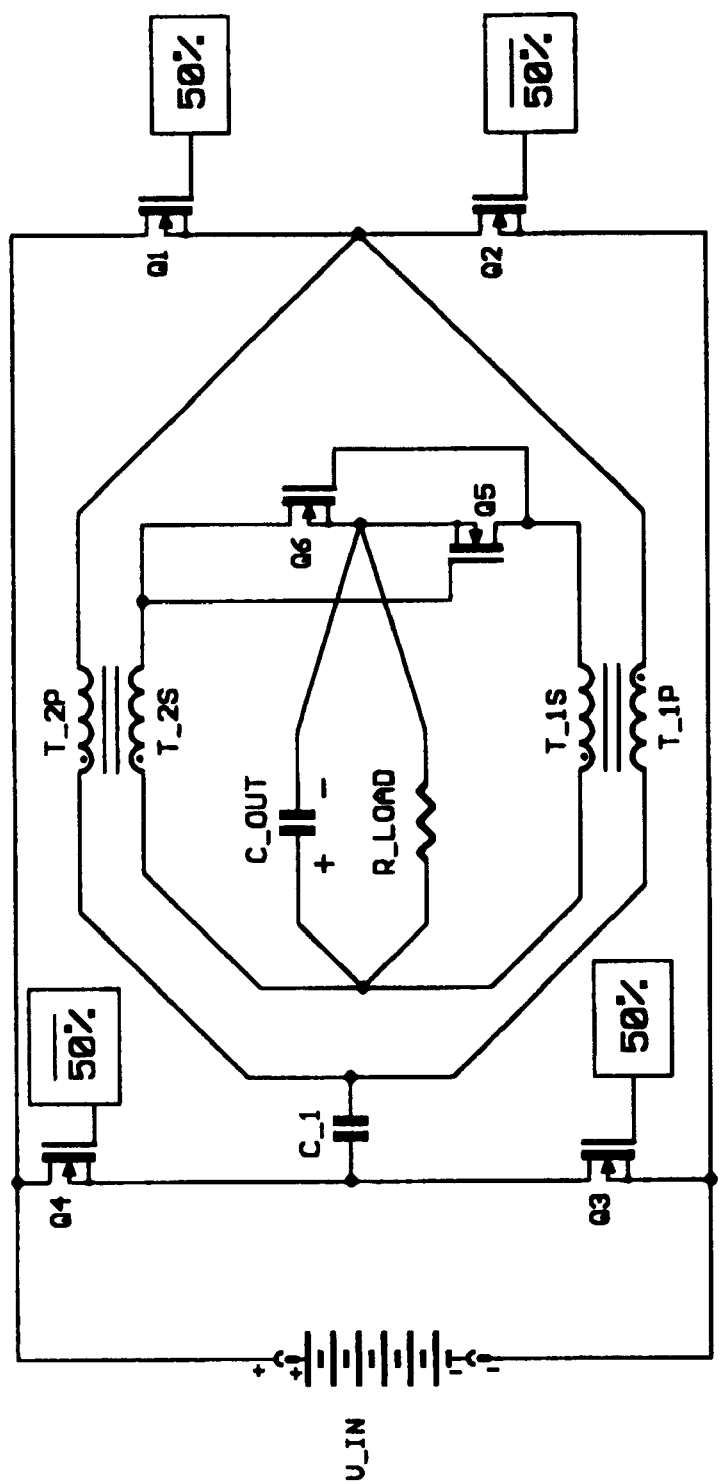
FIG. 42 illustrates an embodiment of the FIG. 23 circuit similar to the FIG. 39 embodiment but with synchronous rectifier self drive.

FIG. 42 illustrates another embodiment similar to the FIG. 39 embodiment in which the secondary mosfets are self driven. Self driving the mosfets obviates an isolated control signal for output mosfet switch timing. In the self drive arrangement the gates of the secondary mosfets are connected to the drains of the complementary secondary mosfets. Here the gate of Q5 is connected to the drain of Q6 and the drain of Q5 is connected to the gate of Q6. The timing of the secondary switches is altered slightly from what has been described above in that both the turn off and turn on instants are delayed, but the basic operation of the circuit remains essentially the same. The leakage inductance creates a time delay in the current transfer from one transformer to its complement so that the delay in timing of the switches created by the self drive process is inconsequential. The current drops rapidly in one transformer while it rises rapidly in the complementary transformer. For a short time during each transition the load current will be shared by the two secondary mosfets. During this interval of current sharing both gate drive signals will have collapsed so that the currents will tend to flow in the intrinsic or parallel diodes during the current share interval. The drain voltages of the secondary mosfets must be compatible with the gate voltage requirements of the secondary mosfets, otherwise a voltage divider or voltage limiting circuit must be used to provide the secondary mosfets with a suitable gate drive signal.

Figure 43:
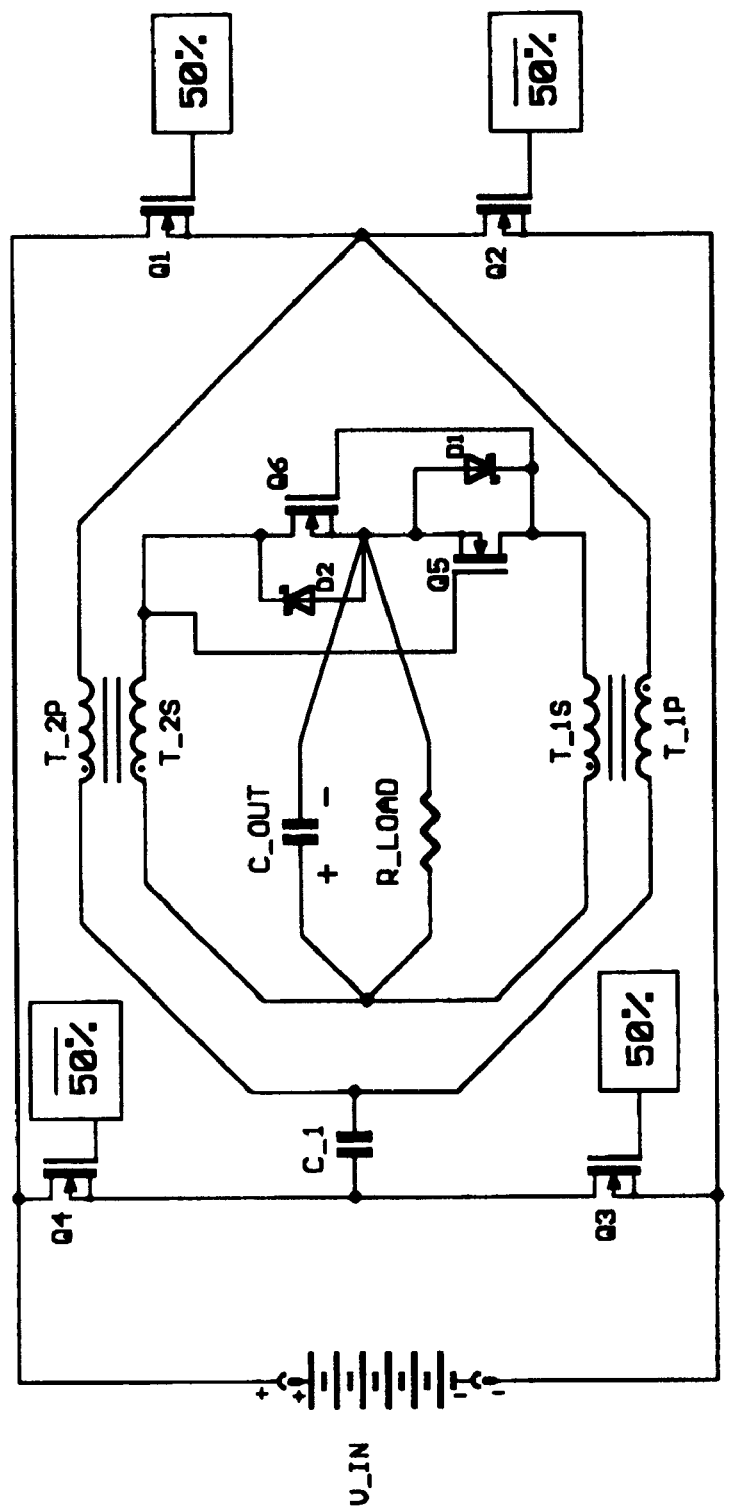
FIG. 43 illustrates an embodiment of the FIG. 23 circuit similar to the FIG. 42 circuit but with the addition of schottky diodes in parallel with the secondary switches.

FIG. 43 illustrates another embodiment similar to the FIG. 42 embodiment in which schottky barrier diodes are added in parallel to the secondary switches. The schottky barrier diodes have a low forward voltage drop and are useful for preventing the conduction of the intrinsic diode of the mosfet. Preventing the conduction of the intrinsic diode of the mosfet is sometimes beneficial since the reverse recovery of the intrinsic diode is often slow and results in unacceptable power losses. Schottky barrier diodes being majority carrier devices do not experience the reverse recovery effects of the intrinsic junction diodes of the power mosfets.

Structure

Figure 44:
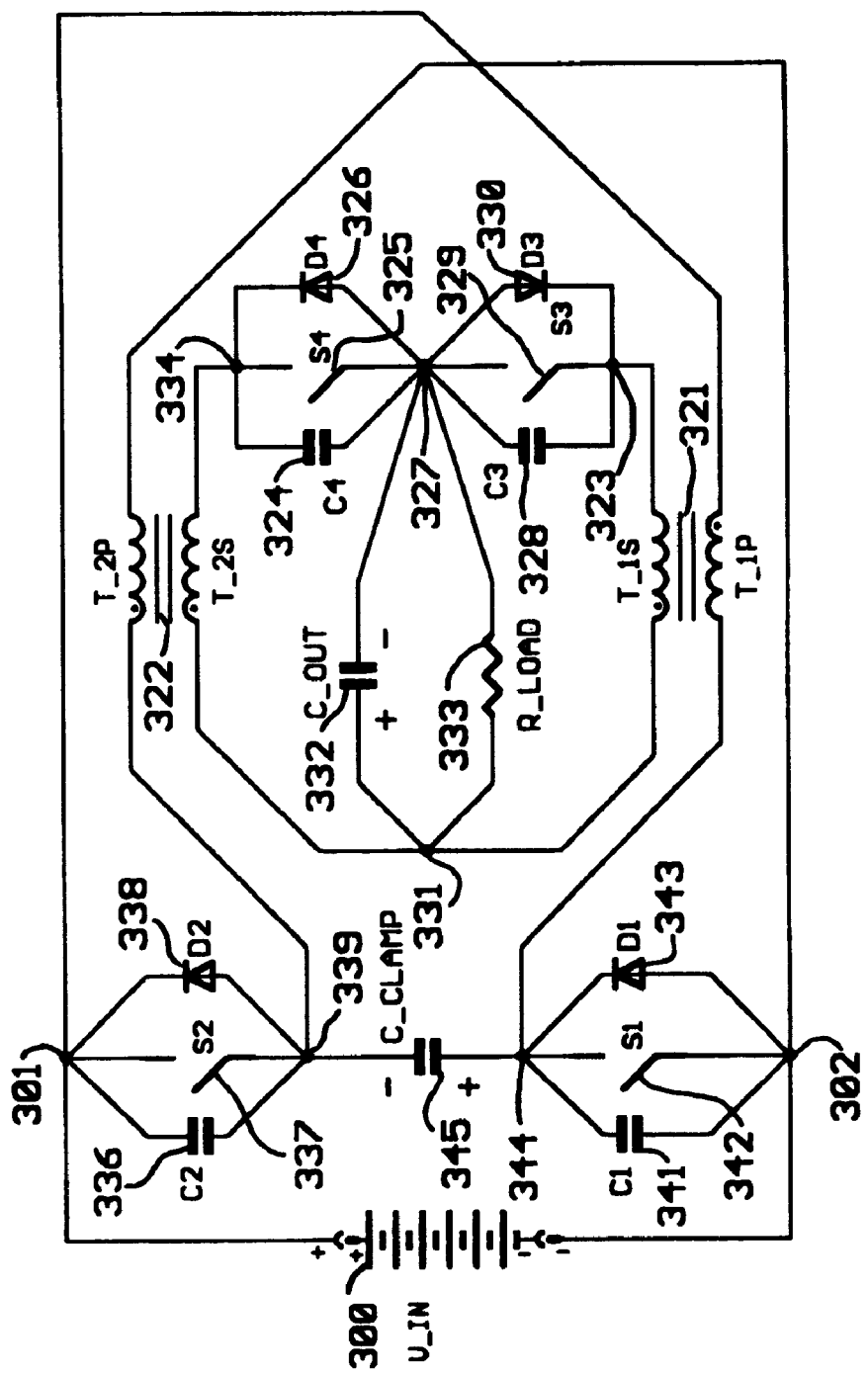
FIG. 44 illustrates a DC transformer according to the subject invention using two self clamping transformers in a push pull arrangement.
Figure 45:
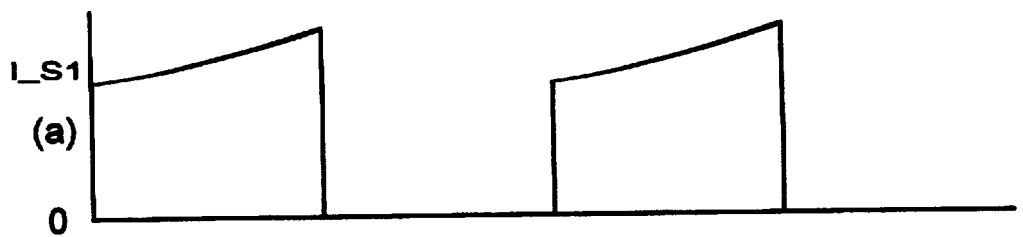
FIG. 45 illustrates the switch current wave forms of the FIG. 44 circuit.
Figure 45:
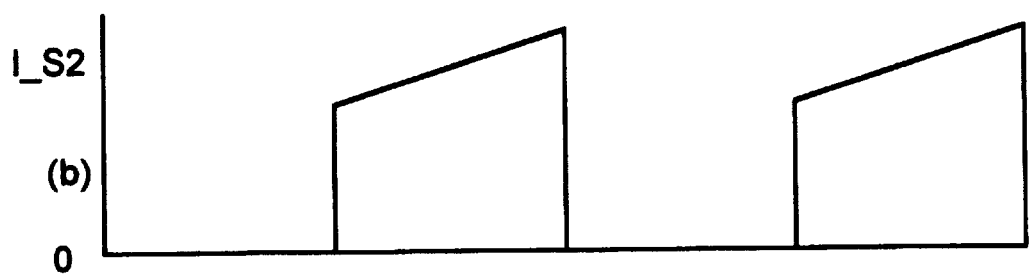
Figure 45:
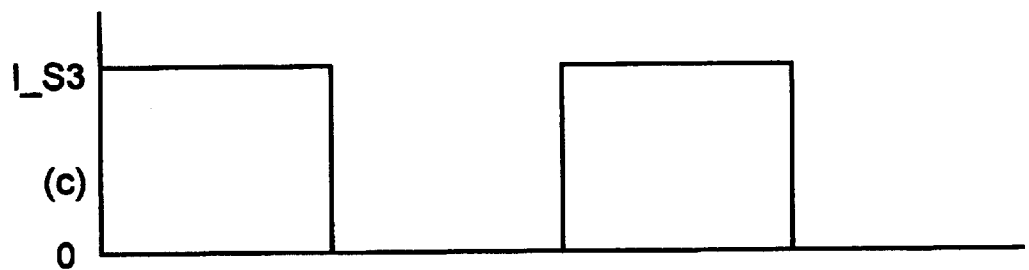
Figure 45:
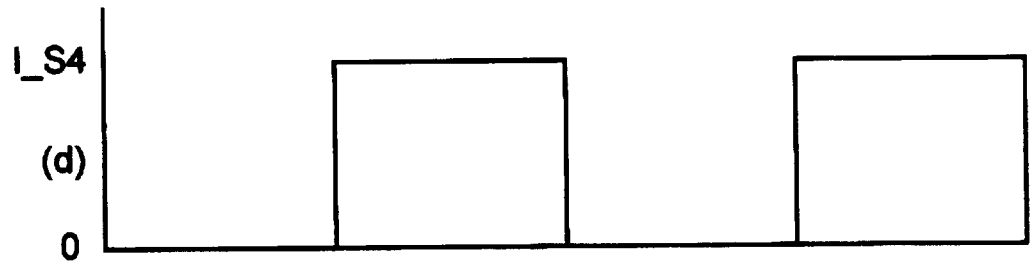

The structure of the circuit of the subject invention is shown in FIG. 44. A positive terminal of a DC input voltage source 300 is connected to a node 301. A negative terminal of source 300 is connected to a node 302. A first terminal of a capacitor 336 is connected to node 301. A second terminal of capacitor 336 is connected to a node 339. A first terminal of a switch 337 is connected to node 301. A second terminal of switch 337 is connected to node 339. A cathode terminal of a diode 338 is connected to node 301. An anode terminal of diode 338 is connected to node 339. A first terminal of a capacitor 341 is connected to node 302. A second terminal of capacitor 341 is connected to a node 344. A first terminal of a switch 342 is connected to node 302. A second terminal of switch 342 is connected to node 344. An anode terminal of a diode 343 is connected to node 302. A cathode terminal of diode 343 is connected to node 344. A first terminal of a capacitor 345 is connected to node 339. A second terminal of capacitor 345 is connected to node 344. An undotted terminal of the primary winding of a transformer 321 is connected to node 344. A dotted terminal of the primary winding of the transformer 321 is connected to node 301. A dotted terminal of the primary winding of a transformer 322 is connected to node 339. An undotted terminal of the primary winding of the transformer 322 is connected to the node 302. A dotted terminal of the secondary winding of the transformer 321 is connected to a node 331. Node 331 is connected to the dotted terminal of the secondary winding of the transformer 322. The undotted terminal of the secondary winding of the transformer 321 is connected to a node 323. The undotted terminal of the secondary winding of the transformer 322 is connected to a node 334. A first terminal of a capacitor 328 is connected to the node 323. A second terminal of the capacitor 328 is connected to a node 327. A first terminal of a switch 329 is connected to node 323. A second terminal of the switch 329 is connected to the node 327. A cathode terminal of a diode 330 is connected to node 323. An anode terminal of diode 330 is connected to node 327. A first terminal of a capacitor 324 is connected to node 334. A second terminal of capacitor 324 is connected to node 327. A first terminal of a switch 325 is connected to node 334. A second terminal of switch 325 is connected to node 327. A cathode terminal of a diode 326 is connected to node 334. An anode terminal of diode 326 is connected to node 327. A first terminal of a capacitor 332 is connected to node 331. A second terminal of capacitor 332 is connected to node 327. A first terminal of a load 333 is connected to node 331. A second terminal of load 333 is connected to node 327.

Operation

Figure 46:
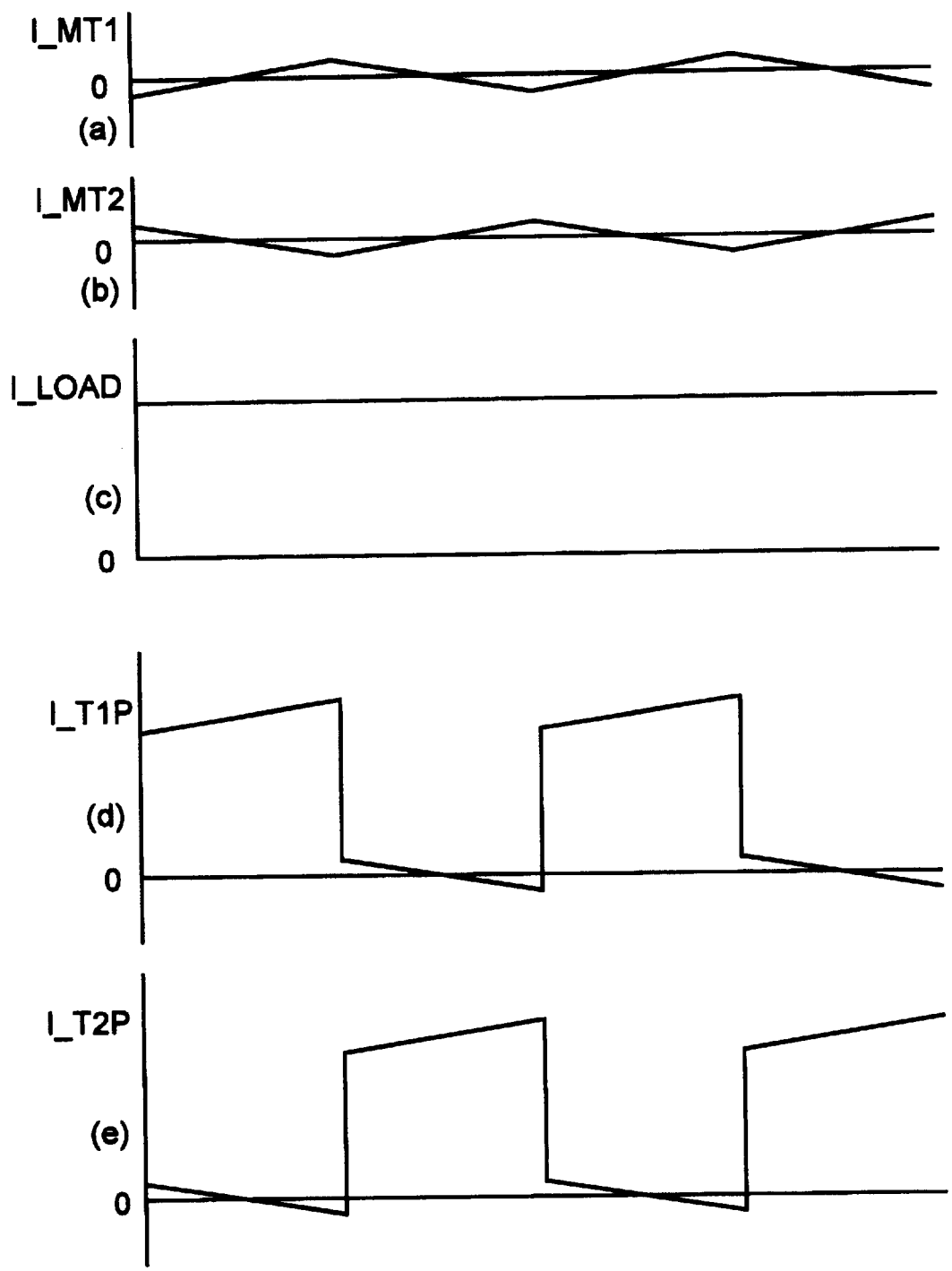
FIG. 46 illustrates the transformer magnetizing and primary current wave forms and the load current wave form of the FIG. 44 circuit.
Figure 47:
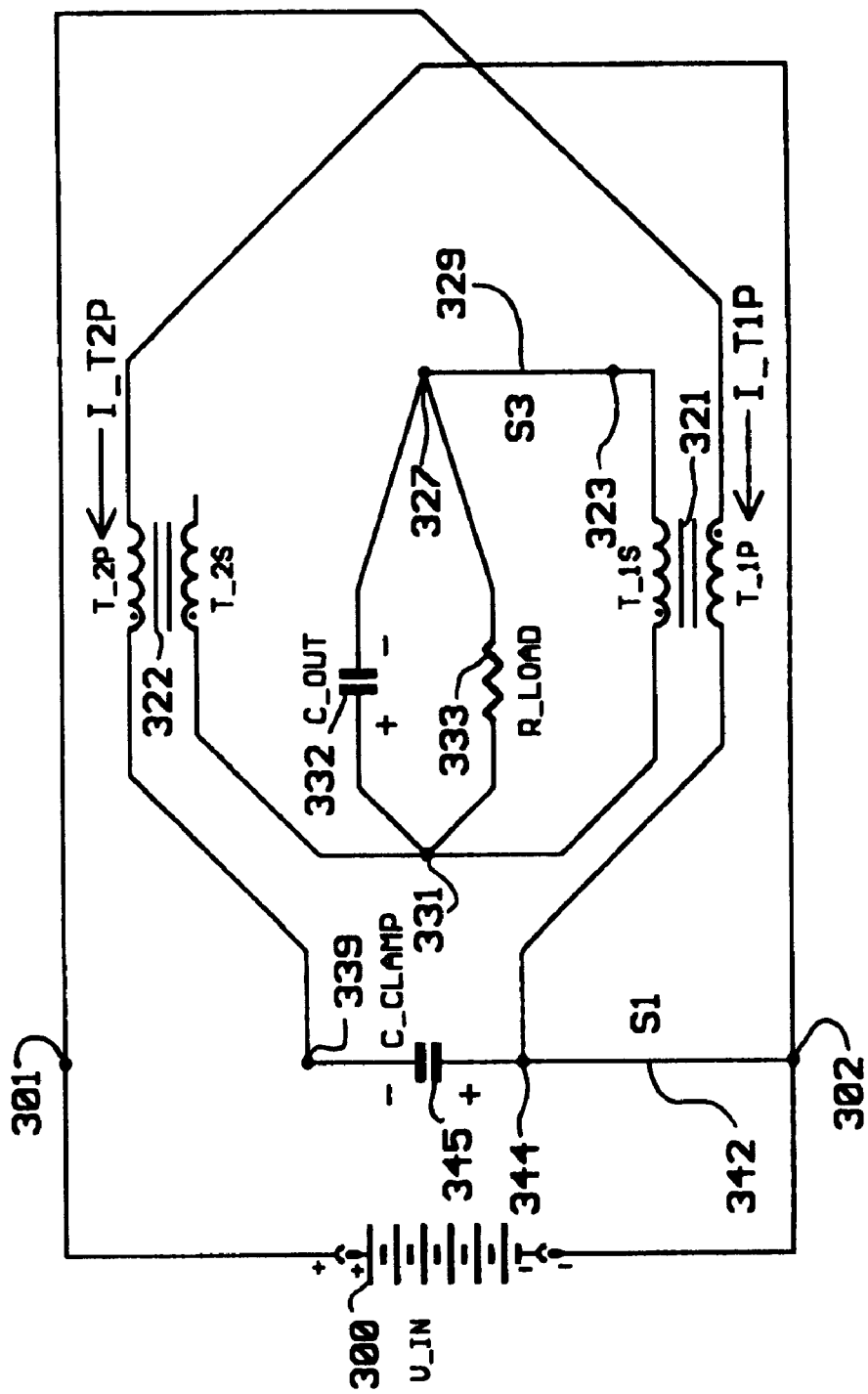
FIG. 47 illustrates an initial condition and a first active state of the FIG. 44 circuit just prior to a first transition.
Figure 48:
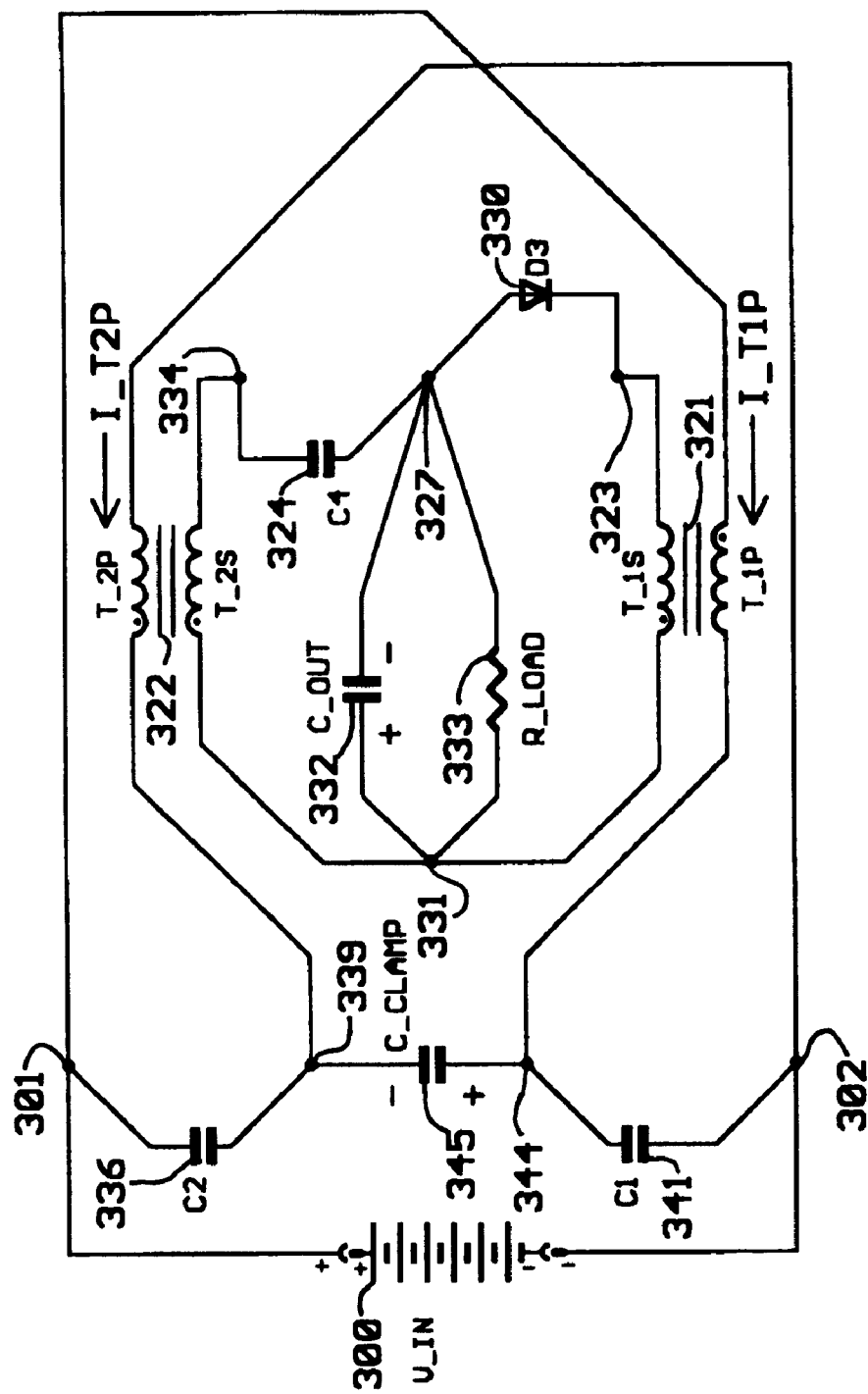
FIG. 48 illustrates a first phase of a first transition of the FIG. 44 circuit.
Figure 49:
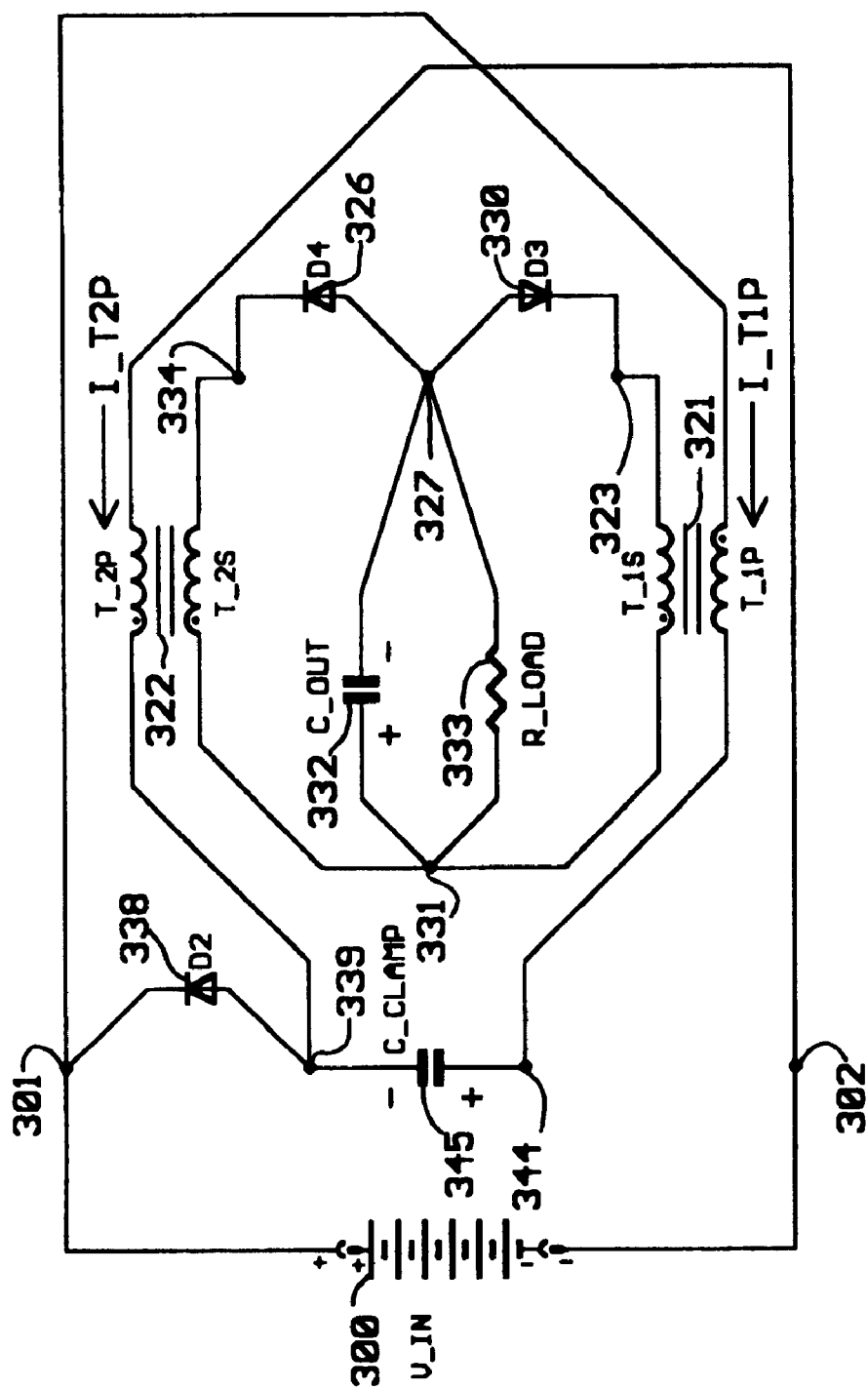
FIG. 49 illustrates a second phase of a first transition of the FIG. 44 circuit.
Figure 50:
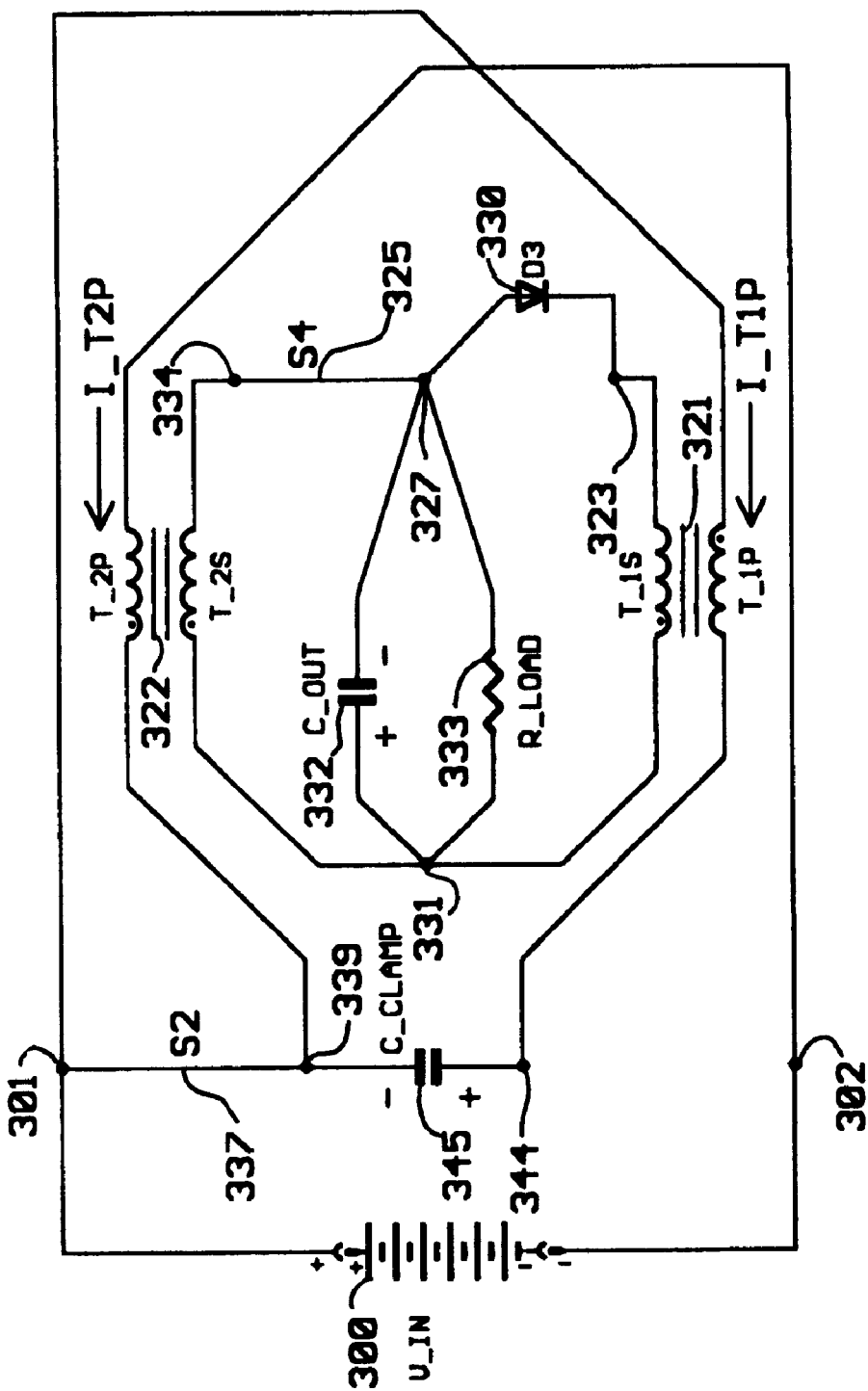
FIG. 50 illustrates a third phase of a first transition of the FIG. 44 circuit.
Figure 51:
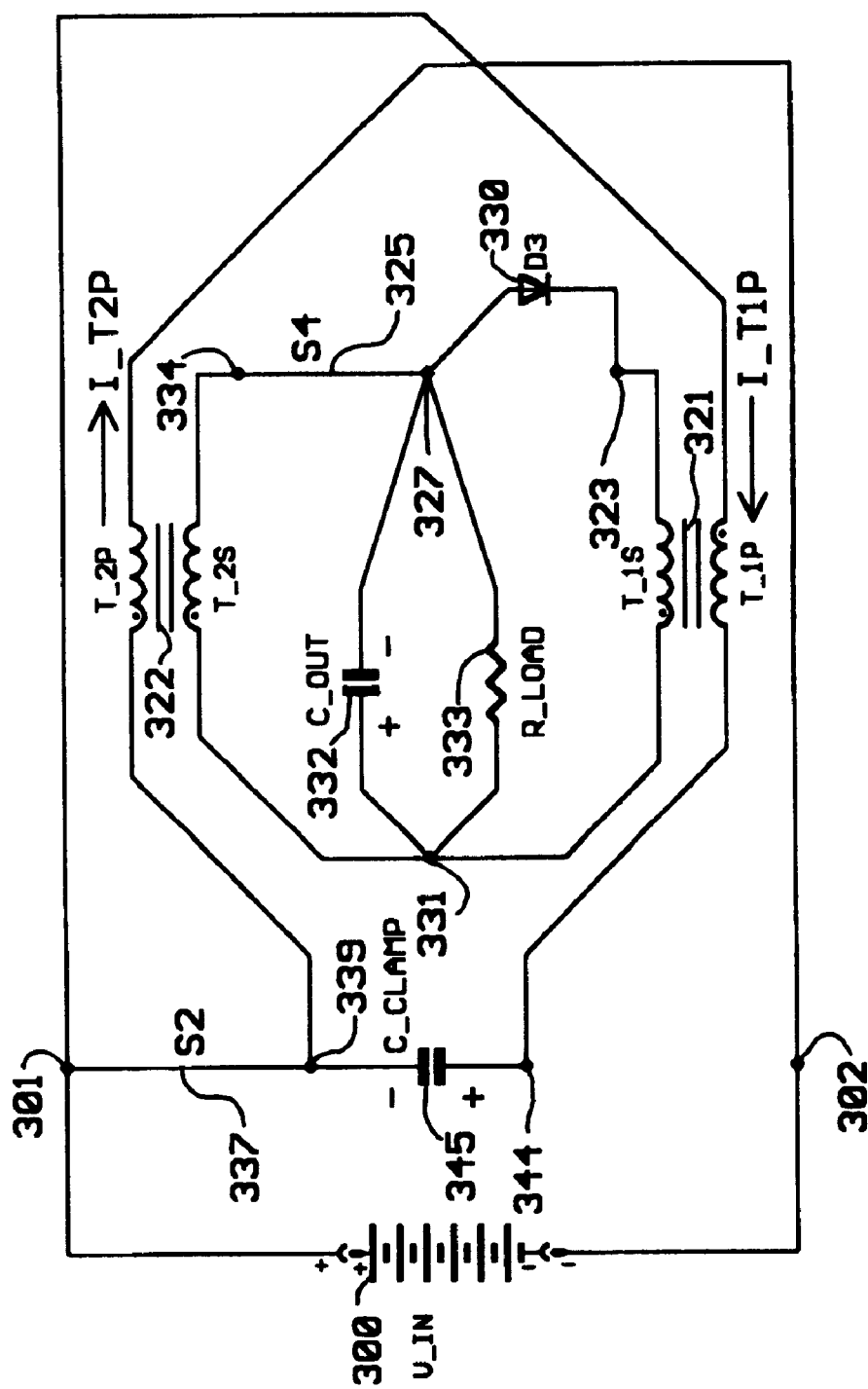
FIG. 51 illustrates a fourth phase of a first transition of the FIG. 44 circuit.
Figure 52:
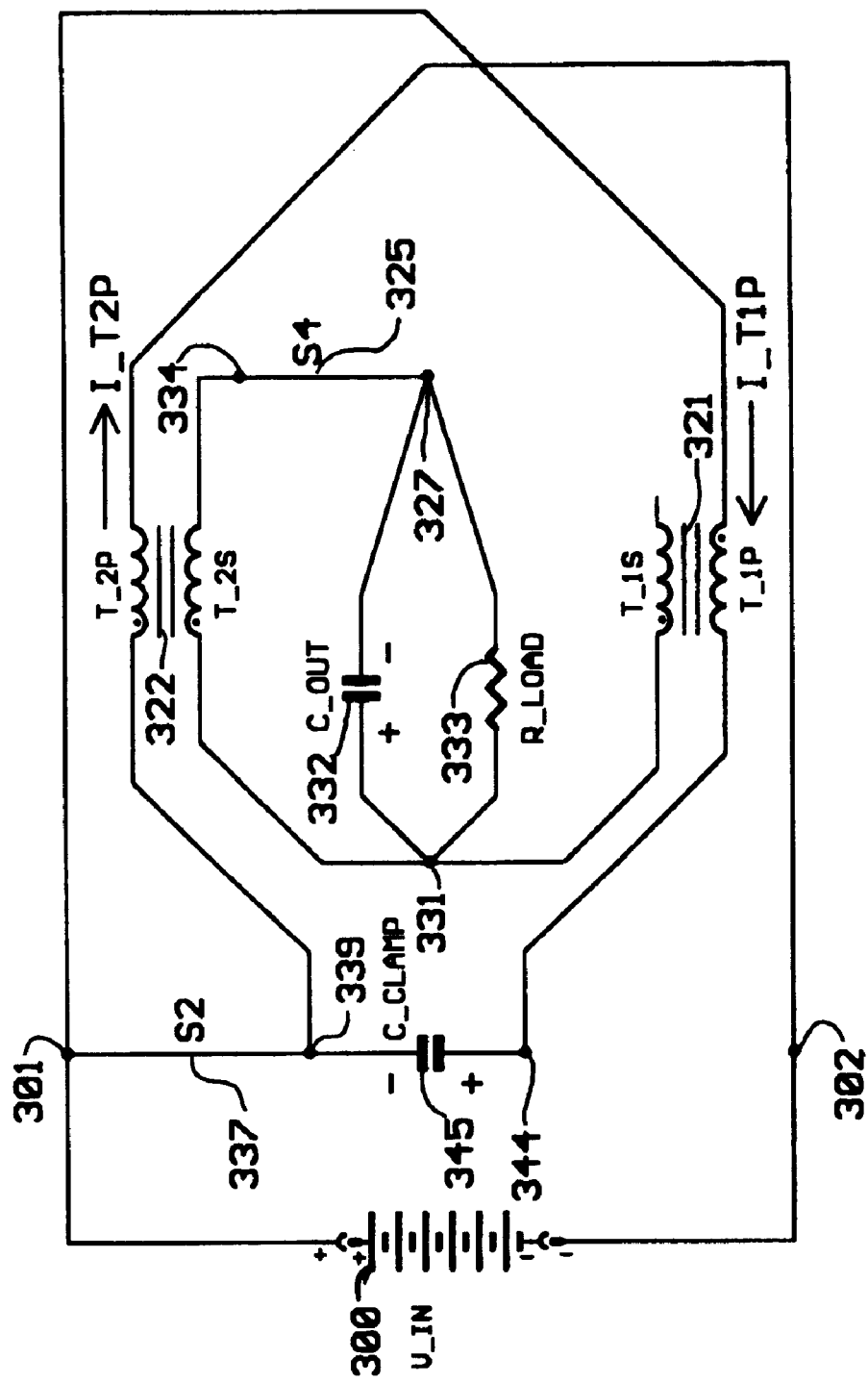
FIG. 52 illustrates a second active state of the FIG. 44 circuit just after the first transition.
Figure 53:
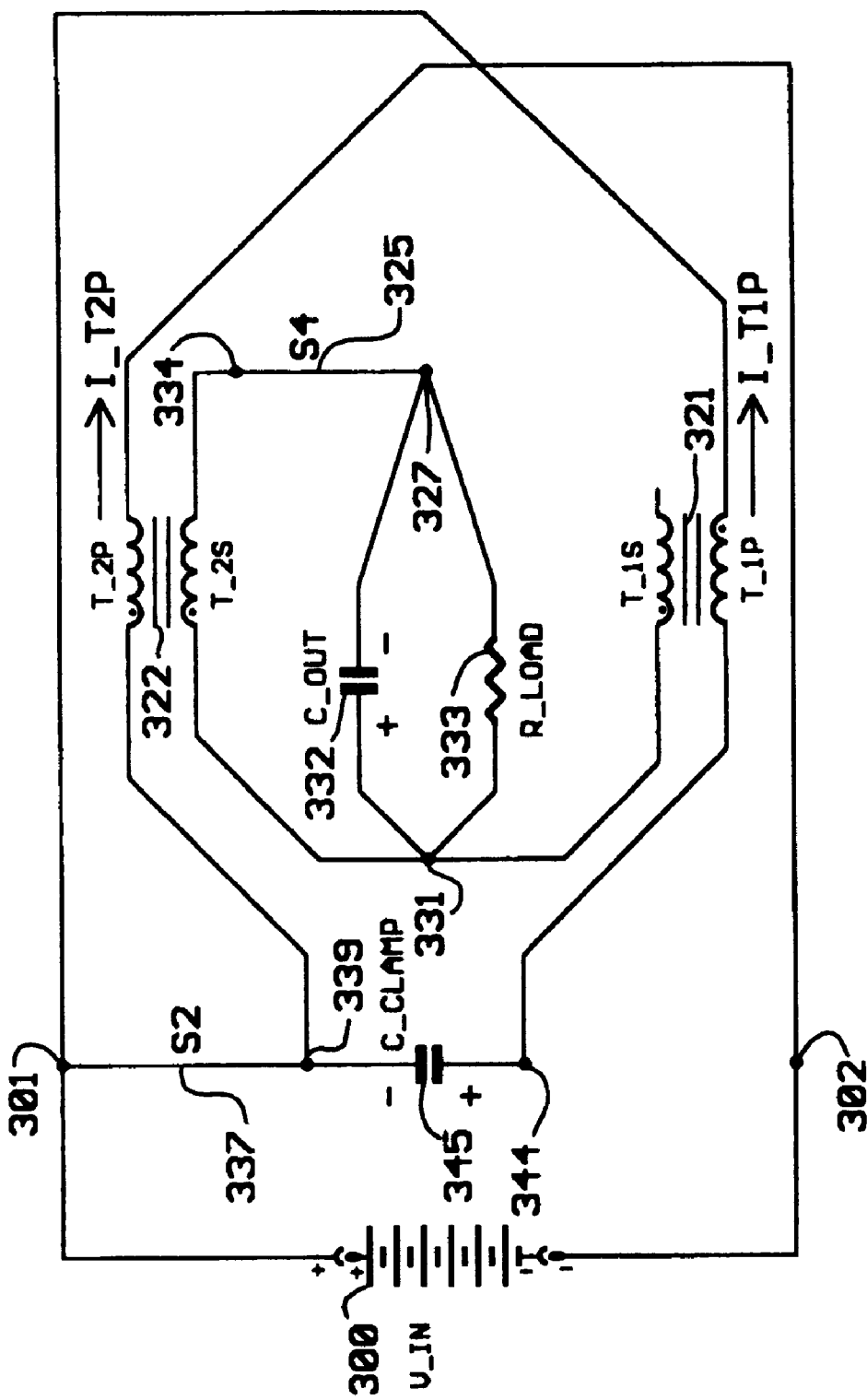
FIG. 53 illustrates the second active state of the FIG. 44 circuit just prior to a second transition.
Figure 54:
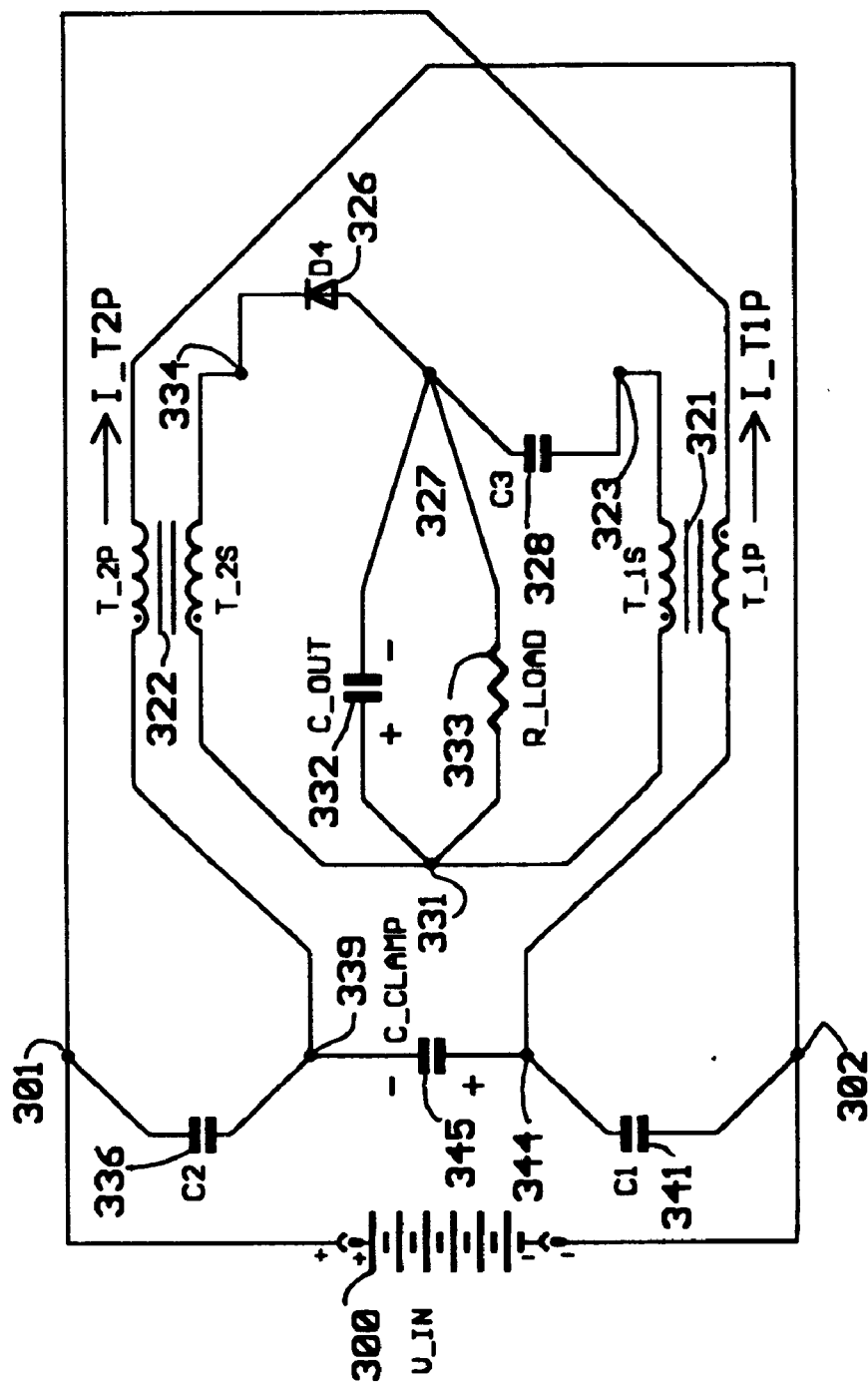
FIG. 54 illustrates a first phase of a second transition of the FIG. 44 circuit.
Figure 55:
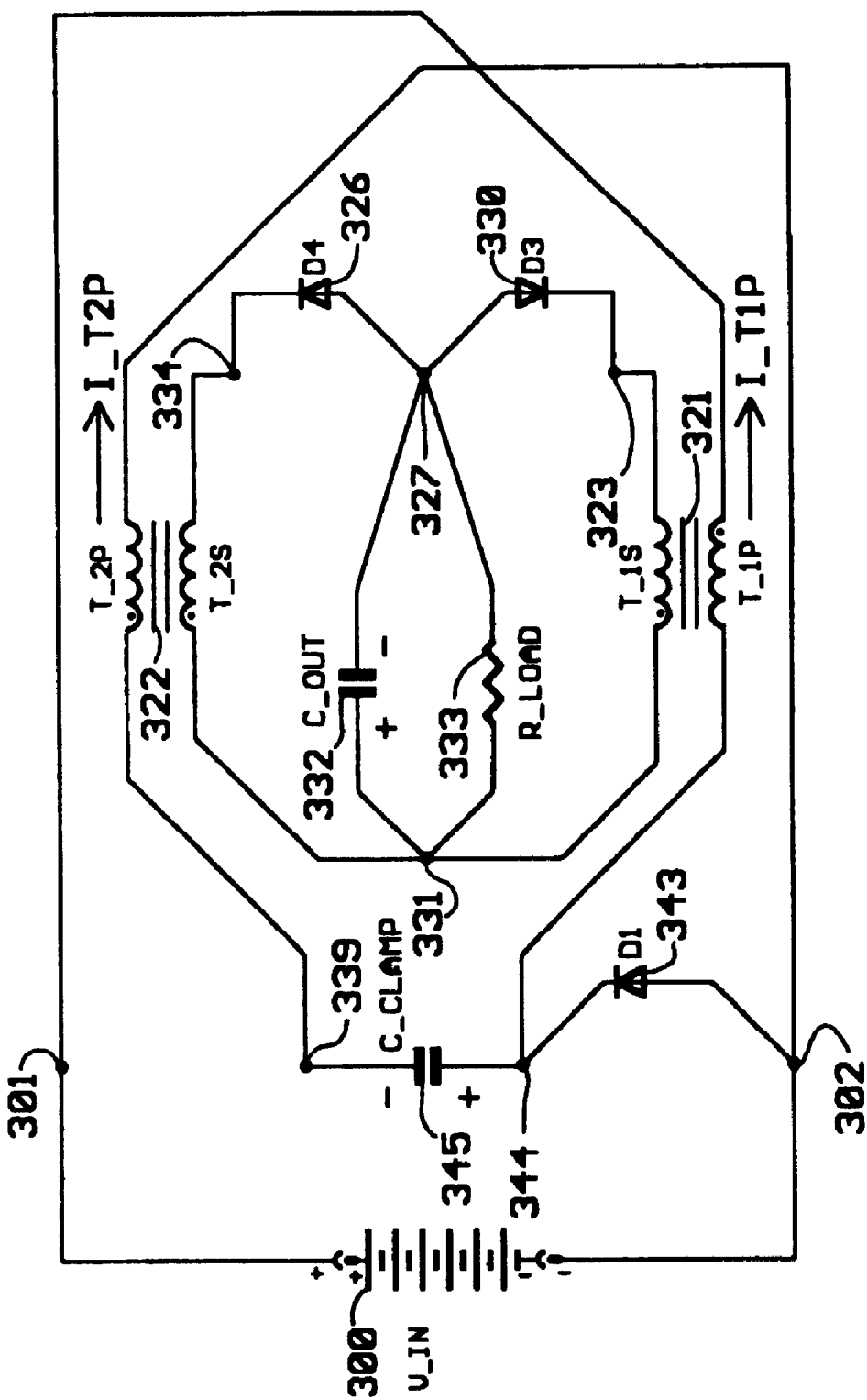
FIG. 55 illustrates a second phase of a second transition of the FIG. 44 circuit.
Figure 56:
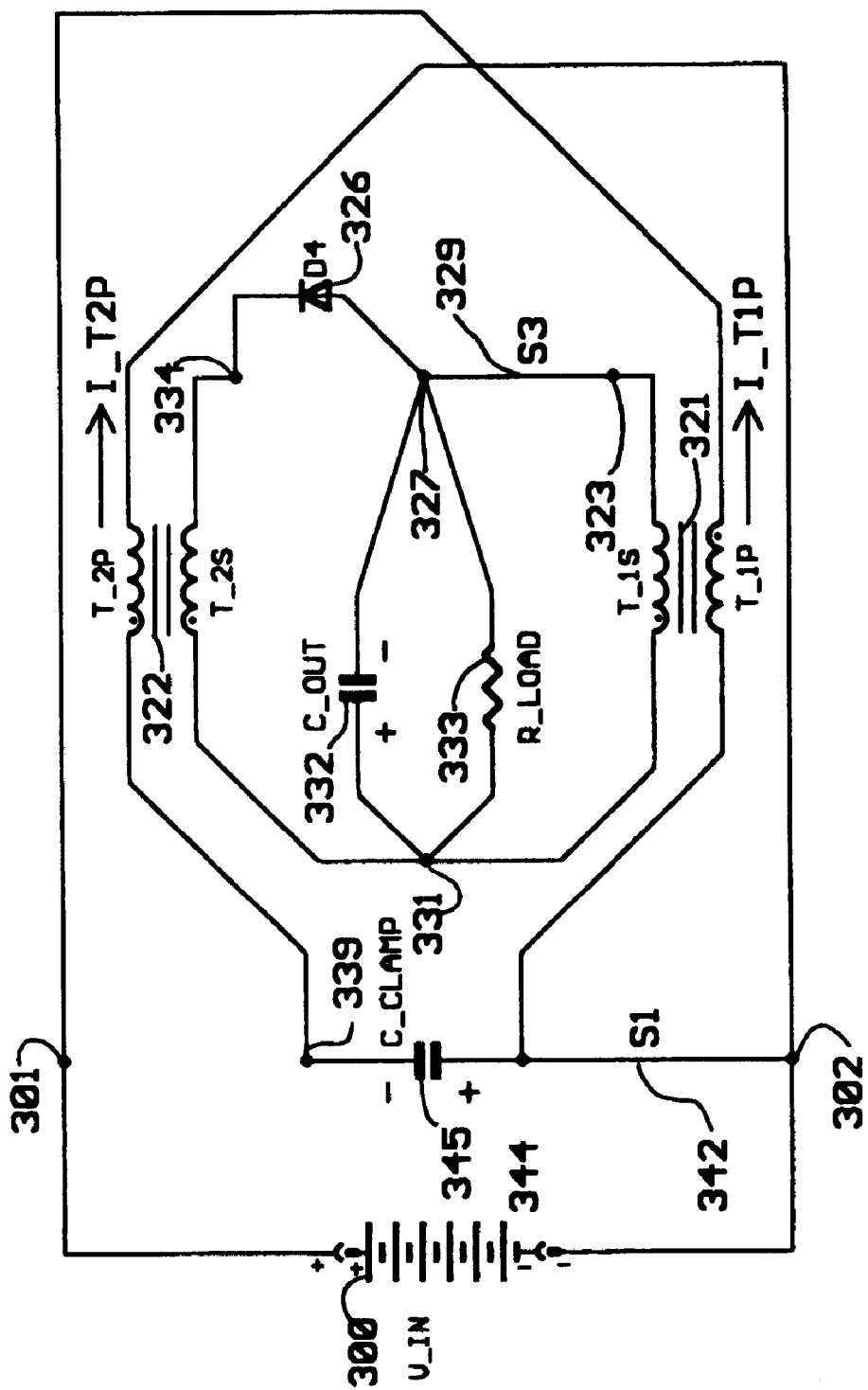
FIG. 56 illustrates a third phase of a second transition of the FIG. 44 circuit.
Figure 57:
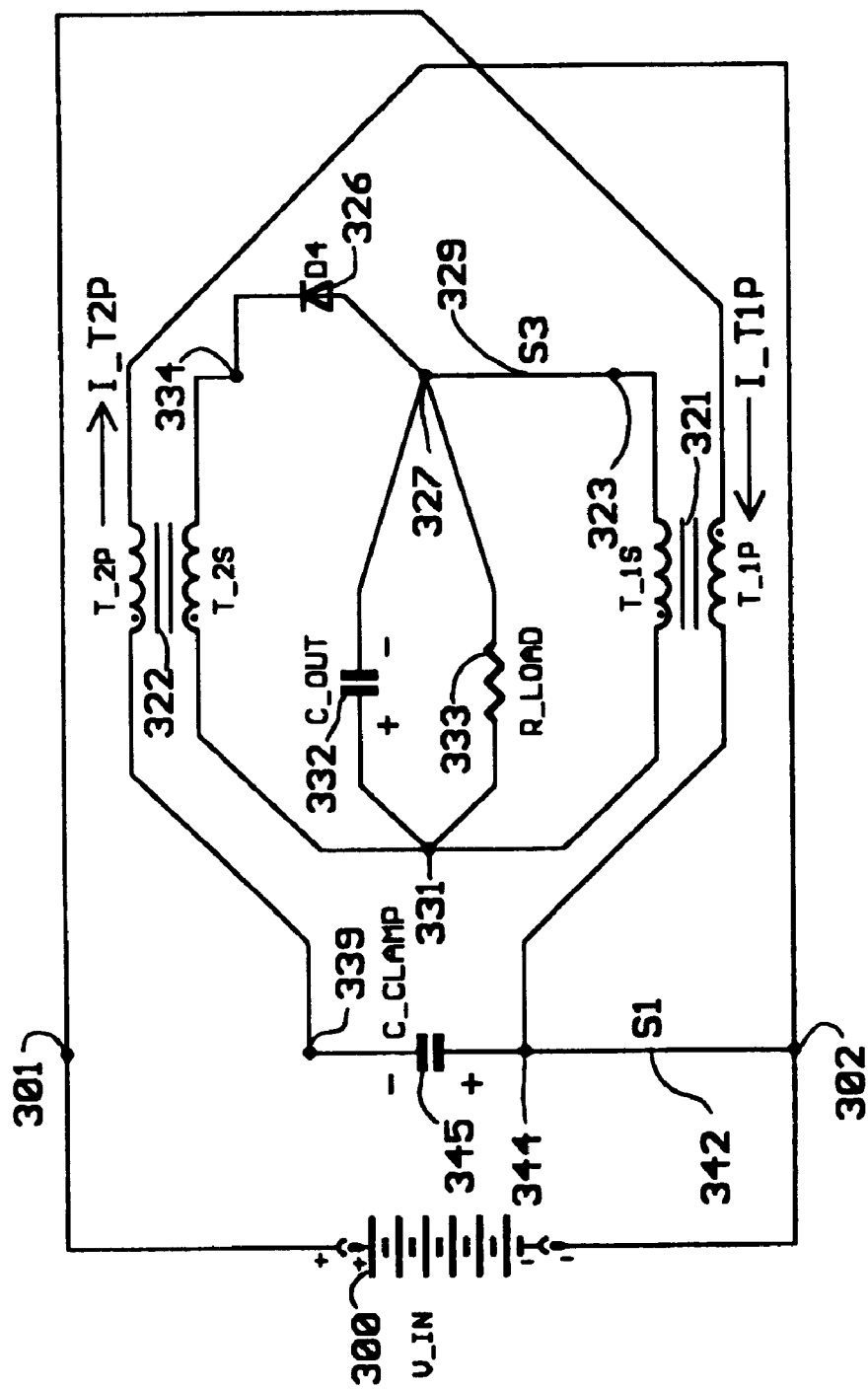
FIG. 57 illustrates a fourth phase of a second transition of the FIG. 44 circuit.
Figure 58:
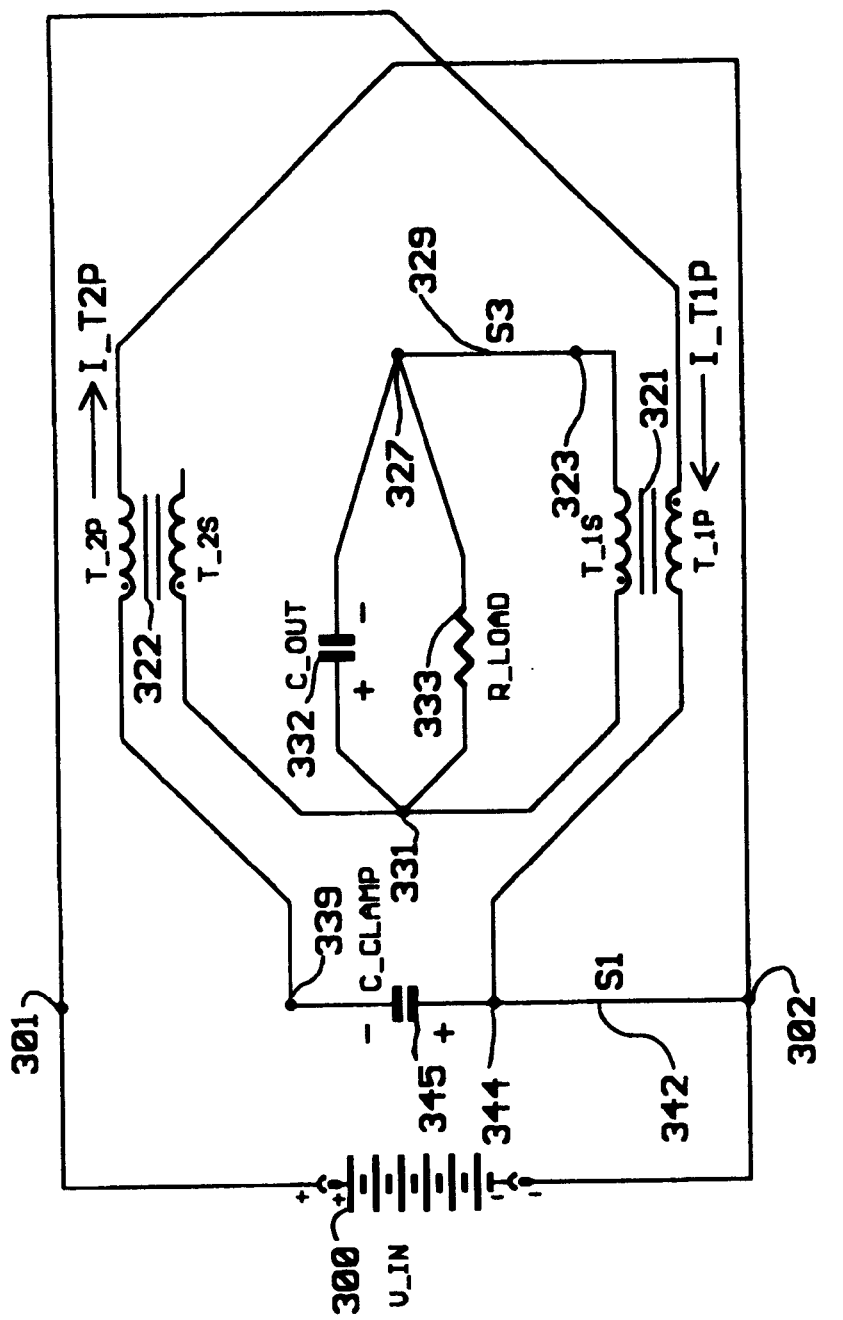
FIG. 58 illustrates the first active state of the FIG. 44 circuit just after the completion of the second transition.

It is assumed in this analysis that the system has reached a settled operating condition. Except for the short, but finite, switching intervals there are two active states of the circuit of FIG. 44. It is assumed that the clamp capacitor 345 voltage is equal to the DC source 100 voltage. It is also assumed that the clamp capacitor is sufficiently large that the clamp capacitor voltage does not vary over a complete switching cycle. Consider an initial condition as illustrated in FIG. 47. The initial condition represents a time near the end of a first active state just prior to a first switching transition. During the initial condition the switches 342 and 329 are on (closed) and the switches 337 and 325 are off (open). The currents in the primary windings of transformers 321 and 322 are both flowing from right to left, as indicated in FIG. 47. The voltage applied to both primary windings is equal to the source 100 voltage. The current in the primary winding of transformer 321 comprises the magnetizing current of the 321 transformer plus the induced load current from the secondary winding of the 321 transformer. The transformer 322 is uncoupled so that the current flowing in its primary winding is just its magnetizing current. The primary winding currents of transformers 321 and 322 are illustrated in FIGS. 46d and 46e, respectively. The magnetizing currents of transformers 321 and 322 are illustrated in FIGS. 46a and 46b, respectively. The switch currents are illustrated in FIGS. 45a through 45d. At a time determined by the control circuit switches 342 and 329 are turned off (opened), as illustrated in FIG. 48. When the switch 342 is turned off its current is diverted into its intrinsic parallel capacitor 341. When the 329 switch is turned off the leakage inductance associated with the 321 transformer forces the switch current into its parallel intrinsic diode 330. At the same time the voltages at the nodes 339 and 344 begin to rise charging capacitor 341 and discharging capacitor 336. At the same time the voltages on the windings of the 322 transformer are changing such that the undotted terminals of the 322 transformer windings are becoming more negative which causes the capacitor 324 to be discharged. The voltages at the nodes 339 and 344 continue to rise until the diode 338 becomes forward biased clamping the voltage on the primary windings of the transformers 321 and 322, as illustrated in FIG. 49. At the same time that the diode 338 becomes forward biased the diode 326 becomes forward biased. The current in the secondary winding of the 321 transformer is maintained by its leakage inductance but falls rapidly. Shortly after diodes 338 and 326 begin to conduct the switches 337 and 325 are turned on (closed) at zero voltage, as illustrated in FIG. 50. During this time the load current continues to fall in the secondary winding of transformer 321 and the load current shifts from the 321 transformer to the 322 transformer. As the load current shifts the current in the primary winding of the 322 transformer changes sign, as illustrated in FIG. 51. Soon after the switches 337 and 325 are turned on the secondary winding current in the 321 transformer drops to zero and the diode 330 becomes reverse biased and turns off, as illustrated in FIG. 52. FIG. 52 represents a second active state of the DC transformer circuit in which the 322 transformer is coupled and the 321 transformer is uncoupled. At the beginning of the second active state the capacitor 328 is quickly charged. During the second active state the magnetizing current in each transformer changes sign but the total primary current of the 322 transformer does not change sign because the primary current of the 322 transformer includes both the magnetizing current and the reflected load current since it is coupled to the load. The total primary current of the 321 transformer is just the magnetizing current of the transformer 321. The primary current of the transformer 321 changes sign during the second active state, as illustrated in FIG. 53. At a time determined by the control circuit the switches 337 and 325 are turned off (opened) as illustrated in FIG. 54. When the switches 337 and 325 are switched off the current in the 337 switch is diverted into the 336 capacitor and the current in the 325 switch is diverted into the 326 diode due to the action of the 322 transformer leakage inductance. The current diverted from the 337 switch charges the 336 capacitor and discharges the 341 capacitor. At the same time the 328 capacitor is being discharged as the voltage at the undotted terminals of the 321 transformer falls with respect to the voltage at the dotted terminals of the 321 transformer. The voltages at the nodes 339 and 344 continues to fall until the diode 343 becomes forward biased. At the same time the diode 330 becomes forward biased, as illustrated in FIG. 55. Shortly after the diodes 343 and 330 become forward biased the switches 342 and 329 are turned on at zero voltage, as illustrated in FIG. 56. During this transition the current in the secondary winding of the transformer 322 is falling rapidly but is maintained by the leakage inductance of the 322 transformer. The load current transfers from the 322 transformer to the 321 transformer. The load current in the 321 transformer causes its primary current to change directions as illustrated in FIG. 57. As the load current continues to shift from transformer 322 to transformer 321 the current in the diode 326 drops to zero and becomes reverse biased, as illustrated in FIG. 58. FIG. 58 represents the beginning of the first active state. During the first active state the 321 transformer is coupled and the 322 transformer is uncoupled. At the beginning of the first active state the capacitor 324 charges up quickly. During this state the magnetizing current in the 322 transformer drops towards zero and reverses sign, as illustrated in FIG. 47, which is the initial condition. A complete cycle of operation has now been described and the process described is repeated indefinitely. During the complete cycle of operation the length of time spent in each of the two active states is identical and the transition times from the first active state to the second active state is very small by comparison to the time interval of the active states and identical to the transition time from the second active state to the first active state.

The load voltage obtained in the FIG. 44 circuit is simply equal to the DC input voltage multiplied by the ratio of the secondary turns to the primary turns of the transformers, which are assumed to be identical in all respects.

$$V_{OUT} = \frac{N_{SEC}}{N_{PRI}} V_{IN},$$

where $V_{OUT}$ is the load voltage, $V_{IN}$ is the input DC source voltage, $N_{SEC}$ is the number of secondary winding turns, and $N_{PRI}$ is the number of primary winding turns.

Related Embodiments

Figure 59:
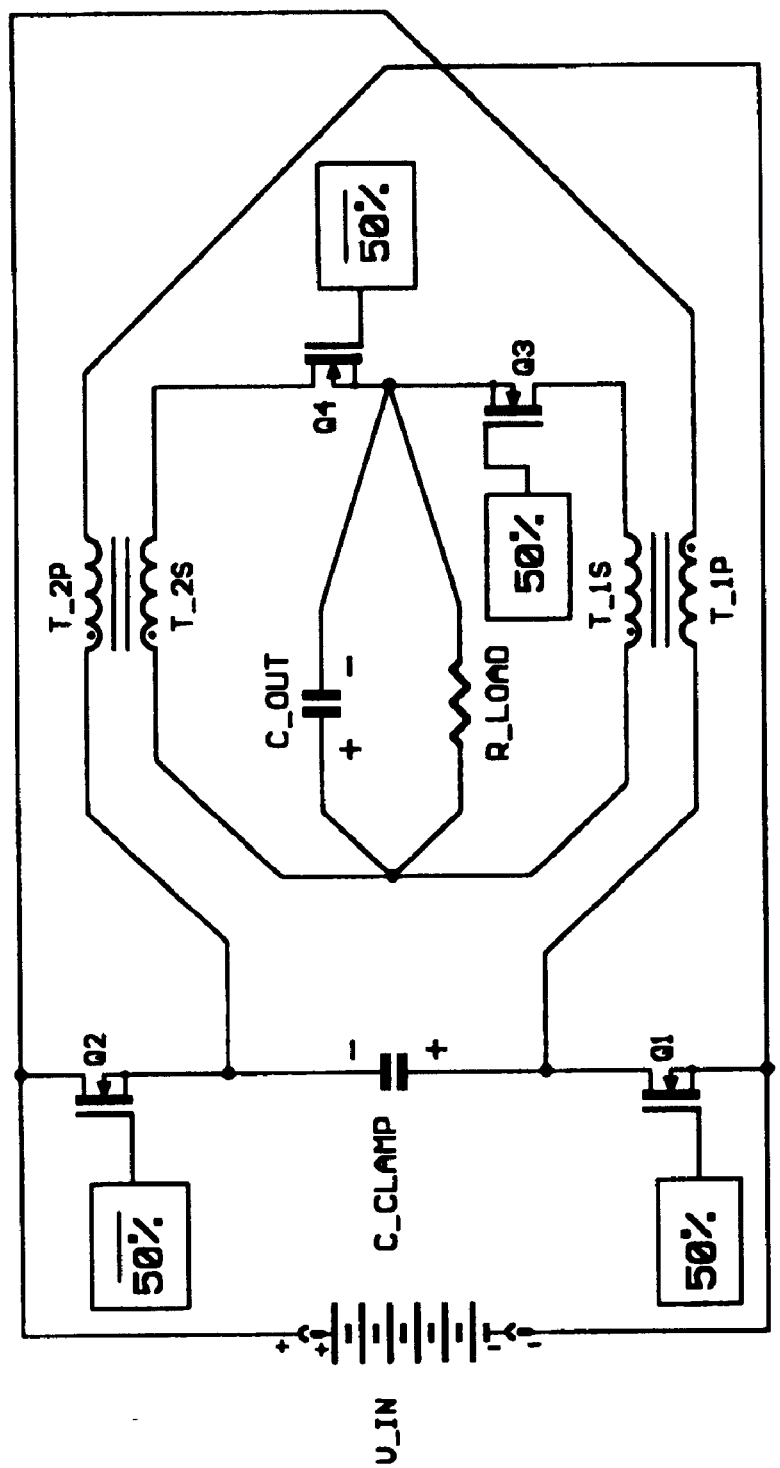
FIG. 59 illustrates an embodiment of the FIG. 44 circuit in which all of the switches are implemented using power mosfets.

FIG. 59 illustrates another embodiment of the FIG. 44 circuit in which the switches are implemented with power mosfets.

Figure 60:
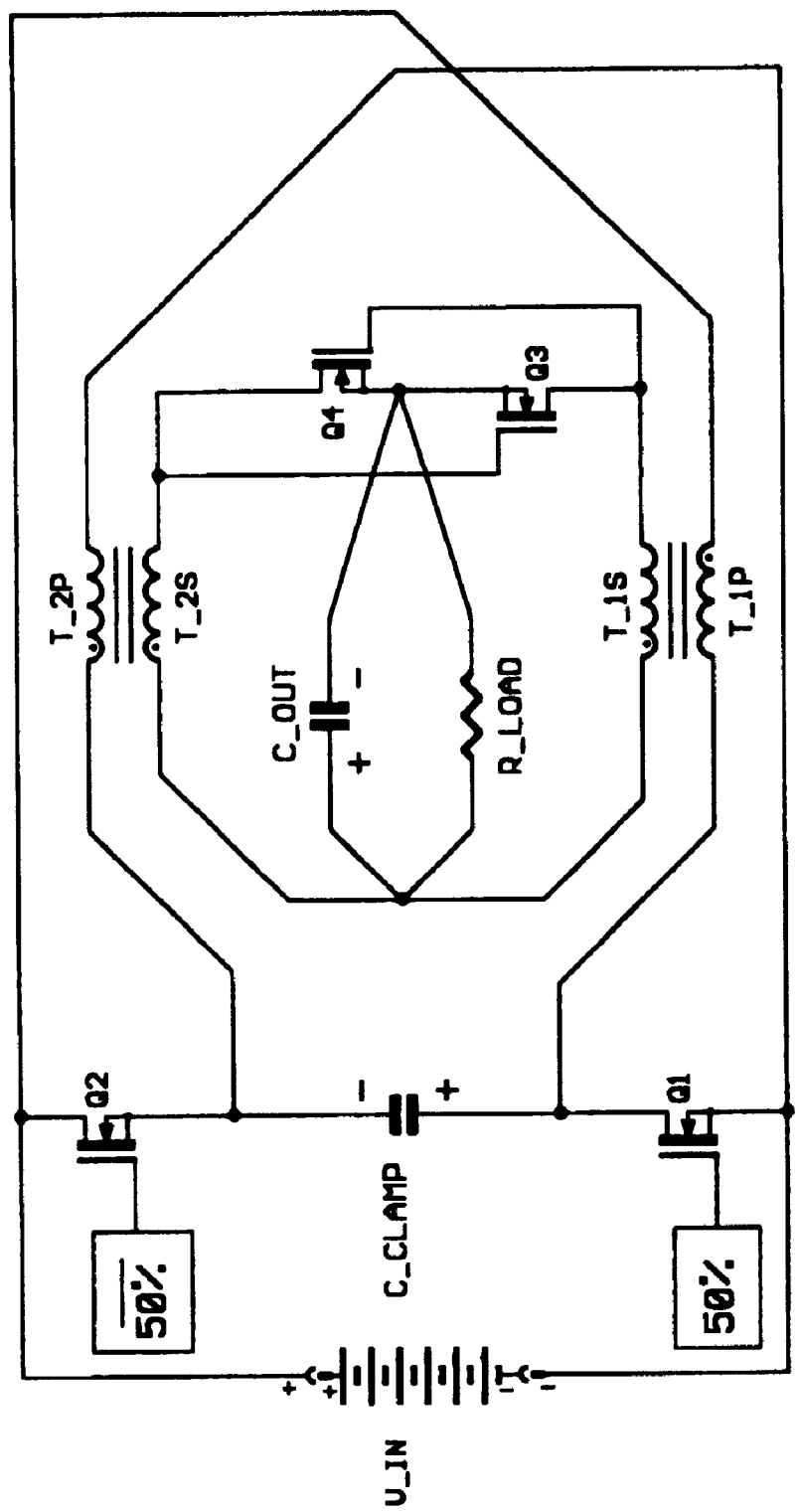
FIG. 60 illustrates an embodiment of the FIG. 44 circuit similar to the FIG. 59 embodiment but with synchronous rectifier self drive.

FIG. 60 represents another embodiment of the FIG. 44 circuit similar to the FIG. 59 circuit except that the secondary switches are implemented with self drive. Self driving the mosfets obviates an isolated control signal for output mosfet switch timing. In the self drive arrangement the gates of the secondary mosfets are connected to the drains of the complementary secondary mosfets. Here the gate of Q3 is connected to the drain of Q4 and the drain of Q3 is connected to the gate of Q4. The timing of the secondary switches is altered slightly from what has been described above in that both the turn off and turn on instants are delayed, but the basic operation of the circuit remains essentially the same. The leakage inductance creates a time delay in the current transfer from one transformer to its complement so that the delay in timing of the switches created by the self drive process is inconsequential. The current drops rapidly in one transformer while it rises rapidly in the complementary transformer. For a short time during each transition the load current will be shared by the two secondary mosfets. During this interval of current sharing both gate drive signals will have collapsed so that the currents will tend to flow in the intrinsic or parallel diodes during the current share interval. The drain voltages of the secondary mosfets must be compatible with the gate voltage requirements of the secondary mosfets, otherwise a voltage divider or voltage limiting circuit must be used to provide the secondary mosfets with a suitable gate drive signal.

Figure 61:
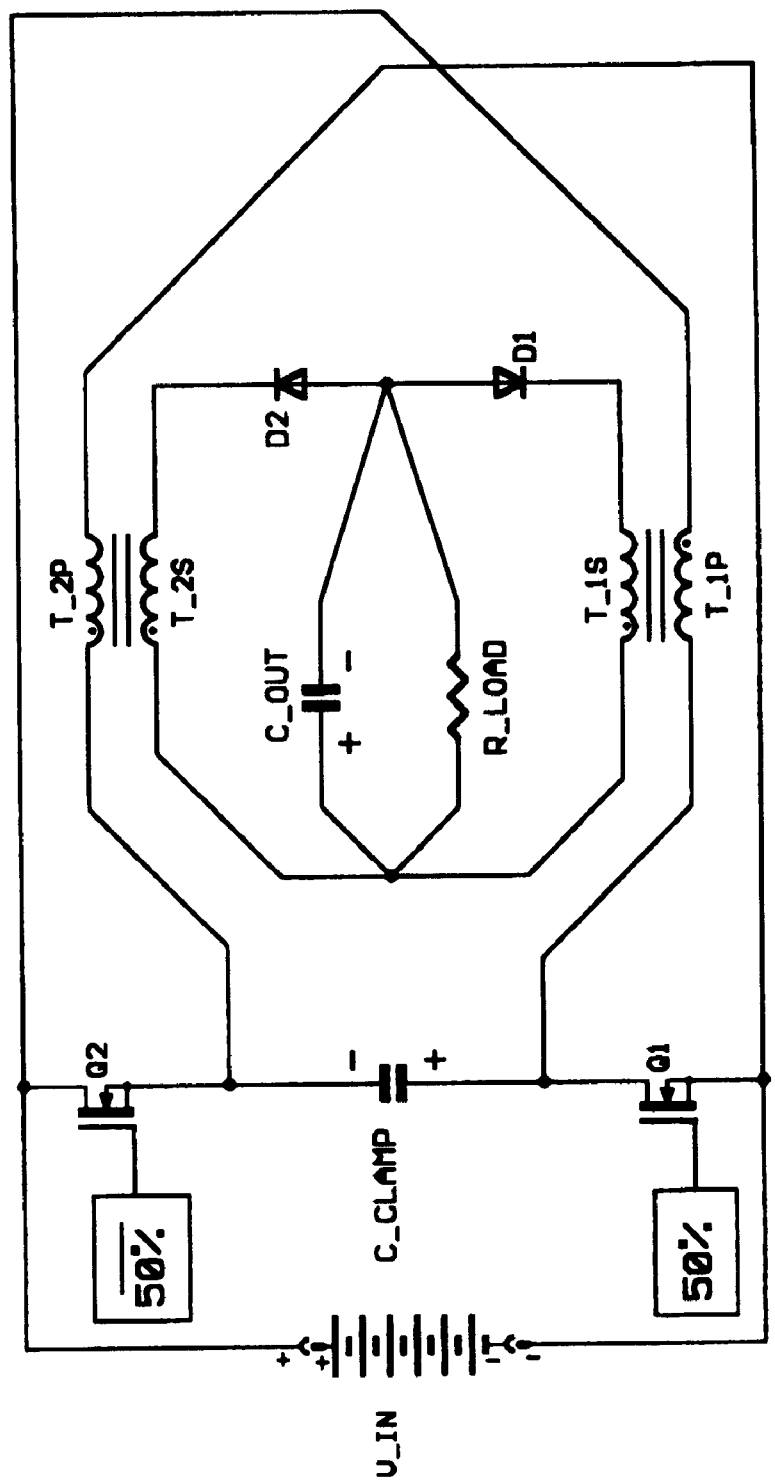
FIG. 61 illustrates an embodiment of the FIG. 44 circuit identical to the FIG. 59 embodiment except that the secondary switches are implemented with diodes.

FIG. 61 illustrates another embodiment of the FIG. 44 circuit similar to the FIG. 59 circuit except that the secondary switches are implemented with rectifier diodes.

Figure 62:
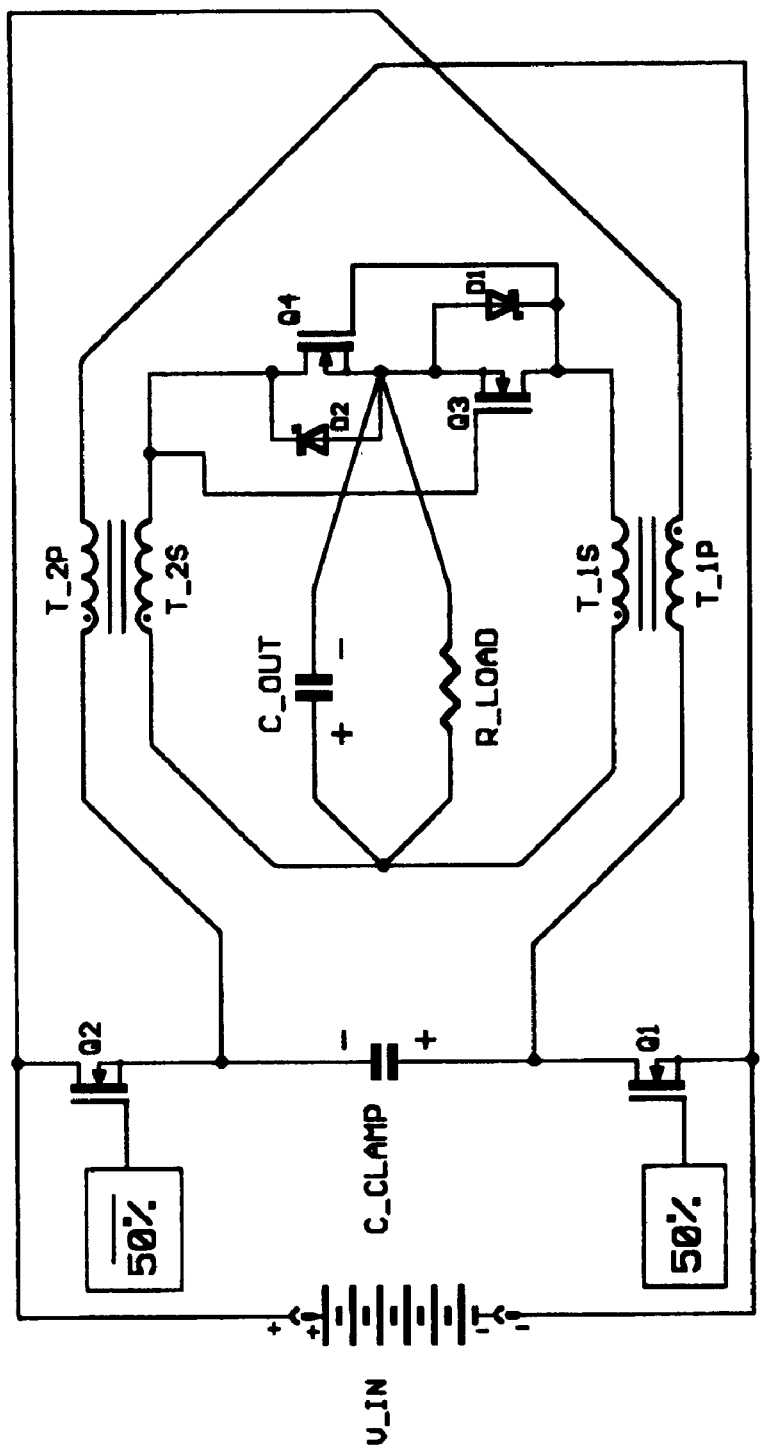
FIG. 62 illustrates an embodiment of the FIG. 44 circuit similar to the FIG. 60 circuit but with the addition of schottky diodes in parallel with the secondary switches.

FIG. 62 illustrates another embodiment of the subject invention similar to the FIG. 60 embodiment in which schottky barrier rectifiers are added in parallel to the secondary power mosfets to clamp the forward voltage drop and prevent the conduction of the power mosfets intrinsic junction diode.

Figure 63:
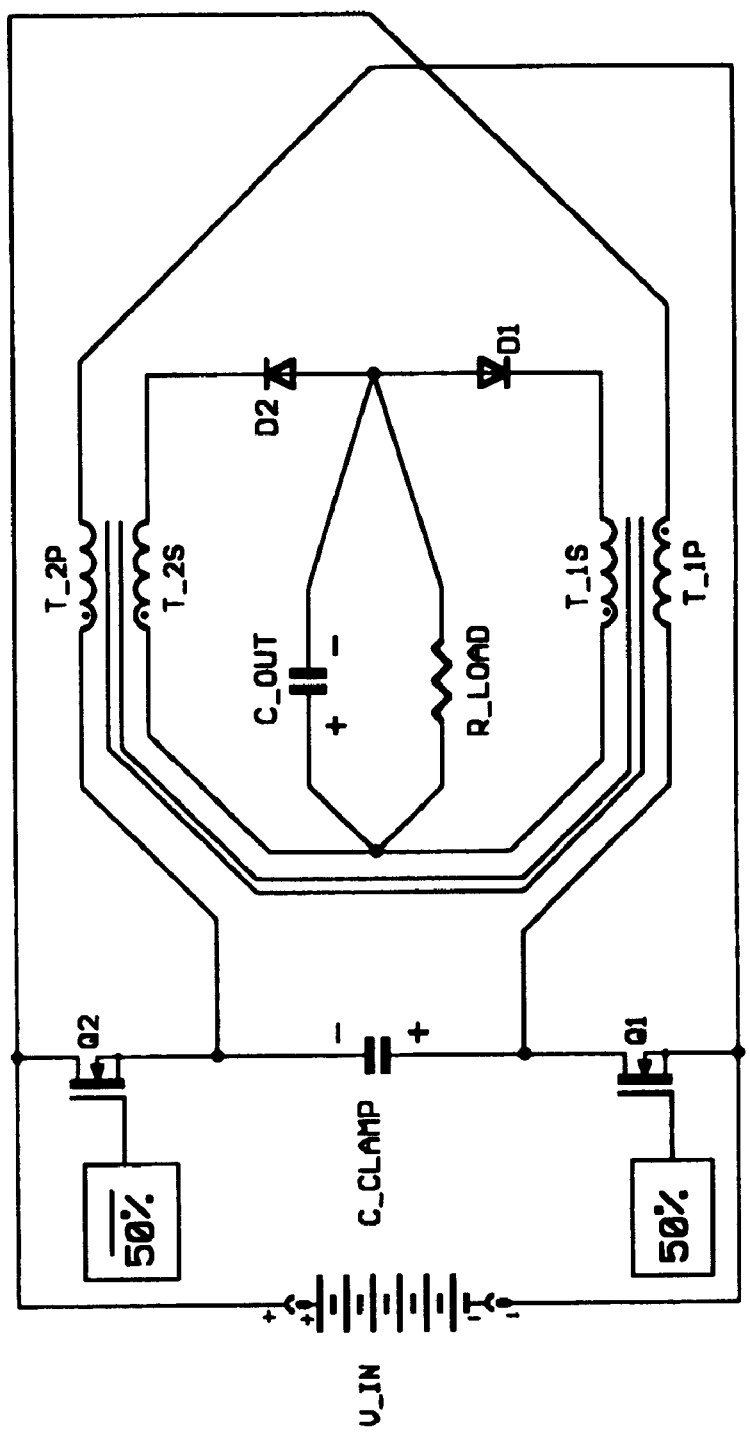
FIG. 63 illustrates an embodiment of the FIG. 44 circuit identical to the FIG. 61 embodiment except that the two transformers are integrated on a single E core as illustrated in FIG. 21.

FIG. 63 illustrates another embodiment of the subject invention similar to the FIG. 61 embodiment except that the two transformers are integrated onto a single core structure as illustrated in FIG. 21.

Conclusion, Ramifications, and Scope of Invention

Thus the reader will see that the DC transformer circuit of the subject invention provides a relatively simple mechanism for transforming DC voltage levels at high frequency and high efficiency due to the zero voltage switching and self clamping features of the new circuit.

While my above description contains many specificities, these should not be construed as limitations on the scope of the invention, but rather as exemplifications of preferred embodiments thereof. Many other variations are possible. For example, interleaved, parallel DC transformers with two or more parallel DC transformer sections; DC transformers similar to those shown but which have instead high AC ripple voltages on input filter capacitors; DC transformers, similar to those shown in the drawings, but where the DC input source is instead a varying rectified AC signal; DC transformers, similar to those shown in the drawings, but with multiple secondary circuits for multiple outputs and multiple loads. Accordingly, the scope of the invention should be determined not by the embodiments illustrated, but by the appended claims and their legal equivalents.

I claim:

1. A DC transformer circuit comprising,
an input coupleable to a source of substantially DC voltage,
an output coupleable to a load,
a first capacitor coupled to said input,
a second capacitor coupled to said first capacitor and to said input,
first switch means coupled to said input,
second switch means coupled to said first switch means and to said input, operable substantially in anti-synchronization to said first switch means,
a first transformer having a primary winding and a secondary winding, said primary winding coupled to said first and second capacitors and to said first and second switch means, said secondary winding coupled to said output,
a second transformer having a primary winding and a secondary winding, said primary winding connected in anti-parallel to said primary winding of said first transformer, said secondary winding coupled to said secondary winding of said first transformer and to said load, operable substantially in anti-synchronization with said first transformer,
third switch means coupled to said output and to said secondary winding of said first transformer, operable substantially in synchronization with said first switch means,
fourth switch means coupled to said output, to said third switch means, and to said secondary winding of said second transformer, operable substantially in synchronization with said second switch means,
whereby said primary windings are self clamped by said first and second capacitors and said input, and each switching transition of each switch means is substantially zero voltage driven by stored energies in said first and second transformers.

2. The DC transformer circuit of claim 1 wherein said switch means comprise semiconductor switch means.

3. The DC transformer circuit of claim 2 wherein said first transformer and said second transformer are integrated on a single common core.

4. A DC transformer circuit comprising,
an input coupleable to a source of substantially DC voltage,
an output coupleable to a load,
first switch means coupled to said input,
second switch means coupled to said first switch means and to said input, operable substantially in anti-synchronization to said first switch means,
third switch means coupled to said input, operable substantially in synchronization with said first switch means,
fourth switch means coupled to said third switch means and to said input, operable substantially in anti-synchronization to said third switch means,
a first transformer having a primary winding and a secondary winding, said primary winding coupled to said first, second, third, and fourth switch means, said secondary winding coupled to said output,
a second transformer having a primary winding and a secondary winding, said primary winding connected in anti-parallel to said primary winding of said first transformer, said secondary winding coupled to said secondary winding of said first transformer and to said load, operable substantially in anti-synchronization with said first transformer,
fifth switch means coupled to said output and to said secondary winding of said first transformer, operable substantially in synchronization with said first switch means,
sixth switch means coupled to said output, to said fifth switch means, and to said secondary winding of said second transformer, operable substantially in synchronization with said second switch means,
whereby said primary windings are self clamped by said input, and each switching transition of each switch means is substantially zero voltage driven by stored energies in said first and second transformers.

5. The DC transformer circuit of claim 4 wherein said switch means comprise semiconductor switch means.

6. The DC transformer circuit of claim 5 wherein said first transformer and said second transformer are integrated on a single common core.

7. The DC transformer of claim 4 further comprising,
a capacitor coupled in series with both said primary winding of said first transformer and said primary winding of said second transformer, whereby said capacitor blocks DC current in said anti-parallel primary winding combination thereby reducing the likelihood of core saturation in said first and said second transformers.

8. A DC transformer circuit comprising, an input coupleable to a source of DC voltage, an output coupleable to a load, first switch means coupled to said input, a capacitor coupled to said first switch means second switch means coupled to said capacitor and to said input, operable substantially in anti-synchronization to said first switch means, a first transformer having a primary winding and a secondary winding, said primary winding coupled to said capacitor and to said first switch means, said secondary winding coupled to said output, a second transformer having a primary winding and a secondary winding, said primary winding coupled to said capacitor and said second switch means, said secondary winding coupled to said secondary winding of said first transformer and to said load, operable substantially in anti-synchronization to said first transformer, third switch means coupled to said output and to said secondary winding of said first transformer, operable substantially in synchronization with said first switch means, fourth switch means coupled to said output, to said third switch means, and to said secondary winding of said second transformer, operable substantially in synchronization with said second switch means, whereby said primary windings are self clamped by said capacitor, and each switching transition of each switch means is substantially zero voltage driven by stored energies in said first and second transformers.

9. The DC transformer circuit of claim 8 wherein said switch means comprise semiconductor switch means.

10. The DC transformer circuit of claim 9 wherein said first transformer and said second transformer are integrated on a single common core.

* * * * *